US008386896B2

(12) United States Patent
Limberg

(10) Patent No.: US 8,386,896 B2
(45) Date of Patent: Feb. 26, 2013

(54) 8VSB DTV SIGNALS WITH PCCC AND SUBSEQUENT TRELLIS CODING

(76) Inventor: Allen LeRoy Limberg, Port Charlotte, FL (US)

( * ) Notice: Subject to any disclaimer, the term of this patent is extended or adjusted under 35 U.S.C. 154(b) by 82 days.

(21) Appl. No.: 13/068,496

(22) Filed: May 13, 2011

(65) Prior Publication Data

US 2011/0222609 A1    Sep. 15, 2011

Related U.S. Application Data

(63) Continuation of application No. 11/986,940, filed on Nov. 27, 2007, now Pat. No. 8,065,594.

(60) Provisional application No. 60/782,481, filed on Nov. 28, 2006, provisional application No. 60/937,699, filed on Jun. 29, 2007, provisional application No. 60/959,140, filed on Jul. 11, 2007, provisional application No. 60/961,941, filed on Jul. 25, 2007, provisional application No. 60/964,450, filed on Aug. 13, 2007, provisional application No. 60/966,339, filed on Aug. 27, 2007.

(51) Int. Cl.
*H03M 13/23* (2006.01)
*H03M 13/03* (2006.01)
*H03M 13/00* (2006.01)

(52) U.S. Cl. ........ 714/786; 714/756; 714/784; 714/792; 375/240.01

(58) Field of Classification Search ........................ None
See application file for complete search history.

(56) References Cited

U.S. PATENT DOCUMENTS

| | | |
|---|---|---|
| 2,632,058 A | 3/1953 | Gray |
| 4,622,670 A | 11/1986 | Martin |
| 4,975,698 A | 12/1990 | Kagey |
| 5,398,073 A | 3/1995 | Wei |
| 5,446,747 A | 8/1995 | Berrou |
| 5,907,560 A | 5/1999 | Spruyt |
| 6,353,911 B1 | 3/2002 | Brink |
| 7,103,831 B1 | 9/2006 | Krieger et al. |
| 2005/0271160 A1 | 12/2005 | Eroz et al. |
| 2006/0246836 A1 | 11/2006 | Simon |
| 2010/0246663 A1* | 9/2010 | Citta et al. ............... 375/240.01 |
| 2011/0085622 A1* | 4/2011 | Choi et al. .................... 375/340 |
| 2012/0027102 A1* | 2/2012 | Lee et al. ................. 375/240.27 |
| 2012/0033740 A1* | 2/2012 | Bretl et al. ............... 375/240.25 |
| 2012/0127900 A1* | 5/2012 | Song et al. ..................... 370/310 |

OTHER PUBLICATIONS

Stierstorfer & Fischer, (Gray) Mappings for Bit-Interleaved Coded Modulation, IEEE 65th Vehicular Technology Conference, Apr. 22-25, 2007 in Dublin, Ireland, pp. 1703-1707 See Fig. 3.

* cited by examiner

*Primary Examiner* — Albert Decady
*Assistant Examiner* — Justin R Knapp

(57) ABSTRACT

Data to be more robustly transmitted within 8VSB broadcast DTV signals are turbo coded using parallel concatenated convolutional coding (PCCC) and incorporated within the segments of data fields, the bytes of which are convolutionally interleaved before trellis coding and 8VSB symbol mapping. Packing the PCCC into payload fields of MPEG-2-compatible null data packets and Reed-Solomon coding the packets to generate the segments of data fields, the bytes of which are convolutionally interleaved, conditions legacy DTV receivers to disregard PCCC components not useful to them. Transversal packing turbo-coded Reed-Solomon codewords into the payload fields of MPEG-2-compatible null data packets increases the capability of those turbo-coded Reed-Solomon codewords to overcome burst errors. Repeated transmissions of the transversally packed turbo-coded Reed-Solomon codewords in whole or in part allows them to overcome protracted deep fades encountered during mobile reception of 8VSB DTV signals.

20 Claims, 38 Drawing Sheets

| 8VSB DATA SEGMENT NUMBER | |
|---|---|
| N | 207 BYTES OF TRELLIS-CODED DATA STREAM OF (1/3)-CODE-RATE PCCC |
| N+1 | 207 BYTES OF TRELLIS-CODED PARITY BITS FOR FIRST CODE OF (1/3)-CODE-RATE PCCC |
| N+2 | 207 BYTES OF TRELLIS-CODED PARITY BITS FOR SECOND CODE OF (1/3)-CODE-RATE PCCC |
| N+3 | 207 BYTES OF TRELLIS-CODED DATA STREAM OF (1/3)-CODE-RATE PCCC |
| N+4 | 207 BYTES OF TRELLIS-CODED PARITY BITS FOR FIRST CODE OF (1/3)-CODE-RATE PCCC |
| N+5 | 207 BYTES OF TRELLIS-CODED PARITY BITS FOR SECOND CODE OF (1/3)-CODE-RATE PCCC |
| N+6 | 187 BYTES OF TRELLIS-CODED ORDINARY 8VSB DATA / 20 PARITY BYTES OF (207, 187) R-S CODE |
| N+7 | 207 BYTES OF TRELLIS-CODED DATA STREAM OF (1/3)-CODE-RATE PCCC |
| N+8 | 207 BYTES OF TRELLIS-CODED PARITY BITS FOR FIRST CODE OF (1/3)-CODE-RATE PCCC |
| N+9 | 207 BYTES OF TRELLIS-CODED PARITY BITS FOR SECOND CODE OF (1/3)-CODE-RATE PCCC |
| N+10 | 187 BYTES OF TRELLIS-CODED ORDINARY 8VSB DATA / 20 PARITY BYTES OF (207, 187) R-S CODE |

EACH 207-BYTE DATA SEGMENT HAS 207 X 8 = 1656 BITS THEREIN.

EACH 187-BYTE DATA PACKET HAS 187 X 8 = 1496 BITS THEREIN.

Fig. 2

| Segment | Content | |
|---|---|---|
| N | 187 BYTES OF TRELLIS-CODED DATA | 20 PARITY BYTES OF (207, 187) R-S CODE |
| N+1 | 207 BYTES OF TRELLIS-CODED PARITY BITS FOR FIRST CODE OF (1/3)-CODE-RATE PCCC | |
| N+2 | 2077 BYTES OF TRELLIS-CODED PARITY BITS FOR SECOND CODE OF (1/3)-CODE-RATE PCCC | |
| N+3 | 187 BYTES OF TRELLIS-CODED DATA | 20 PARITY BYTES OF (207, 187) R-S CODE |
| N+4 | 207 BYTES OF TRELLIS-CODED PARITY BITS FOR FIRST CODE OF (1/3)-CODE-RATE PCCC | |
| N+5 | 207 BYTES OF TRELLIS-CODED PARITY BITS FOR SECOND CODE OF (1/3)-CODE-RATE PCCC | |
| N+6 | 187 BYTES OF TRELLIS-CODED ORDINARY 8VSB DATA | 20 PARITY BYTES OF (207, 187) R-S CODE |
| N+7 | 187 BYTES OF TRELLIS-CODED DATA | 20 PARITY BYTES OF (207, 187) R-S CODE |
| N+8 | 207 BYTES OF TRELLIS-CODED PARITY BITS FOR FIRST CODE OF (1/3)-CODE-RATE PCCC | |
| N+9 | 207 BYTES OF TRELLIS-CODED PARITY BITS FOR SECOND CODE OF (1/3)-CODE-RATE PCCC | |
| N+10 | 187 BYTES OF TRELLIS-CODED ORDINARY 8VSB DATA | 20 PARITY BYTES OF (207, 187) R-S CODE |

8VSB DATA SEGMENT NUMBER

EACH 207-BYTE DATA SEGMENT HAS 207 X 8 = 1656 BITS THEREIN.

EACH 187-BYTE DATA PACKET HAS 187 X 8 = 1496 BITS THEREIN.

Fig. 3

| 8VSB DATA SEGMENT NO. | | EACH 187-BYTE DATA PACKET HAS 187 X 8 = 1496 BITS THEREIN. |
|---|---|---|
| N | 187 BYTES OF TRELLIS-CODED DATA STREAM OF (1/3)-CODE-RATE PCCC | 20 PARITY BYTES OF (207, 187) R-S CODE OF 2ND TYPE |
| N+1 | 187 BYTES OF TRELLIS-CODED PARITY BITS FOR FIRST CODE OF (1/3)-CODE-RATE PCCC | 20 PARITY BYTES OF (207, 187) R-S CODE OF 3RD TYPE |
| N+2 | 187 BYTES OF TRELLIS-CODED PARITY BITS FOR SECOND CODE OF (1/3)-CODE-RATE PCCC | 20 PARITY BYTES OF (207, 187) R-S CODE OF 4TH TYPE |
| N+3 | 187 BYTES OF TRELLIS-CODED DATA STREAM OF (1/3)-CODE-RATE PCCC | 20 PARITY BYTES OF (207, 187) R-S CODE OF 2ND TYPE |
| N+4 | 187 BYTES OF TRELLIS-CODED PARITY BITS FOR FIRST CODE OF (1/3)-CODE-RATE PCCC | 20 PARITY BYTES OF (207, 187) R-S CODE OF 3RD TYPE |
| N+5 | 187 BYTES OF TRELLIS-CODED PARITY BITS FOR SECOND CODE OF (1/3)-CODE-RATE PCCC | 20 PARITY BYTES OF (207, 187) R-S CODE OF 4TH TYPE |
| N+6 | 187 BYTES OF TRELLIS-CODED ORDINARY 8VSB DATA | 20 PARITY BYTES OF (207, 187) R-S CODE OF 1ST TYPE |
| N+7 | 187 BYTES OF TRELLIS-CODED DATA STREAM OF (1/3)-CODE-RATE PCCC | 20 PARITY BYTES OF (207, 187) R-S CODE OF 2ND TYPE |
| N+8 | 187 BYTES OF TRELLIS-CODED PARITY BITS FOR FIRSTCODE OF (1/3)-CODE-RATE PCCC | 20 PARITY BYTES OF (207, 187) R-S CODE OF 3RD TYPE |
| N+9 | 187 BYTES OF TRELLIS-CODED PARITY BITS FOR SECOND CODE OF (1/3)-CODE-RATE PCCC | 20 PARITY BYTES OF (207, 187) R-S CODE OF 4TH TYPE |
| N+10 | 187 BYTES OF TRELLIS-CODED ORDINARY 8VSB DATA | 20 PARITY BYTES OF (207, 187) R-S CODE OF 1ST TYPE |

Fig. 5

| 8VSB DATA SEGMENT NO. | | EACH 187-BYTE DATA PACKET HAS 187 X 8 = 1496 BITS THEREIN. |
|---|---|---|
| N | 187 BYTES OF TRELLIS-CODED DATA STREAM OF (1/3)-CODE-RATE PCCC | 20 PARITY BYTES OF (207, 187) R-S CODE OF 1ST TYPE |
| N+1 | 187 BYTES OF TRELLIS-CODED PARITY BITS FOR FIRST CODE OF (1/3)-CODE-RATE PCCC | 20 PARITY BYTES OF (207, 187) R-S CODE OF 3RD TYPE |
| N+2 | 187 BYTES OF TRELLIS-CODED PARITY BITS FOR SECOND CODE OF (1/3)-CODE-RATE PCCC | 20 PARITY BYTES OF (207, 187) R-S CODE OF 4TH TYPE |
| N+3 | 187 BYTES OF TRELLIS-CODED DATA STREAM OF (1/3)-CODE-RATE PCCC | 20 PARITY BYTES OF (207, 187) R-S CODE OF 1ST TYPE |
| N+4 | 187 BYTES OF TRELLIS-CODED PARITY BITS FOR FIRST CODE OF (1/3)-CODE-RATE PCCC | 20 PARITY BYTES OF (207, 187) R-S CODE OF 3RD TYPE |
| N+5 | 187 BYTES OF TRELLIS-CODED PARITY BITS FOR SECOND CODE OF (1/3)-CODE-RATE PCCC | 20 PARITY BYTES OF (207, 187) R-S CODE OF 4TH TYPE |
| N+6 | 187 BYTES OF TRELLIS-CODED ORDINARY 8VSB DATA | 20 PARITY BYTES OF (207, 187) R-S CODE OF 1ST TYPE |
| N+7 | 187 BYTES OF TRELLIS-CODED PARITY BITS FOR FIRST CODE OF (1/3)-CODE-RATE PCCC | 20 PARITY BYTES OF (207, 187) R-S CODE OF 3RD TYPE |
| N+8 | 187 BYTES OF TRELLIS-CODED PARITY BITS FOR SECOND CODE OF (1/3)-CODE-RATE PCCC | 20 PARITY BYTES OF (207, 187) R-S CODE OF 4TH TYPE |
| N+9 | 187 BYTES OF TRELLIS-CODED DATA STREAM OF (1/3)-CODE-RATE PCCC | 20 PARITY BYTES OF (207, 187) R-S CODE OF 1ST TYPE |
| N+10 | 187 BYTES OF TRELLIS-CODED ORDINARY 8VSB DATA | 20 PARITY BYTES OF (207, 187) R-S CODE OF 1ST TYPE |

Fig. 6

| RECODING TABLE 1 | |
| --- | --- |
| ORIGINAL NIBBLE | TRANSMITTED NIBBLE |
| 00 | 00 |
| 01 | 01 |
| 11 | 10 |
| 10 | 11 |

Fig. 7

| RECODING TABLE 2 | |
| --- | --- |
| ORIGINAL NIBBLE | TRANSMITTED NIBBLE |
| 10 | 00 |
| 00 | 01 |
| 01 | 10 |
| 11 | 11 |

Fig. 8

| RECODING TABLE 3 | |
| --- | --- |
| ORIGINAL NIBBLE | TRANSMITTED NIBBLE |
| 11 | 00 |
| 10 | 01 |
| 00 | 10 |
| 01 | 11 |

Fig. 9

| RECODING TABLE 4 | |
| --- | --- |
| ORIGINAL NIBBLE | TRANSMITTED NIBBLE |
| 01 | 00 |
| 11 | 01 |
| 10 | 10 |
| 00 | 11 |

Fig. 10

| RECODING TABLE 5 | |
|---|---|
| ORIGINAL NIBBLE | TRANSMITTED NIBBLE |
| 00 | 00 |
| 10 | 01 |
| 11 | 10 |
| 01 | 11 |

Fig. 11

| RECODING TABLE 6 | |
|---|---|
| ORIGINAL NIBBLE | TRANSMITTED NIBBLE |
| 01 | 00 |
| 00 | 01 |
| 10 | 10 |
| 11 | 11 |

Fig. 12

| RECODING TABLE 7 | |
|---|---|
| ORIGINAL NIBBLE | TRANSMITTED NIBBLE |
| 11 | 00 |
| 01 | 01 |
| 00 | 10 |
| 10 | 11 |

Fig. 13

| RECODING TABLE 8 | |
|---|---|
| ORIGINAL NIBBLE | TRANSMITTED NIBBLE |
| 10 | 00 |
| 11 | 01 |
| 01 | 10 |
| 00 | 11 |

Fig. 14

8VSB DTV SIGNALS WITH PCCC AND SUBSEQUENT TRELLIS CODING

This is a continuation of U.S. patent application Ser. No. 11/986,940 filed Nov. 27, 2007 now U.S. Pat. No. 8,065,594 under 35 U.S.C. 111(a) claiming pursuant to 35 U.S.C. 119(e)(1) benefit of the filing dates of provisional U.S. patent applications filed pursuant to 35 U.S.C. 111(b), as listed following.

Ser. No. 60/782,481 filed Nov. 28, 2006.
Ser. No. 60/937,699 filed Jun. 29, 2007.
Ser. No. 60/959,140 filed Jul. 11, 2007.
Ser. No. 60/961,941 filed Jul. 25, 2007.
Ser. No. 60/964,450 filed Aug. 13, 2007.
Ser. No. 60/966,339 filed Aug. 27, 2007.

The invention relates to digital television (DTV) signals for over-the-air broadcasting, transmitters for such broadcast DTV signals, and receivers for such broadcast DTV signals.

BACKGROUND OF THE INVENTION

The Advanced Television Systems Committee (ATSC) published a Digital Television Standard in 1995 as Document A/53, hereinafter referred to simply as "A/53" for sake of brevity. Annex D of A/53 titled "RF/Transmission Systems Characteristics" is particularly incorporated by reference into this specification. So is Section 5.6.3 titled "Specification of private data services" from Annex C of A/53. In the beginning years of the twenty-first century some in the DTV industry made efforts to provide for more robust transmission of data over broadcast DTV channels without unduly disrupting the operation of so-called "legacy" DTV receivers already in the field.

Samsung Electronics Co., Ltd. proposed introducing convolutionally coded ancillary data into adaptation fields of the 187-byte MPEG-2-compatible data packets included in the 207-byte data segments of the 8VSB DTV broadcast signals used in the United States. This scheme, called "A-VSB", was championed because the packet decoders in legacy DTV receivers simply disregard the adaptation fields of the 187-byte MPEG-2-compatible data packets containing the convolutionally coded ancillary datastream. This provides a form of backward compatibility in which those legacy DTV receivers can still receive a principal datastream transmitted in the payload fields of the 187-byte MPEG-2-compatible data packets. There is no backward compatibility in the sense that the information content in the convolutionally coded ancillary datastream can be received by legacy DTV receivers. The code rate of A-VSB is one-half the code rate of ordinary 8VSB in its less robust form or one-quarter the code rate of ordinary 8VSB in its more robust form. A-VSB uses a specially designed form of serial concatenated convolutional coding (SCCC) that incorporates the 2/3 trellis coding characteristic of 8VSB DTV signals as its inner convolutional coding. This special form of SCCC is not systematic; that is, the data do not appear in their original form in the signal resulting from the serial concatenated convolutional coding.

A-VSB confines the outer convolutional coding of the SCCC to adaptation fields in 187-byte MPEG-2-compatible data packets used in ordinary 8VSB transmissions, and the adaptation fields are ordinarily constrained to be much less than the 184 bytes the MPEG-2 standard makes available for adaptation field information. Previous proposals made to the ATSC for transmitting robust data have confined those transmissions to the 184 bytes the MPEG-2 standard makes available for payload data. The designs of the transport stream multiplexer for the transmitter is complex in these prior-art proposals, and broadcast studio practice is complicated. If MPEG-2-compatible data packets are used as the primary vehicle for data transmissions, they need to be accompanied by parity information that can ascertain whether the packets have been accurately recovered at the DTV receiver.

The (207, 187) Reed-Solomon forward-error-correction coding specified by A/53 is one way to generate that parity information, and so entire (207, 187) R-S FEC codewords may be robustly coded. It is cumbersome to pack (207, 187) R-S FEC codewords transmitted at 1/2, 1/3, 1/4 or 1/5 ordinary code rate into less than whole 207-byte data segments. However, it is less cumbersome if the number of bytes in the windows is a submultiple of 207, such as nine or twenty-three.

Proponents of robust data transmissions have in the past feared transmitting robust data in all 207 bytes of 8VSB data segments for fear legacy DTV receivers would mistake the data segments for correct or correctable (207, 187) Reed-Solomon codewords. The Reed-Solomon error-correction decoding circuitry in a legacy DTV receiver supposedly would then dispense incorrect 187-byte video data packets to the MPEG-2 decoder and incorrect 187-byte audio data packets to the AC-3 decoder. This is a mischaracterization of the actual legacy receiver problem.

At least eleven of the 207 bytes of a (207, 187) R-S FEC codeword have to disagree with the other bytes for the codeword to be found to contain uncorrectable error. The chance of all eight bits in one byte not being considered to be in error is one in two raised to the eighth power—i.e., one chance in 256. The chance for none of the bits in eleven 8-bit bytes being considered to be in error is one chance in 256 raised to the eleventh power, which is to say one chance in two raised to the eighty-eighth power or one chance in 524 288. So there is one chance in 524 288 that a randomly generated 207-byte segment will be found to be a correct or correctable (207, 187) R-S FEC codeword. (An important point here is that there are 524 287 times more 207-byte data segments that are not correct or correctable R-S FEC codewords than are; this is why the R-S FEC coding is as powerful as it is.) There is a one in two chance the transmitted "TEI bit" will be a ONE rather than a ZERO. This reduces the chance of a randomly generated 207-byte segment being found to be a correct or correctable (207, 187) R-S FEC codeword to one in 1,048,576. If it is still found to be a correct or correctable (207, 187) R-S FEC codeword, the segment will have to include a packet identification (PID) of interest at the time. The probability of this is a small multiple of one in two raised to the thirteen power since the PID has 13 bits. This reduces the possibility of a legacy receiver finding a randomly generated 207-byte segment to be useful to somewhere around one in 4,294,967,296. Once in 6,882,960 data frames. Once every 5736 minutes or so. Once about every four days on average.

The actual concern, then, is not that legacy DTV receivers mistake the data segments for correct or correctable (207, 187) Reed-Solomon codewords. The actual concern is that legacy DTV receivers from one principal manufacturer were designed to evaluate whether DTV reception was acceptably good in response to their Reed-Solomon decoders finding more than a specified number of segments in a data field to be correct or correctable (207, 187) Reed-Solomon codewords. If these particular legacy DTV receivers find fewer than this number of correct or correctable (207, 187) Reed-Solomon codewords in data fields, they infer lack of signal-to-noise ratio high enough for acceptable DTV reception and discontinue normal operation. To accommodate this egregious design error robust transmissions may be confined to 187-byte data segments that are subsequently (207, 187) Reed- Solomon forward-error-correction coded, convolutionally byte interleaved and 2/3 trellis coded.

In DTV receivers specifically designed for receiving robust transmissions, the parity information used to ascertain whether the packets have been accurately recovered at the DTV receiver may be the parity information generated by robustly coding the 187-byte MPEG-2-compatible data packets, rather than being generated by Reed-Solomon coding. It is cumbersome to pack 187-byte MPEG-2-compatible data packets transmitted at 1/2, 1/3, 1/4 or 1/5 ordinary code rate into windows smaller than 187 bytes per data segment. However, it is less cumbersome if the number of bytes in the windows is a submultiple of 187, such as eleven or seventeen.

Parallel concatenated convolutional coding PCCC that reduces code rate to one-third the original code rate is well known in general to the prior art. Such code rate reduction was characteristic of the turbo codes as originally propounded by Berrou, Glavieux and Thitimajshima in their paper "Near Shannon Limit Error-correcting Coding and Decoding: Turbo-codes" published in the 1993 Proceedings of IEEE International Communications Conference. The Universal Mobile Telecommunications System (UMTS), one of the two most widely adopted third-generation cellular standards, employs turbo coding that reduces code rate by a factor close to three. These turbo codes each comprise three parts similar to each other in size: (1) the original data, (2) parity information developed by first convolutional coding of the original data and (3) further parity information developed by second convolutional coding of the original data. In these turbo codes the original data is interleaved differently during the second convolutional coding than during the first convolutional coding, with the respective interleaving preferably being as random as possible. The other most widely adopted third-generation cellular standard cdma2000 uses different interleaving than UMTS and employs turbo coding that reduces code rate by a factor close to five. Punctured forms of cdma2000 reduce code rate by factors of two, three or four.

The inventor observed that PCCC is more robust than simple outer convolutional coding. This observation enabled him to discern that serially concatenating PCCC with 2/3 trellis coding should provide a more robust form of 8VSB DTV broadcasting likely to be preferable to SCCC that serially concatenates simple outer convolutional coding with 2/3 trellis coding as inner convolutional coding. Field testing of A-VSB has subsequently confirmed that reception of the half-code-rate format is substantially inferior to reception of the quarter-code-rate format. This undermines a basic reason for considering SCCC that serially concatenates simple outer convolutional coding with 2/3 trellis coding as inner convolutional coding—namely, lower reduction in code rate than possible with PCCC that does not use puncturing. PCCC that reduces code rate by a factor of three will be preferable to the outer convolutional coding of A-VSB that reduces code rate by a factor of four, if reception is at least almost as good. When PCC is considered by itself, it is known that PCCC that reduces code rate by a factor of three brings one close to Shannon limit and further reductions of code rate provide smaller improvements in approaching that limit. In view of this known fact the inventor has guessed that PCCC that reduces code rate by a factor of three will, when concatenated with 2/3 trellis coding, secure performance in an AWGN channel that is close enough to optimal not to justify further reduction in code rate.

The inventor discerned that systematic turbo coding that reduces code rate to a fraction of the original code rate while retaining the original form of data packets is of especial interest to 8VSB DTV broadcasting. Such systematic turbo coding can provide the broadcaster with the option of transmitting 187-byte MPEG-2-compatible data packets of original data in (207, 187) R-S FEC codewords that can be usefully received by legacy DTV receivers. If code rate is reduced to one-third the original code rate, for example, these (207, 187) R-S FEC codewords can occupy 104 of the 312 segments of a data field with the remaining 208 data segments being occupied by parity information for the turbo coding. Two standard-definition digital television (SDTV) signals can be continuously robustly transmitted in this manner without disenfranchising legacy receivers. Insofar as theoretical throughput capability is concerned, this compares favorably with A-VSB robustly transmitting the same DTV signal at one-half ordinary code rate and is also contemporaneously transmitted by ordinary 8VSB at full code rate. The turbo coding that reduces code rate by three is financially advantageous when the same copyrighted information is transmitted robustly as well as to legacy receivers. This is because copyrighted information is transmitted once by the broadcaster, rather than twice, which may reduce the copyright royalties to be paid by the broadcaster. Even when copyright royalties are not in issue, the turbo coding that reduces code rate by three is financially advantageous when the same information is transmitted robustly as well as to legacy receivers. This is because broadcasters are required to pay spectrum usage fees for ancillary transmissions that can in no part be usefully received by legacy DTV receivers.

In 2007 Samsung engineers proposed adapting their A-VSB transmission system for mobile reception by DTV receivers that are carried by fast-moving vehicles such as automobiles, buses or railroad passenger cars. Such reception is disrupted by momentary "deep fades" or drop-outs in received signal strength as the vehicle moves through underpasses or passes large buildings blocking the transmission path. To help a mobile DTV receiver withstand these momentary drop-outs, the Samsung engineers introduced an outer byte interleaver after the encoder used to generate the (207, 187) R-S FEC codewords supplied for serial concatenated convolutional coding. This outer byte interleaver spread the successive bytes of each (207, 187) R-S FEC codeword apart so far that fewer of them would be lost during a momentary drop-out. Hopefully, so few bytes would be lost in each (207, 187) R-S FEC codeword that the Reed-Solomon decoding apparatus in a DTV receiver designed for mobile reception would be able to correct the codeword and restore the missing bytes.

The inventor perceived that the Samsung proposal had a basic flaw in regard to a DTV receiver designed for mobile reception of turbo coded DTV signals. Turbo coding primarily benefits the AWGN performance of a receiver. Much of the improvement in the AWGN performance of a receiver at low signal-to-noise ratios (SNR) derives from iteration of the turbo decoding procedures. Reed-Solomon forward-error-correction coding the data to be turbo coded has been considered previously for improving the ability of the receiver to withstand burst error as well. However, the inventor perceived that R-S FEC coding has a further advantage in that R-S decoding can be used to determine when iteration of turbo decoding procedures allows the R-S decoding to restore the data in the transmitted R-S FEC codeword to its original form. The iteration of the turbo decoding procedures can be discontinued for that data, thus to conserve the power that would otherwise be consumed by further iteration. Keeping power consumption of the DTV receiver low is a major design concern, especially for receivers to be sold in California, which has stringent limitations on power consumption in consumer devices.

The outer byte interleaver that Samsung engineers introduced between R-S FEC coding and turbo coding in the DTV transmitter requires a matching outer byte de-interleaver between turbo decoding and outer R-S decoding in the DTV receiver. This outer byte de-interleaver has such long latent delay associated with it that feedback from the outer R-S decoding is generated too late for timely shutting down iteration of turbo decoding procedures. The inventor concluded that the outer byte interleaving in the DTV transmitter should be done after both R-S FEC coding and turbo coding are completed.

The inventor reasoned that this would permit re-positioning the outer byte de-interleaver to precede the cascade connection of turbo and outer R-S decoders in a DTV receiver, supposing that outer R-S decoder was to feed back control information to the turbo decoder. This placement does not facilitate the 2/3 trellis decoder being included within the turbo decoding apparatus as Samsung engineers do in A-VSB, however. The 2/3 trellis decoding has to be considered to be a preliminary decoding procedure that is serially concatenated with the subsequent turbo decoding procedure. This observation led the inventor to contemplate outer de-interleaving being done after 2/3 trellis decoding, convolutional byte de-interleaving, decoding of (207,187) R-S FEC coding and data de-randomization were performed as prescribed by A/53. Turbo decoding would then follow the outer de-interleaving. A convenient feature of this arrangement is that de-randomization is completed before iterative turbo decoding and is done at a point in the system where the time base is well defined. The soft-decision information associated with the preliminary 2/3 trellis decoding procedure can be passed along to the subsequent turbo decoding procedure even though there are intervening steps of data randomization, de-interleaving, and possibly symbol re-coding. The turbo coding can use parallel concatenated turbo code, already proven in wireless communications, which would constrain code rate to being no greater than one-third that of ordinary 8VSB.

In the A-VSB system the tail bits of the turbo code encoding procedures are discarded. Preserving the tail bits of the turbo code encoding procedures improves decoding performance at low SNR by facilitating sweeps through the trellis in reverse direction as well as forward direction. This tends to reduce the number of iterations required for correcting bit errors, so decoding can proceed at slower speeds and consume less power. This also facilitates forward-backward turbo decoding algorithms correcting bit errors in both initial and final portions of a turbo codeword that are separated by burst error resulting from a protracted deep fade. Correcting the bit errors caused by AWGN in the initial and final portions of a turbo codeword thus corrupted increases the chances of being able to correct the recovered data by subsequent R-S decoding procedures. That is, the forward-backward turbo decoding algorithms can work from both ends of a turbo codeword to attempt to close the extent of a burst error that the subsequent R-S decoding procedure must then attempt to overcome.

Part of the A-VSB system proposed by Samsung engineers concerns supplemental training signals being interspersed throughout transmitted fields of trellis-coded data. These supplemental training signals are introduced as private data within adaptation fields of successive MPEG-2 compatible packets, including those packets that are involved in ordinary 8VSB transmissions as well as the null packets that are employed for A-VSB turbo code transmissions. These supplemental training signals were touted as being necessary for adaptive equalization being able to track the fast-changing dynamic multipath reception conditions encountered in mobile reception. Most current DTV receiver designs use forms of adaptive equalization that rely on incremental auto-regression techniques of one sort or other. They usually combine elements of the Wiener technique, which relies on training signal for developing error signals to adjust equalization, and the Kalman technique, which develops error signals to adjust equalization from ordinary data symbols. Because these adaptive equalization techniques use incremental feedback adjustments, they are inherently slow, Kalman-type auto-regression techniques generally being slower than the Wiener-type auto-regression techniques that rely on training signal. Supplemental training signals support somewhat faster tracking of rapidly changing multipath reception conditions in adaptive equalization techniques that use incremental feedback adjustments.

In another technique, attributable to Dr. J. Douglas McDonald, the channel impulse response (CIR) is computed by auto-correlating a sliding window 4096 symbols wide. Computation of the CIR is done using discrete Fourier transform, or DFT. Incidentally, this facilitates initial frequency-domain equalization in a DTV receiver to whiten the channel frequency response. Each computation of CIR can be made very quickly. If multipath conditions are slow-changing, the CIR computations can be averaged over longer time periods to improve accuracy of the equalization. If multipath conditions change rapidly, however, the averaging can be curtailed to speed up equalization adjustment much more than possible with Kalman-type or Wiener-type auto-regression techniques or variants of those techniques. The bottom line is that the data-randomized 8VSB signal contains enough information to implement adaptive equalization even when multipath conditions change rapidly without need for additional training signals.

Accordingly, the transmission of turbo coding in the adaptation fields of MPEG-2-compatible null packets following several bytes of supplemental training signal per A-VSB unnecessarily costs code overhead. A better procedure is to pack turbo coding into the entire 184-byte payload-data fields of MPEG-2-compatible null packets. A special PID could be established to identify the packets having their payload-data fields packed with turbo coding, of course, rather than null packets being used.

The inventor initially considered turbo coding (207, 187) R-S FEC codewords individually, so the internal bit interleaver in the turbo code encoder would have to permute 207×8=1656 bits in each resulting data segment. However, he considered whether higher interleaver gains could be fitted into the 8VSB signal. The inventor observed that eight (207, 187) R-S FEC codewords fit exactly into nine 184-byte payload-data fields, which suggested to him that the input signal to the turbo code encoder could conveniently be parsed into blocks of 207×8×8=184×9×8=13,248 bits. This sets a size for the internal bit interleaver that is within the capability of bit interleaver designs currently used in turbo code encoders for wireless telephony. Presuming the turbo code encoder to use two recursive systematic convolutional code encoders that are parallel concatenated, each block of input signal consisting of 13,248 bits generates a respective turbo codeword consisting of 3×13,248+12=39,756 bits. The twelve additional bits are turbo code tail bits.

In A-VSB the tail bits associated with turbo codewords are discarded before packing into the adaptation fields of MPEG-2-compatible data packets. It is preferable to transmit the tail bits associated with turbo codewords, however. The tail bits improve forward and back decoding procedures for turbo codewords, particularly when reverse sweeping through the trellises. The improved decoding of each turbo codeword tends to reduce the number of times the forward and back decoding procedures need be iterated to obtain satisfactory bit error rate for low-SNR AWGN reception conditions. This furthers the primary objective of the invention to reduce the power consumed by the receiver during decoding of turbo code.

Furthermore, improving the capability to reverse sweep through the trellises helps to overcome drop-outs in signal strength that occur during the mid portions of turbo codewords. The portion of the turbo codeword occurring after the deep fade is more quickly decoded. Accordingly, a sufficient amount of the R-S FEC codeword to permit its correction is likely to be earlier available. The correction of the R-S FEC codeword restores the data lost because of the deep fade.

The inventor discerned that the successive bytes of turbo codewords should be transversely disposed relative to the payload-data fields of the MPEG-2 compatible packets they are packed into before being time-division multiplexed with other MPEG-2 compatible packets to form data fields. The MPEG-2 compatible packet in these data fields are provided with inner (207, 187) R-S FEC coding and subjected to inner byte interleaving, with the resulting data then being encoded with 12-phase 2/3 trellis code. The inner byte interleaving is of a convolutional type that spreads the bytes in each inner (207, 187) R-S FEC codeword to be 52 byte intervals apart. Because the inner byte interleaving is of convolutional type, there are periodic snaps back in time of 51 data segment intervals.

If the bytes of turbo codewords are interleaved correctly, then each byte of a turbo codeword occupies the same position within the payload-data field of a respective MPEG-2 compatible packet and the inner (207, 187) R-S FEC codeword generated therefrom as the other bytes of that turbo codeword. So, the inner byte interleaving shifts all the bytes of each turbo codeword by the same amount in time, and the intervals between successive block-interleaved bytes remain alike. Accordingly, the convolutional inner byte interleaving does not affect a turbo-coded outer R-S FEC codeword, the bytes of which are block-interleaved, so as to alter the capability of that codeword to overcome a deep fade.

Positioning codewords transversely across the payload-data fields of MPEG-2 compatible packets transmitted by 8VSB has other advantages. There is no need to constrain the length(s) of codewords, so that each will fit exactly within the 184-byte width of a respective payload-data field, or so that a whole number of codewords will fit exactly within a reasonably small multiple of that 184-byte width. Also, there need be no concern that coding artifacts will appear to be echoes to the adaptive equalization filtering in DTV receivers. There are fewer, if any, constraints as to how data segments containing other 8VSB signals are time-division multiplexed with the data segments containing turbo coding. The inventor noted that transverse interleaving by the outer byte interleaver results in the inner and outer R-S coding being cross-interleaved, and so essentially comprising cross-interleaved Reed-Solomon codes (CIRC). This holds out the possibility that CIRC techniques might eventually be found to be of use in difficult decoding situations.

The inventor spent some time seeking a technique to construct outer interleavers that would position codewords transversely across the payload-data fields of MPEG-2 compatible packets and could also overcome deep fades lasting as long as a second. Convolutional interleaver designs that he initially attempted required very large numbers of temporary storage locations in memory, leading him to consider block interleaver designs and combinations of convolutional and block interleaver designs. None of these designs were completely satisfactory, so he conducted a thorough search of patents to interleavers. He found a type of block interleaver described generally in U.S. Pat. No. 5,907,560 issued 25 May 1999 to P. M. P. Spruyt and titled "Method for interleaving data frames, forward error correcting device and modulator including such a device" that could be adapted to provide the desired outer byte interleavers. The required number of temporary storage locations in memory were substantially lower than in the byte interleaver design inspired by the Spruyt patent than other interleaver designs the inventor had considered. Analysis of the interleaver problem working back from knowledge of these various interleaver designs seemed to indicate that the number of temporary byte-storage locations in memory could not be further reduced.

During the course of his work the inventor discerned that the placement of bytes of the turbo coding within the turbo codewords supplied for outer byte interleaving was crucial in securing best performance of the R-S FEC coding in overcoming deep fades. Bytes of the parity bits associated with each byte of data should be closely grouped with that byte of data in the turbo codeword supplied for outer byte interleaving by Spruyt's method. This minimizes the amount of the turbo codeword that a deep fade renders unfit for turbo decoding. More of the turbo codeword survives for turbo decoding. Turbo decoding in the forward direction from the beginning of the codeword can recover more data from the initial surviving portion of the codeword than otherwise possible. Turbo decoding in the reverse direction from the conclusion of the codeword can recover more data from the final surviving portion of the codeword than otherwise possible. Accordingly, the hiatus in data that decoding of the R-S FEC coding must correct for is kept as small as possible.

Another known technique for overcoming fading is called "staggercasting", a variant of which Thomson, Inc. has proposed be used in robust 8VSB transmissions. Staggercasting communications systems transmit a composite signal including two component content-representative signals, one of which is delayed with respect to the other. The composite signal is broadcast to one or more receivers through a communications channel. At a receiver, delayed response to the earlier transmitted component content-representative signal supplied from a buffer memory is contemporaneous in time with the later transmitted component content-representative signal. Under normal conditions, the receiver detects and reproduces the content of the later transmitted signal as soon as it is received. However, if a deep fade occurs, then the receiver detects and reproduces the content of the earlier transmitted signal as read from buffer memory. If the delay period and the associated delay buffer are large enough, then fairly long deep fades can be overcome. This capability not only requires a several fold increase in the amount of memory required in a receiver; it halves the effective code rate of the transmission.

The inventor perceived that the processing of soft decisions in turbo decoding allows a more sophisticated approach to be taken for the reception of staggercasting. Soft decisions concerning the contents of an earlier transmitted turbo codeword and concerning the contents of a later transmitted repeat of the earlier transmitted turbo codeword can be analyzed for selecting which of corresponding portions of the two turbo codewords as received is more likely to be correct. The selection procedure can synthesize a turbo codeword that is more likely to be correct than either of the turbo codewords from which the parts of the synthesized turbo codeword are drawn. The synthesized turbo codeword can then be subjected to turbo decoding and R-S decoding procedures.

The inventor discerned that this synthesis procedure can provide more than a tenfold increase in the capability of the turbo coding to withstand dropouts in received signal strength with only a doubling of receiver memory. This is accomplished by using a novel form of iterative-diversity transmissions or "staggercasting" in which each successive turbo codeword is immediately repeated in its transmission.

SUMMARY OF THE INVENTION

The invention concerns parallel concatenated convolutional coding of 187-byte MPEG-2-compatible data packets that are (207, 187) Reed-Solomon forward-error-correction coded for use in digital television broadcasting. The parallel concatenated convolutional codes (PCCCs) are included in segments of data fields which segments are convolutionally byte interleaved, 2/3 trellis coded and mapped into an 8VSB signal. Aspects of the invention are transmitter apparatus and receiver apparatus for accommodating the parallel concatenated convolutional coding.

A further aspect of the invention is a digital television signal in which parallel concatenated convolutionally coded Reed-Solomon codewords are subjected to supplemental outer interleaving after parallel concatenated convolutional coding, rather than before, to improve the capability of the Reed-Solomon coding to overcome deep fades. Other aspects of the invention concern DTV receiver apparatuses for such digital television signal. In these DTV receiver apparatuses outer de-interleaving precedes turbo decoding and Reed-Solomon decoding procedures, so the results of the R-S decoding procedures can be fed back without appreciable delay for regulating iteration of the turbo decoding procedures. Still other aspects of the invention concern DTV transmitter apparatuses in which turbo coded Reed-Solomon codewords are subjected to supplemental outer interleaving after parallel concatenated convolutional coding. Preferably, the PCCC words are transversely disposed in regard to the MPEG-2-compatible data packets used to contain them.

Still further aspects of the invention concern the use of novel forms of iterative-diversity transmissions or "staggercasting" further to improve the capability of the parallel concatenated convolutional coding to overcome deep fades. One of these further aspects of invention concerns "punctured" staggercasting of turbo codewords in which only the data components of turbo codewords are twice transmitted, so code rate is reduced by a smaller factor.

BRIEF DESCRIPTION OF THE DRAWING FIGS.

FIG. 2 is a diagram of successive 207-byte data segments generated within the FIG. 1 transmitter apparatus when the turbo coded data segments are transmitted so the information contained therein cannot be usefully received by legacy DTV receivers.

FIG. 3 is a diagram of successive 207-byte data segments generated within the FIG. 1 transmitter apparatus when the turbo coded data segments are transmitted so the information contained therein can be usefully received by legacy DTV receivers.

FIG. 5 is a diagram of successive 207-byte data segments generated within the FIG. 4 transmitter apparatus when the data packets turbo coded using PCCC are transmitted so the information contained therein cannot be usefully received by legacy DTV receivers.

FIG. 6 is a diagram of successive 207-byte data segments generated within the FIG. 4 transmitter apparatus when the data packets turbo coded using PCCC are transmitted so the information contained therein can be usefully received by legacy DTV receivers.

FIGS. 7 through 14 are tables of different forms of recoding that are used in respective embodiments of the FIG. 1 transmitter apparatus and in respective embodiments of that transmitter apparatus modified in accordance with FIG. 4.

Connections for control signals are depicted using dashed lines.

DETAILED DESCRIPTION

Figure 1:
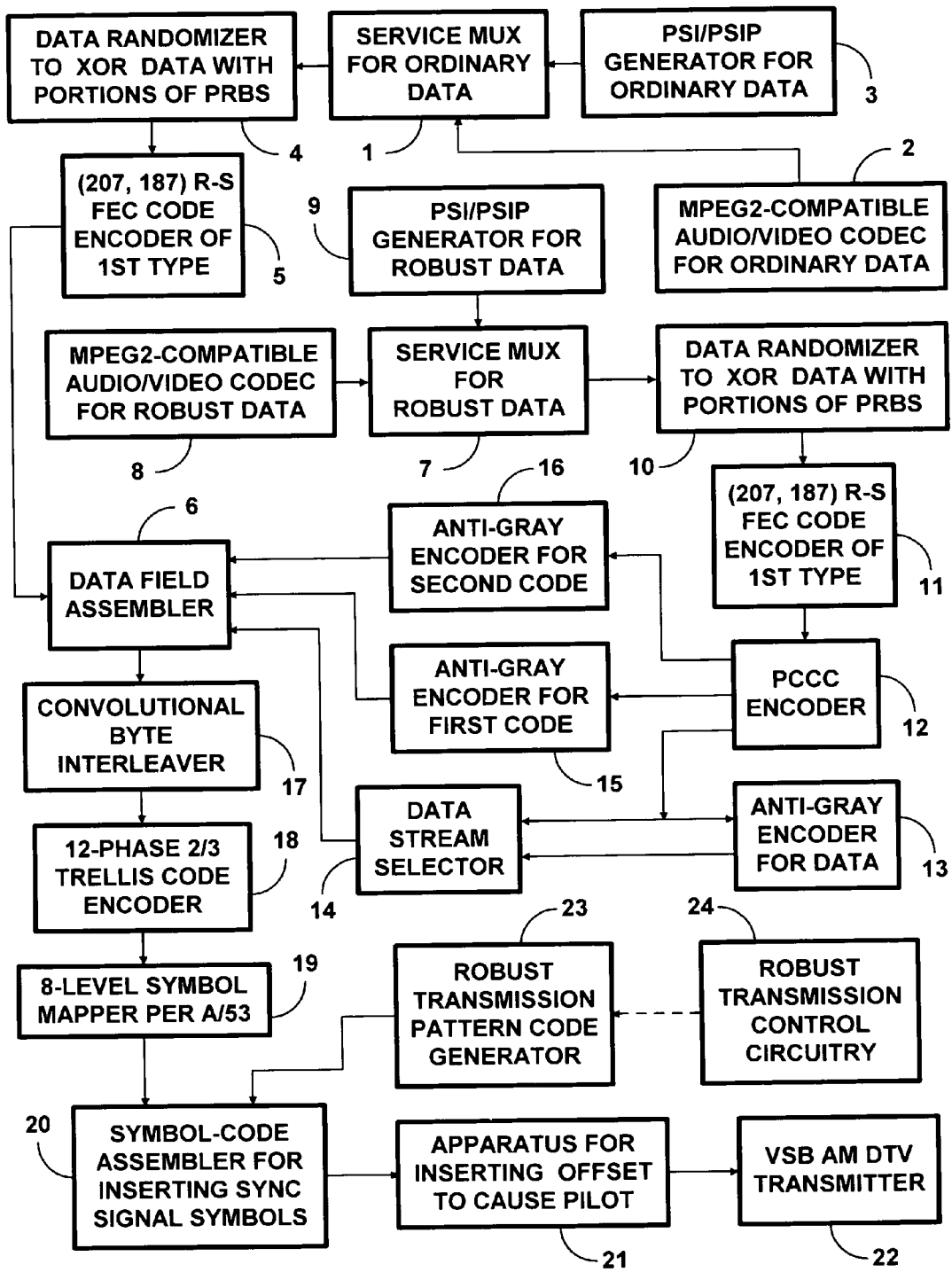
FIG. 1 is a general schematic diagram of transmitter apparatus for broadcast DTV signals, which transmitter apparatus in accordance with an aspect of the invention turbo codes 207-byte data segments using PCCC.

FIG. 1 depicts a service multiplexer 1 for ordinary 8VSB data. The service multiplexer 1 is connected for time-division multiplexing 187-byte MPEG-2-compatible data packets from an audio/video codec 2 and from a PSI/PSIP generator 3, which codec 2 and PSI/PSIP generator 3 are associated with the transmission of ordinary 8VSB data. (PSIP and PSI are acronyms for "Program Specific Information" and for "Program and System Information Protocol", respectively.) The service multiplexer 1 is further connected for applying the time-division multiplexed MPEG-2-compatible data packets to a data randomizer 4 to be exclusive-ORed with portions of a pseudo-random binary sequence (PRBS) prescribed in A/53, Annex D, §4.2.2 titled "Data randomizer". The data randomizer 4 is connected for supplying the resulting randomized 187-byte MPEG-2-compatible data packets to an encoder 5 for (207, 187) Reed-Solomon forward-error-correction coding of a first type, as prescribed in A/53, Annex D, §4.2.3 titled "Reed-Solomon encoder". The encoder 5 is connected for supplying the resulting 207-byte R-S FEC codewords to a first input port of a data field assembler 6 that assembles data fields 207-byte data segment by 207-byte data segment.

FIG. 1 depicts a service multiplexer 7 for robust data. The service multiplexer 7 is connected for time-division multiplexing MPEG-2-compatible data packets from an audio/video codec 8 and from a PSI/PSIP generator 9, which codec 8 and PSI/PSIP generator 9 are associated with the transmission of robust data that are turbo coded. (In regard to the PSI/PSIP generators 3 and 9, the acronym PSI stands for Programme Specification Information, and the acronym PSIP stands for Program and System Information Protocol.) The service multiplexer 7 is further connected for applying the time-division multiplexed MPEG-2-compatible data packets to a data randomizer 10 to be exclusive-ORed with portions of the PRBS prescribed in A/53, Annex D, §4.2.2. The data randomizer 10 is connected for supplying the randomized 187-byte MPEG-2-compatible data packets to an encoder 11 for (207, 187) Reed-Solomon forward-error-correction coding of the first type prescribed in A/53, Annex D, §4.2.3. This (207, 187) R-S FEC coding will be utilized by DTV receivers of the sorts shown in FIGS. 15 and 16 to determine when the decoding of PCCC coding regenerates one of the MPEG-2-compatible data packets from the audio/video codec 8 or from the PSI/PSIP generator 9. The encoder 11 is connected for supplying the (207, 187) R-S FEC codewords that it generates to a PCCC encoder 12 to be parallel concatenated convolutional coded.

The PCCC encoder 12 is connected for reproducing the (207, 187) R-S FEC codewords that it receives in a data stream, for supplying that data stream as the input signal to an anti-Gray encoder 13 for 2-bit data nibbles, and for supplying that data stream as a first input signal to a data stream selector 14. The data stream selector 14 is connected for receiving the response of the anti-Gray encoder 13 as a second input signal and for reproducing a selected one of its first and second input signals for application to a second input port of the data field assembler 6. The PCCC encoder 12 is connected for supplying parity bits from its first convolutional coding to an anti-Gray encoder 15 for 2-bit nibbles that is connected for supplying 207-byte segments of its response to a third input port of the data field assembler 6. The PCCC encoder 12 is connected for supplying parity bits from its second convolutional coding to an anti-Gray encoder 16 for 2-bit data nibbles that is connected for supplying 207-byte segments of its response to a fourth input port of the data field assembler 6. The PCCC encoder 12 can resemble that used in UMTS, and it is convenient to make the interleaver therein capable of scrambling 1656, 3312 or 4968 bits. Tail bits can be discarded.

The output port of the data field assembler 6 is connected for supplying 207-byte data segments to a convolutional byte interleaver 17 of the sort described in A/53, Annex D, §4.2.4 titled "Interleaving". The convolutional byte interleaver 17 is connected to supply the convolutionally interleaved bytes of the (207, 187) R-S FEC codewords to a 12-phase encoder 18 for 2/3 trellis code. The 12-phase encoder 18 supplies groups of three bits to an 8-level symbol mapper 19 as described in A/53, Annex D, §4.2.5, which 8-level symbol mapper 19 is customarily constructed using read-only memory (ROM). The 12-phase encoder 18 differs from that described in A/53, Annex D, §4.2.5 titled "Trellis coding" in that the most significant bits of those 3-bit symbols are not precoded. The practice of precoding the most significant bits of those 3-bit symbols was done to facilitate NTSC-rejection filtering in DTV receivers and is no longer necessary after the cessation of NTSC broadcasting. Furthermore, the precoding procedure tends to reduce the weight of PCCC words, which undesirably reduces the effectiveness of turbo decoding procedures. The mapper 19 is connected to supply 8-level symbols to a symbol code assembler 20 which inserts data segment synchronization (DSS) symbols and data field synchronization (DFS) symbols into the symbol stream before it is supplied to apparatus 21. The apparatus 21 combines the symbols with an offset to supply digital modulating signal to a vestigial-sideband amplitude-modulation (VSB AM) transmitter 22 for DTV signal. Subsequent to the data field assembler 6, other than not precoding the most significant bits of 3-bit symbols, the only difference from the transmitter practice prescribed by A/53 Annex D is the following. The reserved section of the DFS signal at the beginning of each data field contains a code sequence specifying the pattern of the robust (PCCC) transmission in at least that field. FIG. 1 shows an encoder 23 connected for supplying these code sequences to the symbol code assembler 20 responsive to control information from robust transmission control circuitry 24.

The robust transmission control circuitry 24 controls many operations throughout the FIG. 1 transmitter apparatus. Circuitry 24 schedules assembly of data fields in the data field assembler 6, although the connections for conveying control signals from the robust transmission control circuitry 24 to the data field assembler 6 are not explicitly shown in FIG. 1. The robust transmission control circuitry 24 also controls the data stream selector 14, although the connections for conveying control signals from the robust transmission control circuitry 24 to the data stream selector 14 are not explicitly shown in FIG. 1.

The data stream selector 14 is conditioned to reproduce the response of the anti-Gray encoder 13 for application to the data field assembler 6 when the PCCC data segments are transmitted so the information contained therein cannot be usefully received by legacy digital television receivers. FIG. 2 depicts successive 207-byte data segments that, by way of example, might then subsequently flow from the data field assembler 6. The depicted consecutive data segments are consecutively numbered Nth through (N+10)th. The Nth, (N+1)th and (N+2)th data segments consist of a segment of the data component of the PCCC, a segment of parity bits from the first convolutional coding of that segment of the data component of the PCCC, and a segment of parity bits from the second convolutional coding of that segment of the data component of the PCCC. The (N+3)th, (N+4)th and (N+5)th data segments consist of a subsequent segment of the data component of the PCCC, a segment of parity bits from the first convolutional coding of that subsequent segment of the data component of the PCCC, and a segment of parity bits from the second convolutional coding of that subsequent segment of the data component of the PCCC. The (N+7)th, (N+8)th and (N+9)th data segments consist of a still later segment of the data component of the PCCC, a segment of parity bits from the first convolutional coding of that still later segment of the data component of the PCCC, and a segment of parity bits from the second convolutional coding of that still later segment of the data component of the PCCC. The (N+6)th and (N+10)th data segments each consist of a 187-byte MPEG-2-compatible data packet followed by twenty parity bytes for (207, 187) R-S FEC coding of the first type, as described in A/53, Annex D, §4.2.5.

The data stream selector 14 is conditioned to reproduce the data stream supplied directly from the PCCC encoder 12, for application to the data field assembler 6 when the parallel concatenated convolutionally coded data segments are transmitted so the information contained therein can be usefully received by legacy digital television receivers. FIG. 3 depicts successive 207-byte data segments that, by way of example, might then subsequently flow from the data field assembler 6. The flow depicted in FIG. 3 differs from that depicted in FIG. 2 in that the Nth, (N+4)th and (N+7)th segments of the data component of the PCCC each consist of a 187-byte MPEG-2-compatible data packet followed by twenty parity bytes for (207, 187) R-S FEC coding of the first type.

Figure 4:
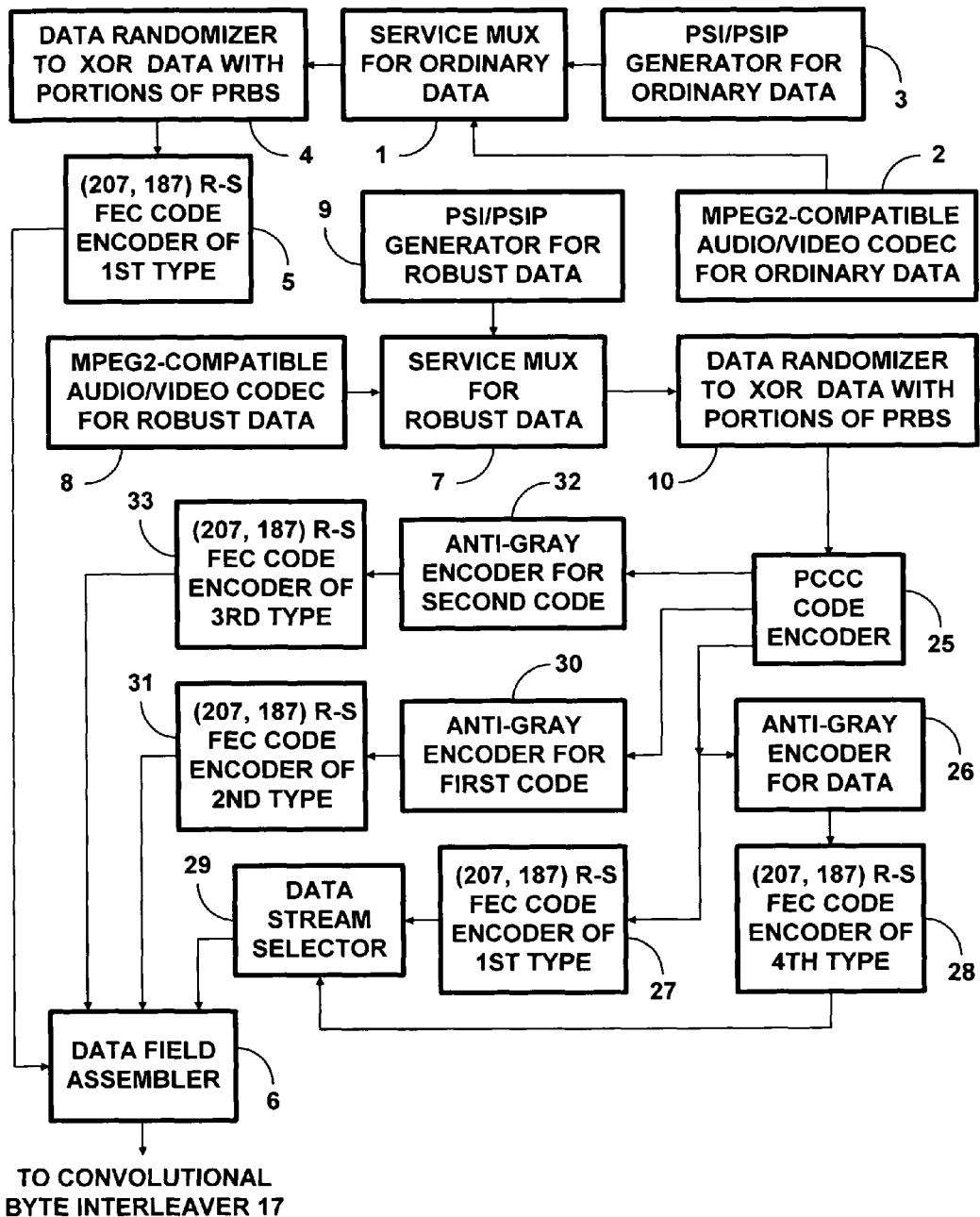
FIG. 4 is a general schematic diagram of modifications made to the FIG. 1 transmitter apparatus for broadcast DTV signals, which modification in accordance with another aspect of the invention turbo codes 187-byte data packets using PCCC.

FIG. 4 shows modifications made to the FIG. 1 transmitter apparatus for turbo coding 187-byte data packets, rather than entire 207-byte data segments. FIG. 4 like FIG. 1 depicts the service multiplexer 1 for ordinary 8VSB data connected for time-division multiplexing 187-byte MPEG-2-compatible data packets from the audio/video codec 2 and from the PSI/PSIP generator 3. The service multiplexer 1 is further connected for applying the time-division multiplexed MPEG-2-compatible data packets to the data randomizer 4 to be exclusive-ORed with portions of the PRBS. The data randomizer 4 is connected for supplying the resulting randomized 187-byte MPEG-2-compatible data packets to the encoder 5 for (207, 187) Reed-Solomon forward-error-correction coding of a first type. This first type of (207, 187) R-S FEC coding prescribed by A/53, a second type of (207, 187) R-S FEC coding, a third type of (207, 187) R-S FEC coding, and a fourth type of (207, 187) R-S FEC coding are each orthogonal to each of the other types. The encoder 5 is connected for supplying the 207-byte R-S FEC codewords it generates to a first input port of the data field assembler 6 that assembles data fields, 207-byte data segment by 207-byte data segment.

FIG. 4 like FIG. 1 depicts the service multiplexer 7 connected for time-division multiplexing MPEG-2-compatible data packets from the audio/video codec 8 and from the PSI/PSIP generator 9. The service multiplexer 7 is further connected for applying the time-division multiplexed MPEG-2-compatible data packets to the data randomizer 10 to be exclusive-ORed with portions of the PRBS. The data randomizer 10 is connected for supplying the randomized data packets it generates to a PCCC encoder 25 for turbo coding.

The PCCC encoder 25 is connected for reproducing the MPEG-2-compatible data packets that it receives in a data stream, for supplying that data stream as the input signal to an anti-Gray encoder 26 for 2-bit data nibbles, and for supplying that data stream as the input signal to an encoder 27 for (207, 187) Reed-Solomon forward-error-correction coding of the first type. The anti-Gray encoder 26 is connected for supplying its response to an encoder 28 for a second type of (207, 187) R-S FEC coding. The first type of (207, 187) R-S FEC coding prescribed by and also to both third and fourth type of (207, 187) R-S FEC coding. A data stream selector 29 is connected for receiving as a first input signal the (207, 187) R-S FEC codewords of first type that the encoder 27 generates and for receiving as a second input signal the (207, 187) R-S FEC codewords of second type that the encoder 28 generates. The data stream selector 29 is further connected for reproducing a selected one of its first and second input signals for application to the second input port of the data field assembler 6.

The PCCC encoder 25 is connected for supplying parity bits from its first convolutional coding to an anti-Gray encoder 30 for 2-bit nibbles that is connected for supplying 187-byte segments of its response to an encoder 31 for the third type of (207, 187) R-S FEC coding. The encoder 31 is connected for supplying (207, 187) R-S FEC codewords of the third type to the third input port of the data field assembler 6. The PCCC encoder 25 is connected for supplying parity bits from its second convolutional coding to an anti-Gray encoder 32 for 2-bit nibbles that is connected for supplying 187-byte segments of its response to an encoder 33 for the fourth type of (207, 187) R-S FEC coding. The encoder 33 is connected for supplying (207, 187) R-S FEC codewords of the fourth type to the fourth input port of the data field assembler 6. The PCCC encoder 25 can resemble that used in UMTS, and it is convenient to make the interleaver therein capable of scrambling 1496, 2992 or 4488 bits. Tail bits can be discarded or, alternatively, can be used to over-write portions of the parity bytes of the (207, 187) R-S FEC codewords of the third and fourth types.

The output port of the data field assembler 6 is connected for supplying 207-byte data segments to the convolutional byte interleaver 17. The portions of the transmitter after the data field assembler 6 are similar to the portions of the FIG. 1 transmitter after the data field assembler 6.

FIGS. 7 through 14 are tables of different forms of recoding any of which can be used in the anti-Gray encoders 13, 15 and 16. Any of these different forms of recoding can be used in the anti-Gray encoders 26, 30 and 32.

Figure 15:
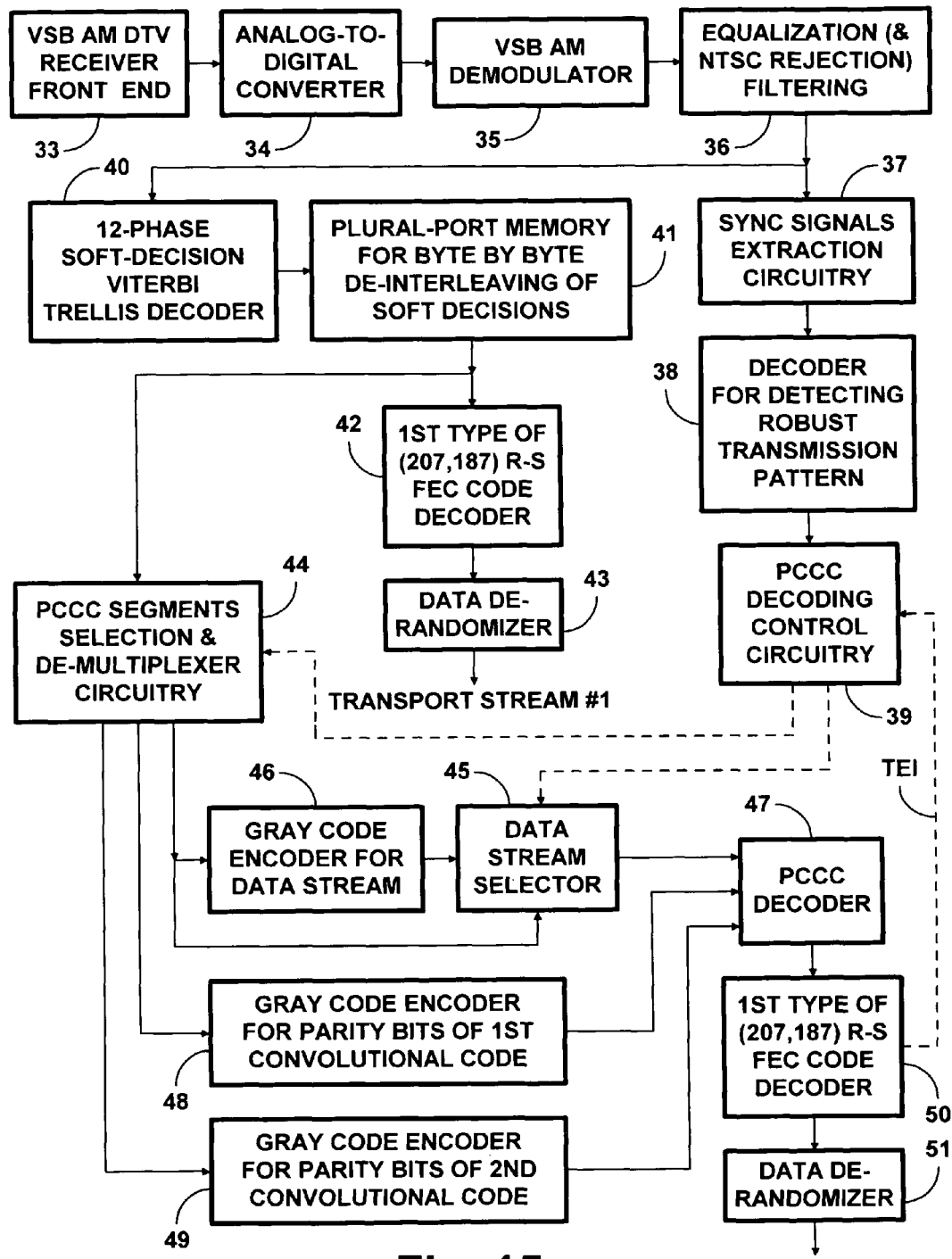
FIG. 15 is a general schematic diagram of receiver apparatus for broadcast DTV signals transmitted by transmitter apparatus of the sort shown in FIG. 1.

FIG. 15 shows receiver apparatus for DTV signals transmitted by transmitter apparatus of the sort shown in FIG. 1. The FIG. 15 DTV receiver apparatus includes a vestigial-sideband amplitude-modulation (VSB AM) DTV receiver front-end 33 for selecting a radio-frequency DTV signal for reception, converting the selected RF DTV signal to an intermediate-frequency DTV signal, and for amplifying the IF DTV signal. An analog-to-digital converter 34 is connected for digitizing the amplified IF DTV signal supplied from the DTV receiver front-end 33. A demodulator 35 is connected for demodulating the digitized VSB AM IF DTV signal to generate a digitized baseband DTV signal, which is supplied to digital filtering 36 for equalization of channel response and for rejection of co-channel interfering NTSC signal. Synchronization signals extraction circuitry 37 is connected for receiving the digital filtering 36 response. Responsive to data-field-synchronization (DFS) signals, the sync signals extraction circuitry 37 detects the beginnings of data frames and fields. Responsive to data-segment-synchronization (DSS) signals, the sync signals extraction circuitry 37 detects the beginnings of data segments. The FIG. 15 DTV receiver apparatus uses the DSS and DFS signals for controlling its operations similarly to the ways this is conventionally done. FIG. 15 does not explicitly show the circuitry for effecting these operations. A decoder 38 for detecting the robust transmission pattern responds to the robust transmission pattern code contained in the reserved portions of DFS signals separated by the synchronization signals extraction circuitry 37. The decoder 38 is connected for supplying ancillary transmission pattern information to PCCC decoding control circuitry 39 that controls PCCC decoding in the FIG. 15 DTV receiver apparatus.

A 12-phase soft-decision type of Viterbi trellis decoder 40 is connected for receiving the digital filtering 36 response. For example, the decoder 40 employs the soft-output Viterbi algorithm (SOYA). By way of alternative example, the decoder 30 employs the maximum a posteriori (MAP) algorithm. Plural-port memory 41 is connected for receiving decoding results from the trellis decoder 40 and providing byte-by-byte de-interleaving of those results to generate input signal for a Reed-Solomon decoder 42 of the de-interleaved (207, 187) R-S FEC codewords read from the memory 41. Preferably, the de-interleaved (207, 187) R-S FEC codewords are accompanied by soft-decision information, and the R-S decoder 42 is of a sort that can use the soft-decision information to improve overall performance of the decoders 40 and 42. The R-S decoder 42 is connected for supplying randomized data packets to a data de-randomizer 43, which exclusive-ORs the bits of the randomized data packets with appropriate portions of the PRBS prescribed in A/53, Annex D, §4.2.2 to generate de-randomized MPEG-2-compatible data packets of a first transport stream. Insofar as the R-S decoder 42 is capable, it corrects the 187-byte randomized data packets that it supplies to the data de-randomizer 43.

The input port of a PCCC segments selector 44 is connected for receiving de-interleaved trellis decoding results from the plural-port memory 41. Responsive to control signals received from the PCCC decoding control circuitry 39, the PCCC segments selector 44 selectively reproduces at a first of its output ports 207-byte data segments containing the data stream portion of received turbo coding. The first output port of the PCCC segments selector 44 is connected for supplying these 207-byte data segments to a first input port of a data stream selector 45 and to the input port of a Gray code encoder 46 for 2-bit data nibbles. The output port of the Gray code encoder 46 is connected to a second input port of the data stream selector 45. The output port of the data stream selector 45 is connected to supply a selected data stream to a first input port of a PCCC decoder 47. The data stream selector 45 is connected to receive a control signal from the PCCC decoding control circuitry 39. Sometimes the control signal from the PCCC decoding control circuitry 39 indicates that the turbo coding received from the transmitter does not Gray code nibbles of the data stream. In such case, the data stream selector 45 is conditioned to reproduce at its output port those 207-byte data segments supplied to its first input port directly from the first output port of the PCCC segments selector 44. Alternatively, at other times the control signal from the PCCC decoding control circuitry 39 indicates that the turbo coding received from the transmitter does Gray code nibbles of the data stream. In such alternative case, the data stream selector 45 is conditioned to reproduce at its output port those 207-byte data segments supplied to its second input port from the output port of the Gray code encoder 46.

Responsive to control signals received from the PCCC decoding control circuitry 39, the PCCC segments selector 44 selectively reproduces at a second of its output ports 207-byte data segments containing anti-Gray-coded 2-bit nibbles of the parity bits from the first code of the turbo coding. The second output port of the PCCC segments selector 44 is connected for supplying these anti-Gray coded nibbles to the input port of a Gray code encoder 48. The Gray code encoder 48 responds to reproduce at its output port the parity bits from the first code of the original turbo coding. These parity bits are supplied to a second input port of the PCCC decoder 47 to which input port the output port of the Gray code encoder 48 connects.

Responsive to control signals received from the PCCC decoding control circuitry 39, the PCCC segments selector 44 selectively reproduces at a third of its output ports 207-byte data segments containing anti-Gray-coded 2-bit nibbles of the parity bits from the second code of the turbo coding. The third output port of the PCCC segments selector 44 is connected for supplying these anti-Gray coded parity bits to the input port of a Gray code encoder 49. The Gray code encoder 49 responds to reproduce at its output port the parity bits from the second code of the original turbo coding. These parity bits are supplied to a third input port of the PCCC decoder 47 to which input port the output port of the Gray code encoder 48 connects.

The PCCC decoder 47 is connected for supplying de-interleaved (207, 187) R-S FEC codewords it recovers to a decoder 50 for (207, 187) R-S FEC codewords of the first type. When the R-S decoder 50 detects no byte error in a (207, 187) R-S FEC codewords of the first type, it supplies the PCCC decoding control circuitry 39 a TEI bit indicating that codeword is presumably correct. The circuitry 39 responds to command the PCCC decoder 47 to discontinue iterative turbo decoding procedures in regard to that particular (207, 187) R-S FEC codeword of the first type. The R-S decoder 42 is connected for supplying randomized data packets to a data de-randomizer 43, which exclusive-ORs the bits of the randomized data packets with appropriate portions of the PRBS prescribed in A/53, Annex D, §4.2.2 to generate de-randomized MPEG-2-compatible data packets of a second transport stream. Insofar as the R-S decoder 42 is capable, it corrects the 187-byte randomized data packets that it supplies to the data de-randomizer 43. However, if a particular (207, 187) R-S FEC codeword of the first type remains uncorrected after a number of iterations of turbo decoding procedures thereon, PCCC decoding of that codeword may be discontinued, leaving the codeword in error.

The PCCC decoder 47 is similar in its construction to a PCCC decoder for a UMTS cell phone receiver. See, for example, M. C. Valenti and J. Sun, "The UMTS Turbo Code and an Efficient Decoder Implementation Suitable for Software-Defined Radios" in International Journal of Wireless Information Networks, Vol. 8, No. 4, October 2001, pp. 203-16.

Figure 16:
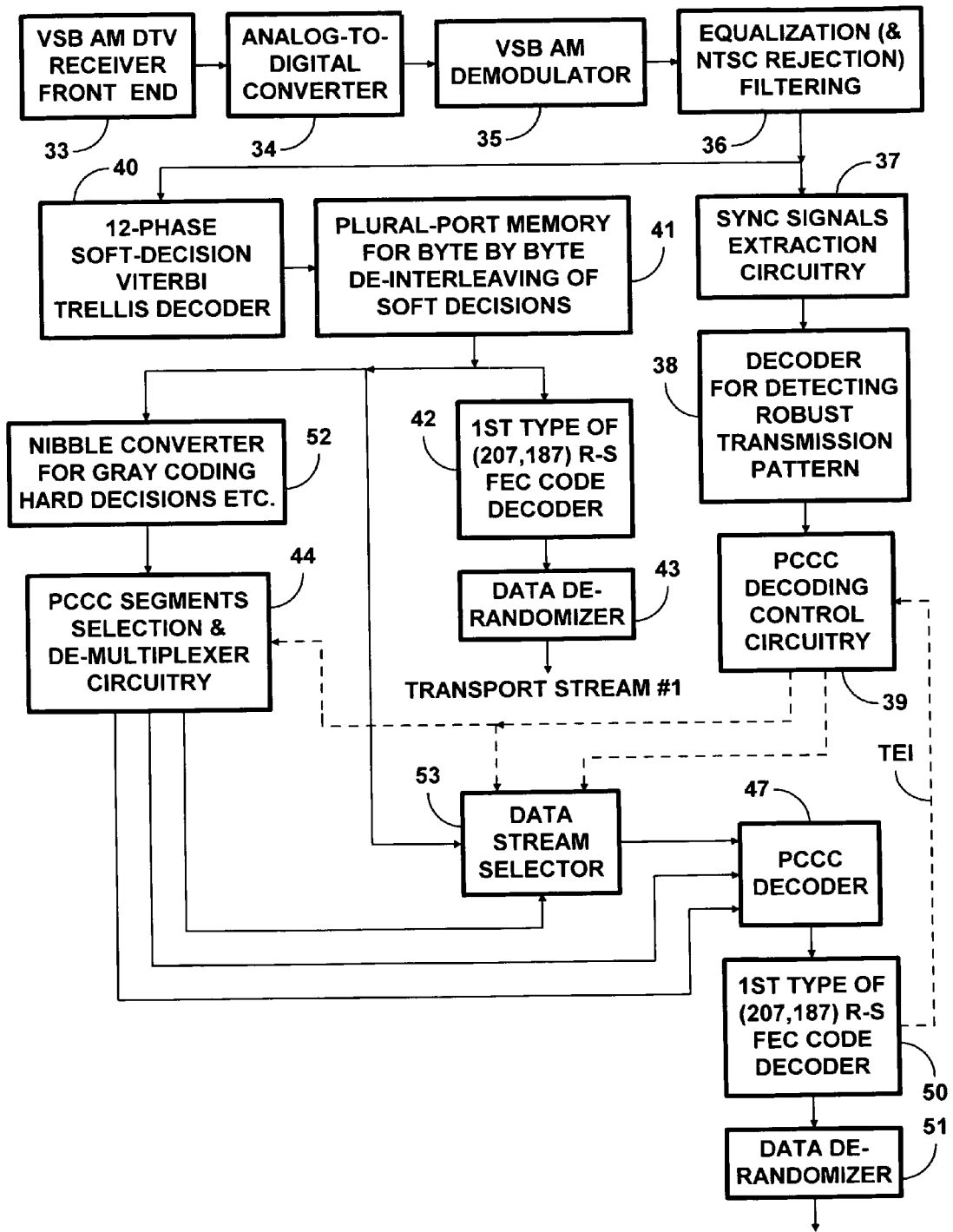
FIG. 16 is a general schematic diagram of alternative receiver apparatus for broadcast DTV signals transmitted by transmitter apparatus of the sort shown in FIG. 1.

FIG. 16 shows alternative receiver apparatus for broadcast digital television signals transmitted by transmitter apparatus of the sort shown in FIG. 1. This alternative receiver apparatus dispenses with the individual Gray encoders 46, 48 and 49 of the FIG. 9 receiver apparatus in favor of a single Gray code encoder 52 for 2-bit nibbles of all three portions of the turbo coding. De-interleaved trellis decoding results from the plural-port memory 41 are supplied to the input port of the Gray code encoder 52 for encoding the 2-bit nibbles of anti-Gray coding introduced at the transmitter. The input port of the PCCC segments selector 44 is connected for receiving PCCC components from the output port of the Gray code decoder 52. The PCCC segments selector 44 in the FIG. 16 alternative receiver apparatus selectively reproduces those PCCC components at one of its three output ports responsive to control signals received from the PCCC decoding control circuitry 39, just as in the FIG. 15 receiver apparatus.

The data stream selector 45 of the FIG. 15 receiver apparatus is replaced by a data stream selector 53 in the FIG. 16 receiver apparatus. The first input port of the data stream selector 53 is connected for receiving parallel coding results from the plural-port memory 41 directly. The first output port of the PCCC segments selector 44 is connected to a second input port of the data stream selector 53. The output port of the data stream selector 53 is connected to supply a selected data stream to a first input port of the PCCC decoder 47. The data stream selector 53 is connected to receive control signals from the PCCC decoding control circuitry 39. Sometimes one of the control signals from the PCCC decoding control circuitry 39 indicates that the turbo coding received from the transmitter Gray codes 2-bit nibbles of the data stream. In such case, the data stream selector 53 is conditioned to reproduce at its output port those 207-byte data segments supplied to its first input port from the first output port of the PCCC segments selector 44. Alternatively, at other times that one of the control signals from the PCCC decoding control circuitry 39 indicates that the turbo coding received from the transmitter does not Gray code 2-bit nibbles of the data stream. Then, the data stream selector 53 is selectively conditioned to reproduce the 207-byte segments supplied to its second input port. Such conditioning occurs if and only if the other of the control signals from the PCCC decoding control circuitry 39 indicates that the 207-byte segment currently supplied to the second input port of the data stream selector 53 contains turbo code data stream, rather than turbo code parity bits.

Responsive to control signals received from the PCCC decoding control circuitry 39, the PCCC segments selector 44 selectively reproduces at a second of its output ports 207-byte data segments containing parity bits from the first code of the turbo coding. The second output port of the PCCC segments selector 44 is connected for supplying these parity bits to the second input port of the PCCC decoder 47. Responsive to control signals received from the PCCC decoding control circuitry 39, the PCCC segments selector 44 selectively reproduces at a third of its output ports 207-byte data segments containing parity bits from the second code of the turbo coding. The third output port of the PCCC segments selector 44 is connected for supplying these parity bits to the third input port of the PCCC decoder 47.

Figure 17:
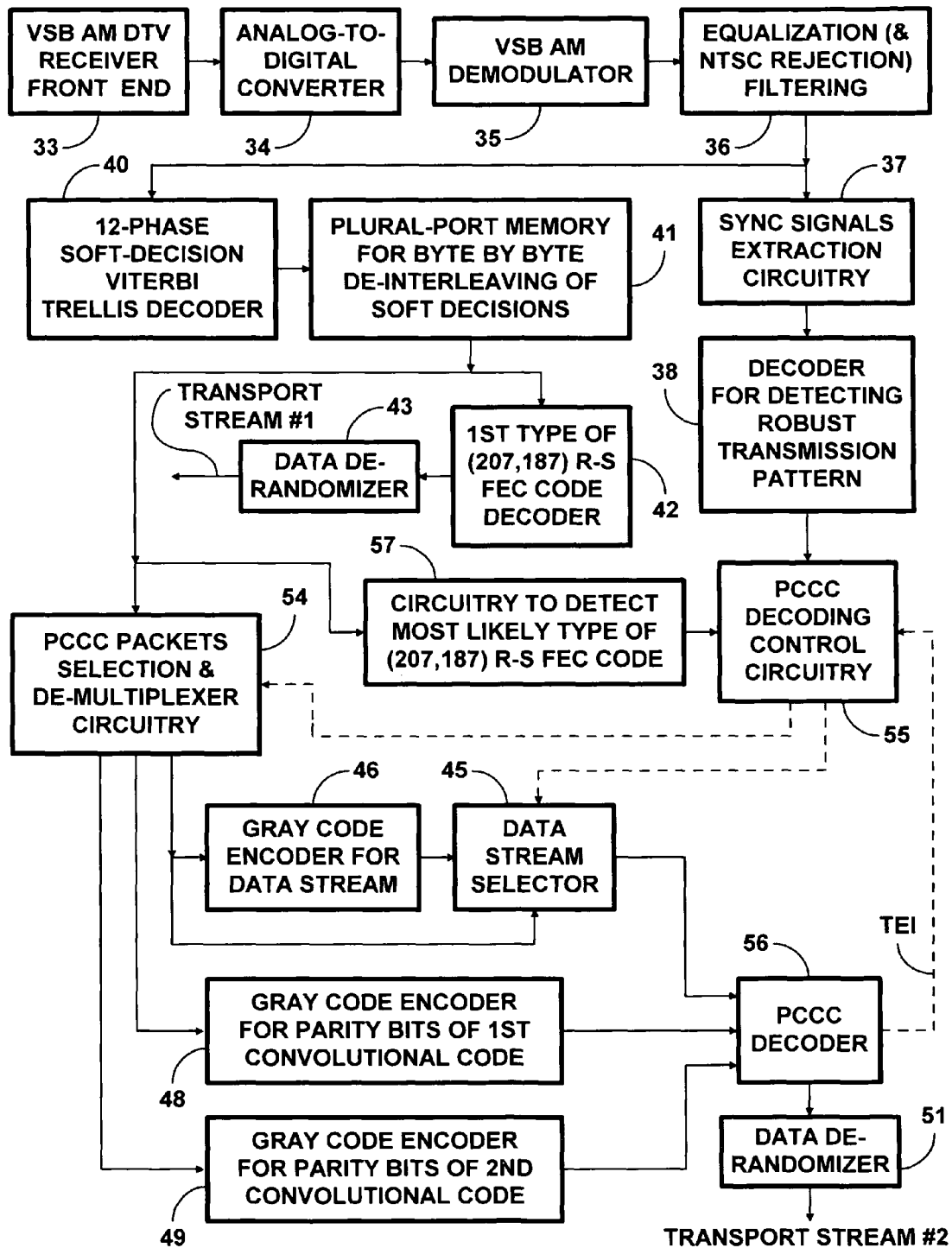
FIG. 17 is a general schematic diagram of receiver apparatus for broadcast DTV signals transmitted by transmitter apparatus of the sort shown in FIG. 1, but modified as shown in FIG. 4.

FIG. 17 shows receiver apparatus for broadcast digital television signals transmitted by transmitter apparatus modified as shown in FIG. 4 for turbo coding just 187-byte data packets, rather than complete 207-byte data segments. The FIG. 17 receiver apparatus is generally similar to the FIG. 15 receiver apparatus, but differs in the following respects. The PCCC segments selector and de-multiplexer circuitry 44 is replaced by PCCC packets selector and de-multiplexer circuitry 54 in the FIG. 17 receiver apparatus, and the PCCC decoding control circuitry 39 is replaced by PCCC decoding control circuitry 55 modified to suit. The PCCC decoder 47 is replaced in the FIG. 17 receiver apparatus by a PCCC decoder 56 with different internal bit de-interleaver and interleaver circuitry, and the decoder 50 for (207, 187) R-S FEC codewords of the first type is dispensed with. The data randomizer 51 is connected to receive packets of randomized data directly from the PCCC decoder 56. The PCCC decoder 56 signals the PCCC decoding control circuitry 55 when it is fairly certain that a data packet is correct and otherwise toggles the TEI bit in the packet of randomized data supplied to the data randomizer 51.

Figure 18:
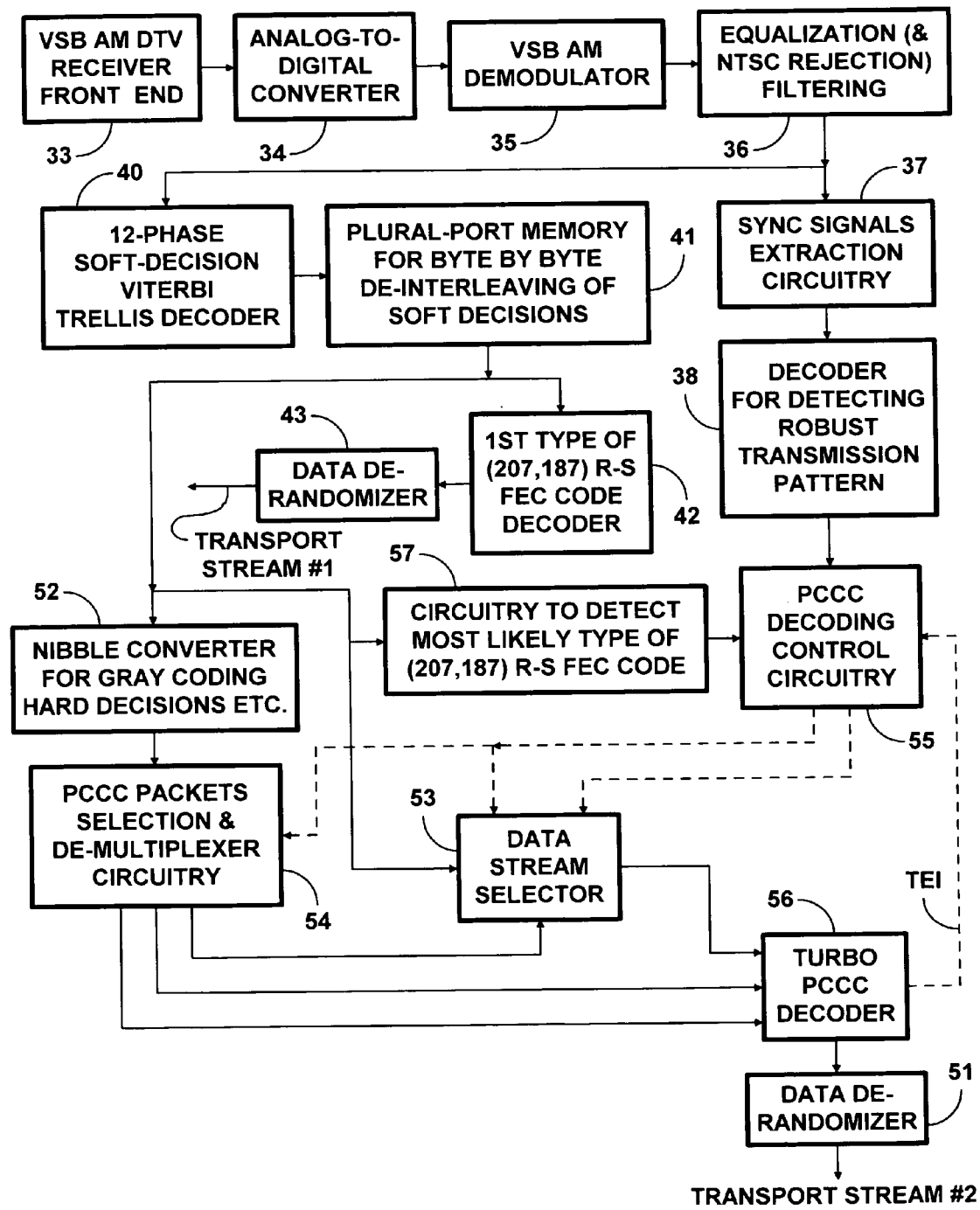
FIG. 18 is a general schematic diagram of alternative receiver apparatus for broadcast DTV signals transmitted by transmitter apparatus of the sort shown in FIG. 1, but modified as shown in FIG. 4.

FIG. 18 shows alternative receiver apparatus for broadcast digital television signals transmitted by transmitter apparatus modified as shown in FIG. 4 for turbo coding just 187-byte data packets, rather than complete 207-byte data segments. This alternative receiver apparatus dispenses with the individual Gray encoders 46, 48 and 49 of the FIG. 17 receiver apparatus in favor of a nibble converter 52 for Gray encoding all three portions of the turbo coding. De-interleaved trellis decoding results from the plural-port memory 41 are supplied to the input port of the nibble converter 52 for decoding the anti-Gray coding of 2-bit nibbles introduced at the transmitter. The input port of the PCCC packets selector 54 is connected for receiving the de-interleaved trellis decoding results from the output port of the nibble converter 52. The PCCC packets selector 54 in the FIG. 18 alternative receiver apparatus selectively reproduces those de-interleaved trellis decoding results at one of its three output ports responsive to control signals received from the PCCC decoding control circuitry 55, just as in the FIG. 17 receiver apparatus.

The data stream selector 45 of the FIG. 17 receiver apparatus is replaced by the data stream selector 53 in the FIG. 18 receiver apparatus. The first input port of the data stream selector 53 is connected for receiving de-interleaved trellis decoding results from the plural-port memory 41 directly. The first output port of the PCCC packets selector 54 is connected to the second input port of the data stream selector 53. The output port of the data stream selector 53 is connected to supply a selected data stream to a first input port of the PCCC decoder 56. The data stream selector 53 is connected to receive control signals from the PCCC decoding control circuitry 55. Sometimes one of the control signals from the PCCC decoding control circuitry 55 indicates that the turbo coding received from the transmitter anti-Gray codes 2-bit nibbles of the data stream. In such case, the data stream selector 53 is conditioned to reproduce at its output port those 187-byte data packets supplied to its first input port from the first output port of the PCCC packets selector 54. Alternatively, at other times that one of the control signals from the PCCC decoding control circuitry 559 indicates that the turbo coding received from the transmitter does not anti-Gray code 2-bit nibbles of the data stream. Then, the data stream selector 53 is selectively conditioned to reproduce the 187-byte segments supplied to its second input port. Such conditioning occurs if and only if the other of the control signals from the PCCC decoding control circuitry 55 indicates that the 187-byte segment currently supplied to the second input port of the data stream selector 53 contains turbo code data stream, rather than turbo code parity bits.

Responsive to control signals received from the PCCC decoding control circuitry 55, the PCCC packets selector 54 selectively reproduces at a second of its output ports 187-byte data packets containing parity bits from the first code of the turbo coding. The second output port of the PCCC packets selector 54 is connected for supplying these parity bits to the second input port of the PCCC decoder 56. Responsive to control signals received from the PCCC decoding control circuitry 55, the PCCC packets selector 54 selectively reproduces at a third of its output ports 187-byte data packets containing parity bits from the second code of the turbo coding. The third output port of the PCCC packets selector 54 is connected for supplying these parity bits to the third input port of the PCCC decoder 56.

FIGS. 17 and 18 show their respective receiver apparatus including optional circuitry 57 to detect the most likely type of (207, 187) R-S FEC coding used in each of the 207-byte segments of de-interleaved data supplied from the plural-port memory 41 used for convolutional byte de-interleaving. The circuitry 57 is connected to supply its best estimates of the types of received (207, 187) R-S FEC coding to the turbo coding control circuitry 55 to augment the indications supplied by the decoder 38 for detecting the robust transmission pattern. In actual practice the data supplied to the input port of the PCCC packets selector 54 has to be delayed to compensate for the latent delay exhibited by the circuitry 57 in generating its best estimates of the types of (207, 187) R-S FEC coding received. The circuitry 57 typically includes respective R-S decoder circuitry for each of the four types of (207, 187) R-S FEC coding, which R-S decoder circuitry uses algorithms for detecting byte errors, but not correcting them. If the R-S decoder circuitry for one of the four types of (207, 187) R-S FEC coding detects fewer byte errors than the rest, this indicates the likelihood that its particular type of (207, 187) R-S FEC coding was received. If read-only memory large enough to be addressed by 1656 bits becomes feasible, it can be used to store indications of the most likely one of the four types of (207, 187) R-S FEC coding that was most recently received.

If the data component of parallel concatenated convolutionally coded (207, 187) R-S FEC codewords is subsequently anti-Gray coded, so as not to be usefully received by legacy DTV receivers, the three components of the PCCC can be interleaved by cyclically sampling bytes from each of them to generate a string of bytes that is a multiple M times 207 bytes long, neglecting tail bits. Each successive group of 207 bytes of this string can be transmitted in respective data segments spaced at 52 segment intervals within the succession of data segments divided into data fields for convolutional byte interleaving and 2/3 trelis coding. This procedure will increase by the factor M the capability of the turbo-coded (207, 187) R-S FEC codewords to withstand burst errors. An alternative way to increase the capability of the turbo-coded (207, 187) R-S FEC codewords is to pack the PCCC codewords transversely into the payload fields of MPEG-2-compatible data packets.

Figure 19:
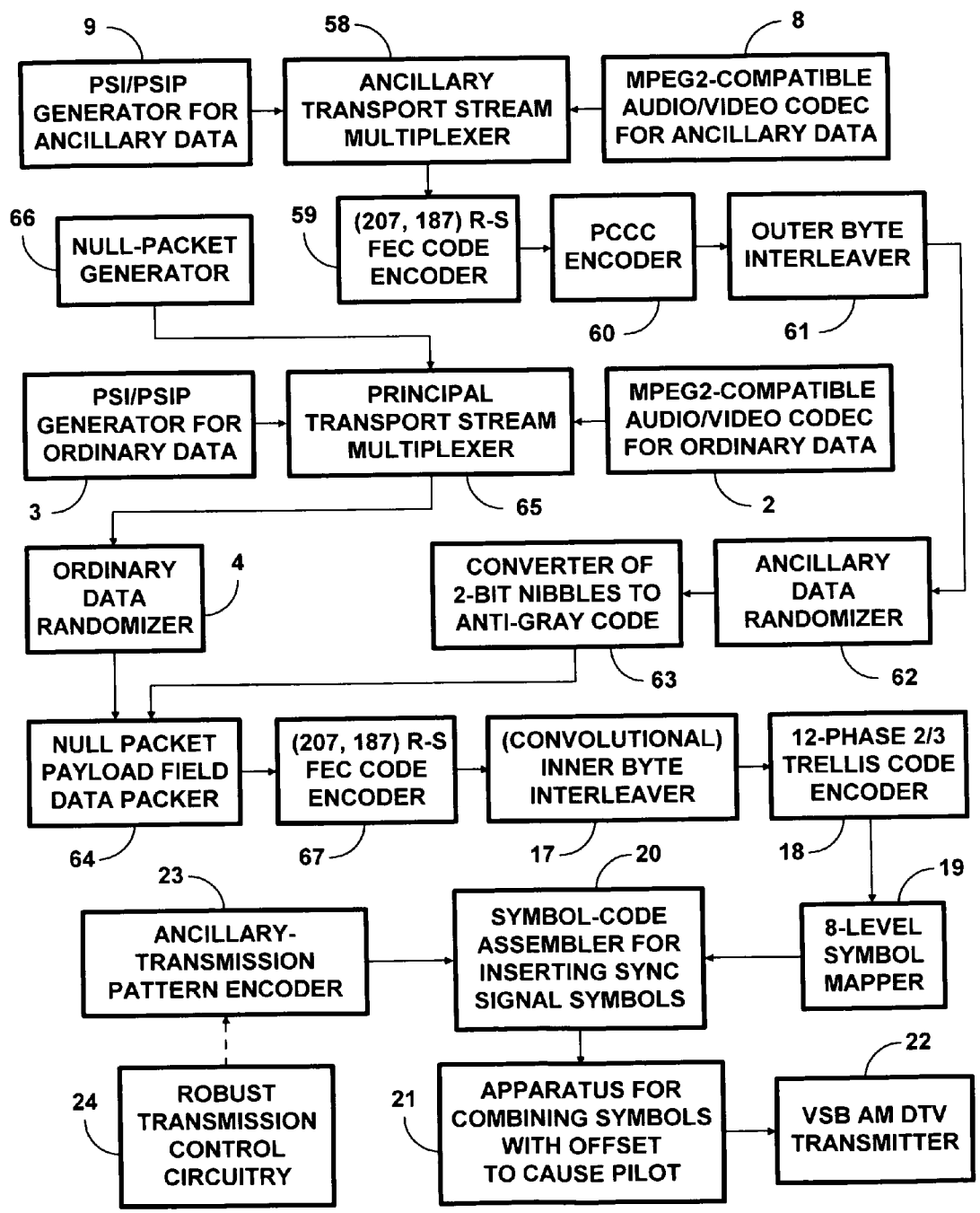
FIG. 19 is a schematic diagram of transmitter apparatus for broadcast DTV signals designed for improved reception by mobile receivers, which transmitter apparatus embodies aspects of the invention.

FIG. 19 shows DTV transmitter apparatus that transmits PCCCs disposed transversely within the payload fields of MPEG-2 compatible data packets that are subsequently (207, 187) Reed-Solomon forward-error-correction coded, convolutionally byte interleaved, 2/3 trellis coded and mapped into an 8VSB signal. FIG. 19 shows a multiplexer 58 for assembling an ancillary transport stream of MPEG-2-compatible data packets. This ancillary-transport-stream multiplexer 58 is connected for time-division multiplexing MPEG-2-compatible data packets from the audio/video codec 8 and from the PSI/PSIP generator 9. The codec 8 and PSI/PSIP generator 9 are associated with the transmission of ancillary data that are turbo coded. The multiplexer 58 is connected for applying the 187-byte data packets in the ancillary transport stream that it assembles to the input port of an encoder 59 for (207, 187) Reed-Solomon forward-error-correction coding. The R-S FEC coding can be utilized by DTV receivers of the sorts shown in FIGS. 24 and 27, or of the sort shown in FIG. 27 as modified per FIG. 29 to determine when the decoding of PCCC regenerates one of the outer (207, 187) R-S FEC codewords from the encoder 59.

The encoder 59 is connected for supplying the outer (207, 187) R-S FEC codewords that it generates to an encoder 60 for parallel concatenated convolutional coding (PCCC). The encoder 60 for PCCC is commonly referred to as a "turbo" encoder, since usually a pair of soft-input/soft-output (SISO) decoders employ turbo methods to decode PCCC. The encoder 60 can, for example, resemble PCCC encoders used in the third-generation Universal Mobile Telephone System (UMTS) cellular telephony. An outer byte interleaver 61 is connected for receiving the PCCC generated by the encoder 60. The outer byte interleaver 61 is designed so the (207, 187) R-S FEC coding can correct for drop-outs in signal strength as long as a second or so in duration.

The outer byte interleaver 61 is connected for supplying the stream of bytes of interleaved turbo coding to the input port of a data randomizer 62 to be exclusive-ORed with portions of a pseudo-random binary sequence (PRBS) prescribed in A/53, Annex D, §4.22 titled "Data randomizer". FIG. 1 shows the output port of the data randomizer 62 connected to the input port of a nibble converter 63. The nibble converter 63 anti-Gray codes successive 2-bit nibbles of the received stream of interleaved bits to generate its response. The nibble converter 63 is connected to supply that response to a null-packet payload-data-field packer 64 for insertion into the payload data fields of 187-byte MPEG-2 null packets. In preferred broadcast systems embodying aspects of the invention, anti-Gray coding is performed in the DTV transmitter apparatus and corresponding Gray coding is performed in the DTV receiver apparatus. However, these coding procedures are omitted in other, less preferred broadcast systems that embody aspects of the invention.

FIG. 19 shows a multiplexer 65 for assembling a principal transport stream of MPEG-2-compatible data packets. The principal-transport-stream multiplexer 65 is connected for time-division multiplexing packet-by-packet 187-byte MPEG-2-compatible data packets from the audio/video codec 2, from the PSI/PSIP generator 3 and from a null-packet generator 66. The codec 2 and PSI/PSIP generator 3 are associated with the transmission of ordinary 8VSB data.

The null-packet generator 66 generates null packets the 184-byte payload data fields of which are filled with placeholder bits that are to be replaced by PCCC after their randomization. The 13-bit PIDs of these null packets are all ONEs, in compliance with the MPEG-2 convention for designating null packets. Decoding of the turbo coding in new DTV receivers is facilitated if the null packets that will have turbo coding packed into their payload data fields by the null-packet payload-data-field packer 64 have consecutive continuity count components. Rather than the continuity count component being constrained to just the final half of the third byte of each of these 187-byte null packets, the continuity count can be extended to fill the complete third byte of each of them. This permits modulo-256 counting of the null packets that contain turbo coding, rather than just modulo-16 counting of them. Since legacy DTV receivers discard the null packets containing turbo code anyway, such extension of the continuity count does not affect the operation of these receivers. Extension of the continuity count could adversely affect the operation of receivers designed for A-VSB reception, however. While this specification specifically describes the PCCC being packed into the payload data fields of null packets, it should be understood that in other broadcast systems constructed in accordance with the precepts set forth herein the PCCC is packed into the payload data fields of MPEG-2-compatible data packets having a special PID assigned to them.

The multiplexer 65 is connected for supplying the principal transport stream it assembles to the input port of the data randomizer 4 to be exclusive-ORed with the PRBS prescribed in A/53, Annex D, §4.2.2 titled "Data randomizer". The output port of the data randomizer 4 is connected to supply the randomized MPEG-2-compatible data packets from the principal transport stream to the null-packet payload-data-field packer 64. When turbo coding is transmitted, the null-packet payload-data-field packer 64 packs the response from the nibble converter 63 into the payload data fields of the randomized MPEG-2-compatible null packets. The randomized placeholder bits in those null-packet payload data fields as supplied to the null-packet payload-data-field packer 64 are replaced by randomized and anti-Gray coded PCCC in the response supplied from the output port of the packer 64. Randomized MPEG-2-compatible data packets other than null packets are reproduced without modification from the response of the null-packet payload-data-field packer 64.

The portions of the PRBS used by the data randomizer 62 are synchronous with the PRBS used by the data randomizer 4. Data randomization of the interleaved PCCC supplied to the nibble converter 63 for anti-Gray coding facilitates de-randomization being done in the DTV receiver apparatus after Gray coding, but before decoding the PCCC. This avoids having to keep track of the proper portion of the PRBS to be used for de-randomization after decoding the PCCC, which becomes rather complicated to do when performing several iterations of turbo coding procedures.

The output port of the null-packet payload-field data-packer 64 is connected for supplying its response to the input port of an encoder 67 that generates a respective (207, 187) Reed-Solomon forward-error-correction codeword in response to each of the MPEG-2-compatible data packets received from the payload-field data-packer 64. The (207, 187) R-S FEC code encoder 67 is connected for supplying its 207-byte codewords to the inner byte interleaver 17 of convolutional type. The inner byte interleaver 17 is connected to supply the convolutionally interleaved bytes of the (207, 187) R-S FEC codewords to the 12-phase encoder 18 for 2/3 trellis code. The 12-phase encoder 18 supplies groups of three bits to the 8-level symbol mapper 19, which is customarily constructed using read-only memory (ROM). The mapper 19 is connected to supply 8-level symbols to the symbol code assembler 20 which inserts data segment synchronization (DSS) symbols and data field synchronization (DFS) symbols into the symbol stream before it is supplied to the apparatus 21. The apparatus 21 then combines the symbols with an offset to supply digital modulating signal to a VSB AM transmitter 22 for DTV signal.

The reserved section of the DFS signal at the beginning of each data field, however, contains a code sequence specifying the pattern of the ancillary (PCCC) transmission in at least that field. FIG. 19 shows the encoder 23 connected for supplying these code sequences to the symbol code assembler 20, responsive to control signals supplied by the robust transmission control circuitry 24. The encoder 23 is, for example, similar to those previously designed for use in enhanced-VSB DTV signal transmitter apparatuses or to those previously designed for use in A-VSB DTV signal transmitter apparatuses.

Figure 20:
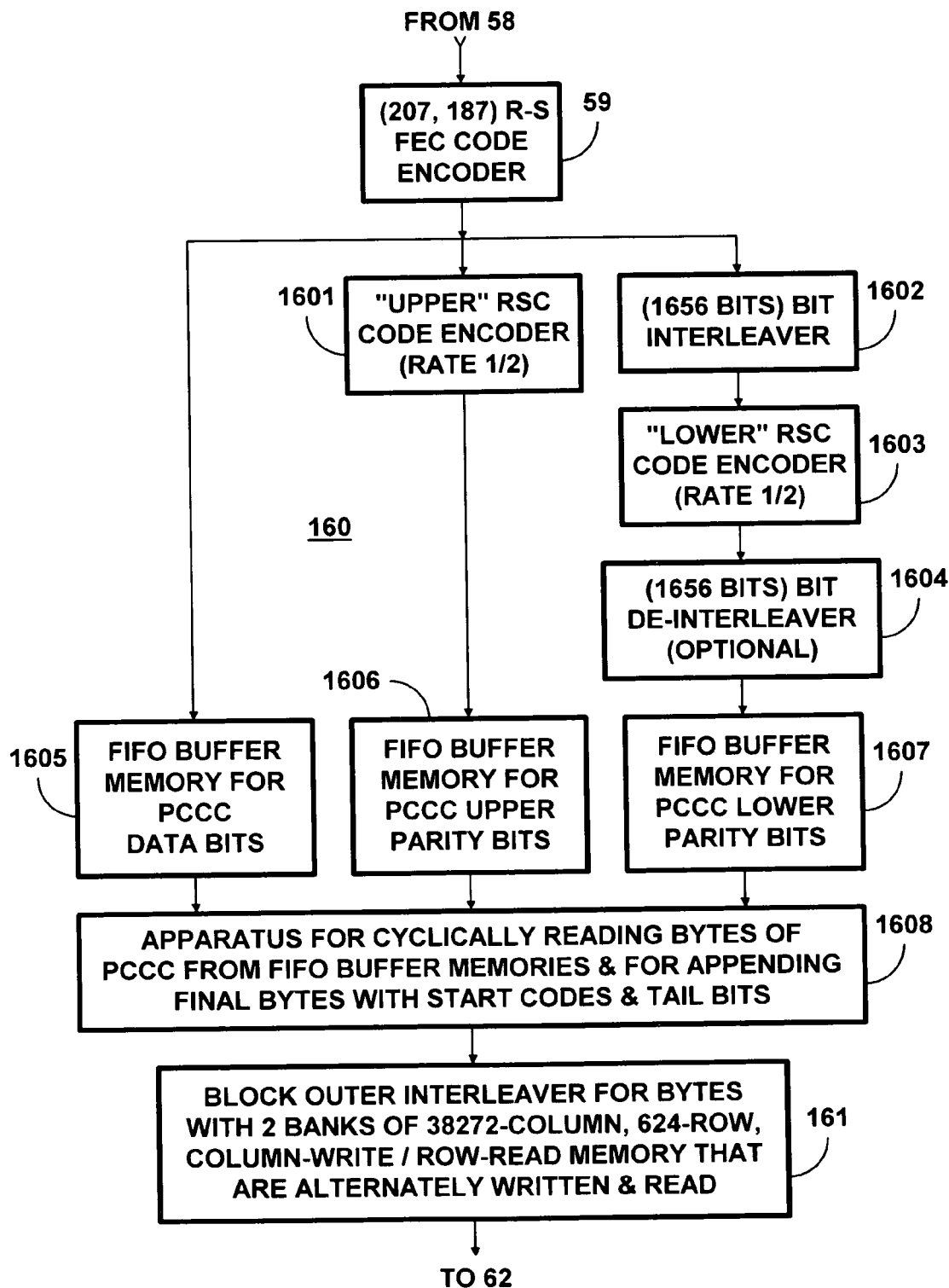
FIG. 20 is a detailed schematic diagram of a turbo code encoder and an outer byte interleaver used in an embodiment of the FIG. 19 transmitter apparatus that turbo codes individual 207-byte data segments, using PCCC.

FIG. 20 shows a PCCC encoder 160 and an outer byte interleaver 161, which are used as the PCCC encoder 60 and the outer byte interleaver 61 in an embodiment of the FIG. 19 transmitter apparatus in which individual Reed-Solomon forward-error-correction codewords are turbo coded using parallel concatenated convolutional coding (PCCC). FIG. 20 shows the R-S encoder 59 connected for supplying (207, 187) R-S FEC codewords directly to an "upper" recursive systematic convolutional code encoder 1601 and via a bit interleaver 1602 to a "lower" recursive systematic convolutional code encoder 1603. The bit interleaver 1602 has capacity for permuting the order of the 1,656 bits in a single (207,187) R-S FEC codeword. The "upper" RSC code encoder 1601 generates a respective set of "upper" parity bits that extend for two hundred seven 8-bit bytes plus three tail bits in response to each of the (207,187) R-S FEC codewords directly supplied thereto. The "lower" RSC code encoder 1603 generates a respective set of "lower" parity bits that extend for two hundred seven 8-bit bytes plus three tail bits in response to each of the (207,187) R-S FEC codewords supplied thereto in interleaved form via the bit interleaver 1602. The "upper" RSC code encoder 1601, the bit interleaver 1602 and the "lower" RSC code encoder 1603 are of the types used in third-generation UMTS, for example.

The bit interleaver 1602 randomizes the ordering of the data in an irregular manner, rather than trying to space the data out according to a regular pattern. Parallel concatenated convolutional coding is linear code. A linear code is a code for which the modulo-2 sum of two valid codewords (found by XOR-ing each bit position) is also a valid codeword. The Hamming weight of a codeword is the number of ONEs that it contains. All linear codes must contain the all-zeros codeword, since any code word XOR-ed with itself will produce all zeros. A "good" linear code has mostly high-weight code words beside the mandatory all-zeros codeword. High-weight codewords are desirable because they tend to be more distinct from other codewords, so the decoder has an easier time distinguishing among them. While a few low-weight codewords can be tolerated, they should be relatively infrequent. Turbo coding is a good way to reduce the occurrence of low-weight codewords. The weight of the turbo codeword is the sum of the weights of the data bits component, the "upper" parity bits component and the "lower" parity bits component of the codeword. Low weight of one of the parity bits components can be tolerated as long as the other has high weight. The input data supplied to the "lower" RSC code encoder 1603 are scrambled by the interleaver 1602, but the input data supplied to the "upper" RSC code encoder 1603 are not. So, the "lower" parity code output from the "lower" RSC code encoder 1603 usually differs quite a bit from the "upper" parity code output from the "upper" RSC code encoder 1601. While it is quite probable that one of the two RSC code encoders 1601 and 1603 will occasionally produce a low-weight output, the probability that both encoders simultaneously produce a low-weight output is extremely small. This improvement is called "interleaver gain" and is one of the main reasons that turbo coding performs so well in overcoming AWGN. Generally, the more random the bit interleaving pattern in the bit interleaver 1602, the higher the interleaver gain.

In a departure from conventional encoding practice for turbo coding, a bit de-interleaver 1604 is connected to receive the "lower" parity code output from the "lower" RSC code encoder 1603. The bit de-interleaver 1604 provides bit de-interleaving of the "lower" parity code complementary to the bit interleaving of the data by the bit interleaver 1602. This rearranges the "lower" parity code bits so that they can be better aligned in time with delayed response to the data bits used to generate them. This can reduce the extent of the disruption of data recovery from turbo codewords caused by deep fades. In less preferred embodiments of the PCCC encoder 160, the bit de-interleaver 1604 is not employed and the "lower" parity code output from the "lower" RSC code encoder 1603 is directly applied to subsequent circuitry, yet to be described.

FIG. 20 shows the R-S encoder 59 connected for supplying (207, 187) R-S FEC codewords to a first-in, first-out buffer memory 1605 for 207-byte segments of turbo code data bits. Each (207, 187) R-S FEC codeword, which may alternatively be extracted from the "upper" RSC code encoder 1601, is written into the FIFO buffer memory 1605 as the principal part of one of the 208-byte segments of turbo code data bits temporarily stored in the memory 1605. Three tail bits from the "upper" RSC code encoder 1601 are appended to the conclusion of the (207, 187) R-S FEC codeword, and three tail bits from the "lower" RSC code encoder 1603 are further appended. FIG. 20 does not explicitly show the connections for writing these six tail bits into the FIFO buffer memory 1605. The "upper" RSC code encoder 1601 is connected for writing each successive set of "upper" parity bits that extend for two hundred seven 8-bit bytes plus three tail bits into another first-in, first-out buffer memory 1606. This writes into the FIFO buffer memory 1606 the principal part of one of the 208-byte segments temporarily stored therein. Yet another first-in, first-out buffer memory 1607 is connected for receiving each successive set of "lower" parity bits that extend for two hundred seven 8-bit bytes, either directly from the "lower" RSC code encoder 1603 or preferably after being rearranged by the bit de-interleaver 1604. The FIFO buffer memory 1607 is further connected for additionally receiving three tail bits from the "lower" RSC code encoder 1603. Each successive set of "lower" parity bits that extend for two hundred seven 8-bit bytes plus three tail bits together form the principal part of one of the 208-byte segments temporarily stored in the first-in, first-out buffer memory 1607. The FIFO buffer memories 1605 and 1606 provide delays compensating for the latent delays in the bit interleaver 1602 and in the bit de-interleaver 1604, if used. The FIFO buffer memory 1605 provides further delay compensating for the latent delays in the RSC code encoders 1601 and 1602. The FIFO buffer memories 1605, 1606 and 1607 also support interleaving of the PCCC components they respectively store, which interleaving in a departure from ordinary practice is done on a byte-by-byte basis to facilitate R-S FEC coding correcting burst errors arising from deep fades.

Apparatus 1608 cyclically reads a successive byte of the data bits component of the PCCC stored in the FIFO buffer memory 1605, a successive byte of the "upper" parity bits component of the PCCC stored in the FIFO buffer memory 1606, and a successive byte of the "lower" parity bits component of the PCCC stored in the FIFO buffer memory 1607. The apparatus 1608 time-division multiplexes the cyclically read successive bytes of each component and appends a 12-bit codeword separator sequence to generate 624-byte PCCC words. These 624-byte codewords are written into respective columns of byte-storage locations in one of two banks of memory in the outer byte interleaver 61.

The two banks of memory in the outer byte interleaver 61 alternate between being written and being read. A succession of 624-byte codewords are written into respective columns of byte-storage locations in one bank of the memory while the rows of byte-storage locations in the other bank are being read out to the input port of the data randomizer 62. Each bank of the memory contains M times 184 columns of byte-storage locations, M being an integer. When reading from a row of byte-storage locations in either bank of memory each successive group of 184 byte-storage locations furnishes the 184 bytes of data that are processed for the packer 64 to pack into one payload field. The integer M is chosen to be the number of payload-data fields that will occur between one byte and the next of a PCCC word being read from one of the two banks of memory in the byte interleaver 61.

Suppose the outer byte interleaver 61 is to spread the bytes of each 624-byte PCCC word such that a deep fade of about one second duration can be overcome by a decoder for (207, 187) R-S FEC codewords that follows the PCCC decoder in the DTV receiver. Presumably that PCCC decoder can locate erasures caused by the drop-out, so the decoder for (207, 187) R-S FEC codewords can restore as many as twenty lost bytes. These lost bytes can be as far apart as one-twentieth of a second, then, which is essentially the duration of a 626-segment data frame. If PCC is transmitted in all 312 segments of each successive data field, the bytes of the data component of the PCCC have to occur at least one data frame apart. Because of the 1:1:1 interleaving of the bytes of the data component with the bytes of two other PCCC components, the bytes of each PCCC word have to occur at least one third of a data frame apart—i.e., at least 208 data segments apart. So, M has to be 208 in the outer byte interleaver 61. Each of the two banks in the byte interleaver 61 has 208×184=38,272 columns and 624 rows of byte-storage locations therein.

Each bank of memory in the byte interleaver 61 stores payload-data fields for 208 data frames. So, there is about a ten second latent delay in the byte interleaver 61 and another ten-second or so latent delay in the matching byte de-interleaver in a DTV receiver. If MPEG-2-compatible packets of other 8VSB data are interleaved in N:1 ratio with regularly occurring MPEG-2-compatible packets containing turbo coding payload, N being a positive integer, deep fades of about (N+1) seconds will be tolerated in a DTV system using transmitter apparatus as shown in FIGS. 19 and 20. The perceived latent delay in the ancillary data will also increase by a factor of (N+1).

Figure 21:
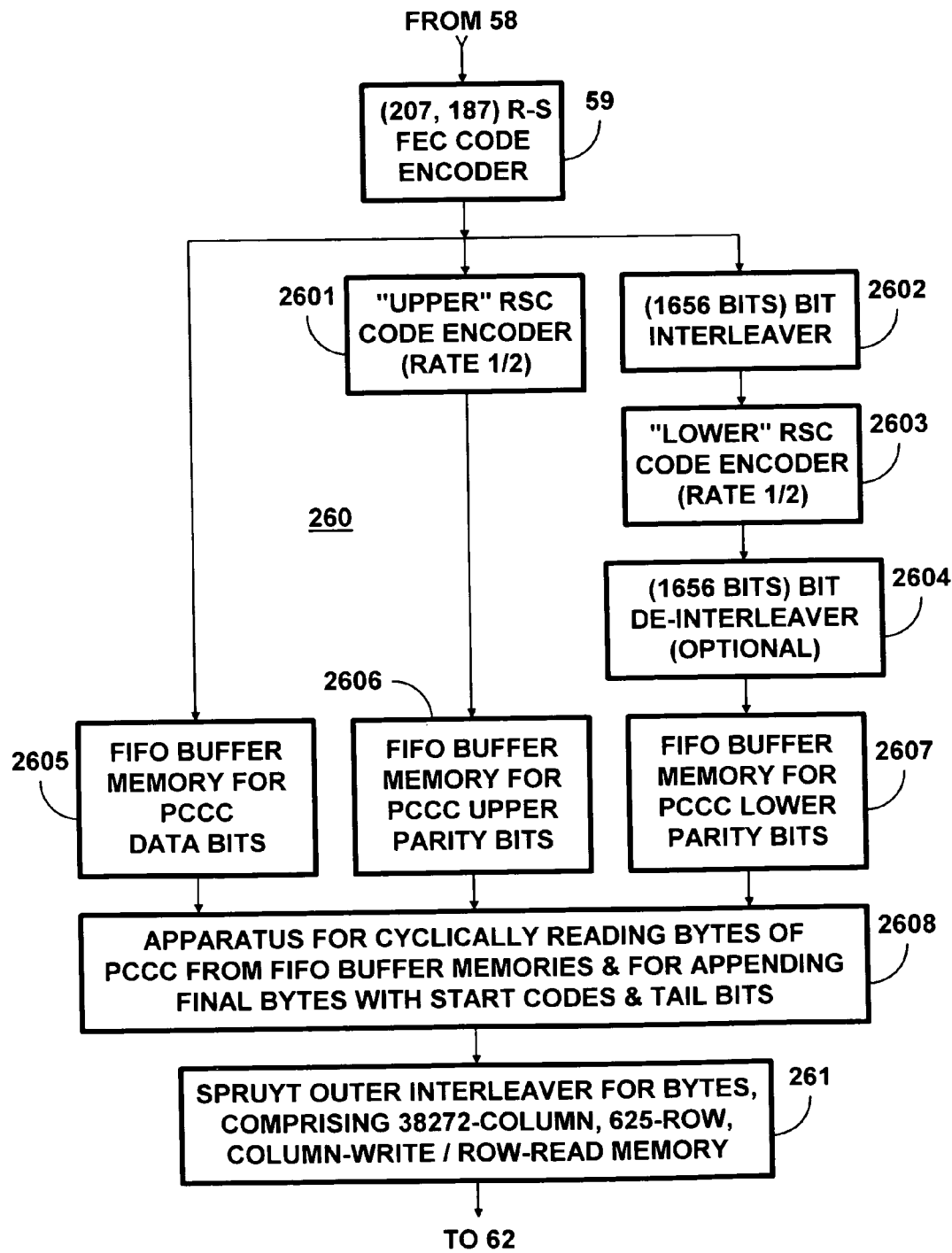
FIG. 21 is a detailed schematic diagram of a turbo code encoder and an outer byte interleaver used in an embodiment of the FIG. 19 transmitter apparatus that uses PCCC to turbo code 207-byte data segments individually, which outer byte interleaver uses substantially less memory than that in FIG. 20.

FIG. 21 shows a PCCC encoder 260 and an outer byte interleaver 261, which are used as the PCCC encoder 60 and the outer byte interleaver 61 in another embodiment of the FIG. 19 transmitter apparatus in which individual Reed-Solomon forward-error-correction codewords are turbo coded using PCCC. The PCCC encoder 260 includes an "upper" RSC code encoder 2601, a bit interleaver 2602, a "lower" RSC code encoder 2603, a bit de-interleaver 2604 and first-in, first-out buffer memories 2605, 2606 and 2607. These elements respectively correspond to the "upper" RSC code encoder 1601, the bit interleaver 1602, the "lower" RSC code encoder 1603, the bit de-interleaver 1604 and FIFO buffer memories 1605, 1606 and 1607 of the PCCC encoder 160 shown in FIG. 20. The PCCC encoder 260 further includes apparatus 2608 that cyclically reads a successive byte of the data bits component of the turbo code stored in the FIFO buffer memory 2605, a successive byte of the "upper" parity bits component of the PCCC stored in the FIFO buffer memory 2606, and a successive byte of the "lower" parity bits component of the PCCC stored in the FIFO buffer memory 2607. The apparatus 2608 time-division multiplexes the cyclically read successive bytes of each component and appends a codeword separator sequence to generate each successive one of the turbo codewords written to a column of byte-storage locations within memory in the outer byte interleaver 261. For reasons explained a bit further on in this specification, the apparatus 2608 differs somewhat from the apparatus 1608 in the FIG. 20 PCCC encoder 112.

The outer byte interleaver 261 uses substantially less memory than the outer byte interleaver 161 shown in FIG. 20. The 2-bank memory used in the outer byte interleaver 161 allows the turbo codewords to be written to respective columns of byte-storage locations in each bank of memory without the order of the bytes being changed. U.S. Pat. No. 5,907,560 shows an interleaver which rotates the positions of bytes within the codewords as written to respective columns of byte-storage locations in the interleaver memory, which rotations avoid the need to provide that memory with two banks for alternate writing and reading. The interleaver in U.S. Pat. No. 5,907,560 employs codewords that are have more bytes than the number of columns of byte-storage locations in the interleaver memory. However, U.S. Pat. No. 5,907,560 suggested to the inventor that, despite the turbo codewords having fewer bytes than the number of columns of byte-storage locations in the interleaver memory, he try designing the outer block interleaver 61 without employing two banks of memory to be alternately written and read in their entirety.

The numbers 38,272 and 624 have a number of factors in common with each other, suggesting possible problems with establishing uniform scanning paths for both writing and reading all 624×38,272=23,881,728 byte-storage locations. Extending the length of the turbo codewords to 625 bytes eliminates any problems caused by there being any factors in common with the number 38,272. Lengthening the turbo codewords leaves more room for codeword separator sequences in them. This extension of the length of the turbo codewords to 625 bytes is performed by the apparatus 2608, which is how it differs from the apparatus 1608 in the FIG. 20 PCCC encoder 160. As each row in the memory of the outer byte interleaver 261 is read, a little over sixty-one of its columns of byte-storage locations are written. The columns that are written while a row is being read occur at intervals of 625 columns, for example.

Figure 22:
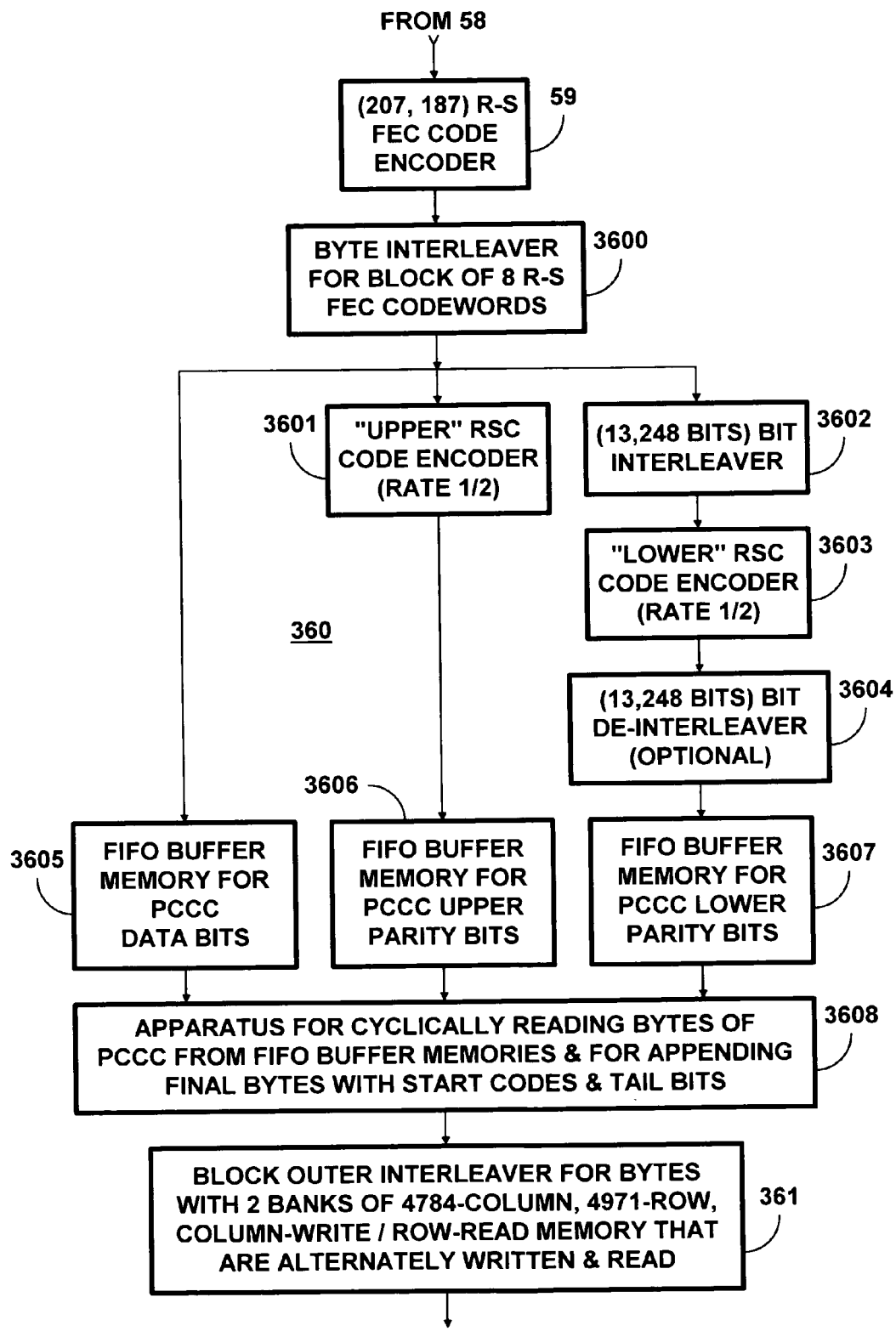
FIG. 22 is a detailed schematic diagram of a turbo code encoder and an outer byte interleaver used in an alternative embodiment of the FIG. 19 transmitter apparatus that uses PCCC to turbo code octets of 207-byte data segments.

FIG. 22 shows a PCCC encoder 360 and an outer byte interleaver 361, which are used as the PCCC encoder 60 and the outer byte interleaver 61 in an embodiment of the FIG. 19 transmitter apparatus that turbo codes octets of (207, 187) R-S FEC codewords using parallel concatenated convolutional coding (PCCC). FIG. 22 shows the encoder 59 connected for supplying (207, 187) R-S FEC codewords to an initial byte interleaver 3600 within the PCCC encoder 360. This byte interleaver 3600 cyclically samples the successive bytes of each consecutive octet of (207,187) R-S FEC codewords supplied from the encoder 59, thereby interleaving the bytes of the eight data segments to generate a 1656-byte super word for turbo coding. The initial byte interleaver 3600 is connected for supplying the 13,248 bits of each consecutive 1656-byte super word directly to an "upper" recursive systematic convolutional code encoder 3601 and via a bit interleaver 3602 to a "lower" recursive systematic convolutional code encoder 3603. The "upper" RSC code encoder 3601, the bit interleaver 3602 and the "lower" RSC code encoder 3603 are of the types used in later developed third-generation UMTS, for example.

The bit interleaver 3602 has capacity for permuting the order of the 13,248 bits in an octet of eight successive (207, 187) R-S FEC codewords. Accordingly, the bit interleaver 3602 should provide more interleaver gain than the bit interleavers 1602 and 2602 with only the capacity for permuting the order of 1,656 bits. In some embodiments of the PCCC encoder 360, the bit interleaver 3602 and the byte interleaver 3600 share the same bit-storage locations in memory common to both of them.

In a departure from conventional encoding practice for turbo coding, a bit de-interleaver 3604 is connected to receive the "lower" parity code output from the "lower" RSC code encoder 3603. The bit de-interleaver 3604 provides bit de-interleaving of the "lower" parity code complementary to the bit interleaving of the data by the bit interleaver 3602. In less preferred embodiments of the PCCC encoder 360, the bit de-interleaver 3604 is not employed and the "lower" parity code output from the "lower" RSC code encoder 3603 is directly applied to subsequent circuitry to be described further on in this specification.

FIG. 22 shows the initial byte interleaver 3600 connected for supplying 1656-byte super words to a first-in, first-out buffer memory 3605 for 1656-byte chunks of turbo code data bits. Each 1656-byte super word, which may alternatively be extracted from the "upper" RSC code encoder 3601, is written into the FIFO buffer memory 3605 as the principal part of one of the 1657-byte chunks of turbo code data bits temporarily stored therein. Three tail bits from the "upper" RSC code encoder 3601 are appended to the conclusion of the 1656-byte super word, and three tail bits from the "lower" RSC code encoder 3603 are further appended. FIG. 22 does not explicitly show the connections for writing these six tail bits into the FIFO buffer memory 3605.

The "upper" RSC code encoder 3601 generates a respective set of "upper" parity bits that extend for sixteen hundred fifty-six 8-bit bytes plus three tail bits in response to each of the 1656-byte super words directly supplied thereto. The "upper" RSC code encoder 3601 is connected for writing each successive set of "upper" parity bits into another first-in, first-out buffer memory 3606 as the principal part of one of the 1657-byte components of turbo codewords temporarily stored therein.

The "lower" RSC code encoder 3603 generates a respective set of "lower" parity bits that extend for sixteen hundred fifty-six 8-bit bytes plus three tail bits in response to each of the 1656-byte super words supplied thereto in interleaved form via the bit interleaver 3602. Yet another first-in, first-out buffer memory 3607 is connected for receiving each successive set of "lower" parity bits that extend for two hundred seven 8-bit bytes, either directly from the "lower" RSC code encoder 3603 or preferably after being rearranged by the bit de-interleaver 3604. The FIFO buffer memory 3607 is further connected for additionally receiving three tail bits from the "lower" RSC code encoder 3603. Each successive set of "lower" parity bits that extend for two hundred seven 8-bit bytes plus three tail bits together form the principal part of one of the 1657-byte segments temporarily stored in the FIFO buffer memory 3607.

The FIFO buffer memories 3605 and 3606 provide delays compensating for the latent delay in the bit interleaver 3602 and for the latent delay in the bit de-interleaver 3604, if used. The FIFO buffer memory 3605 provides further delay compensating for the latent delays in the RSC code encoders 3601 and 3602. The FIFO buffer memories 3605, 3606 and 3607 also support interleaving of the turbo code components they respectively store, which interleaving in a departure from ordinary practice is done on a byte-by-byte basis to facilitate R-S FEC coding correcting burst errors arising from deep fades.

Apparatus 3608 cyclically reads a successive byte of the data bits component of the turbo code stored in the FIFO buffer memory 3605, a successive byte of the "upper" parity bits component of the turbo code stored in the FIFO buffer memory 3606, and a successive byte of the "lower" parity bits component of the turbo code stored in the FIFO buffer memory 3607. The apparatus 3608 time-division multiplexes the cyclically read successive bytes of each component to generate 4971-byte turbo codewords. These 4971-byte turbo codewords are written into respective columns of byte-storage locations in one of two banks of memory in the outer byte interleaver 361.

The two banks of memory in the outer byte interleaver 361 alternate between being written and being read. A succession of 4971-byte turbo codewords are written into respective columns of byte-storage locations in one bank of the memory while the rows of byte-storage locations in the other bank are being read out to the data randomizer 62. Each bank of the memory contains M times 184 columns of byte-storage locations, M being an integer. When reading from a row of byte-storage locations in either bank of memory each successive group of 184 byte-storage locations furnishes the 184 bytes of data that after processing will be packed into one payload-data field. The null-packet payload-data-field packer 64 does this packing. The integer M is chosen to be the number of payload-data fields that will occur between one byte and the next of a turbo codeword being read from one of the two banks of memory in the byte interleaver 361.

Suppose the outer byte interleaver 361 is to spread the bytes of each 4971-byte turbo codeword so that a deep fade of about one second duration can be overcome by a decoder for (207, 187) R-S FEC codewords that follows the decoder for turbo coding in the DTV receiver. Presumably the decoder for turbo coding can locate erasures caused by the drop-out, so the decoder for (207, 187) R-S FEC codewords can restore as many as twenty lost bytes. These lost bytes can be as far apart as one-twentieth of a second, then, which is essentially the duration of a 626-segment data frame. If turbo coding is transmitted in all 312 segments of each successive data field, the bytes of the data component of the turbo coding have to occur at least one data frame apart. The initial byte interleaver 3600 introduces 8-to-1 interleaving that compounds the 3-to-1 interleaving of the turbo coding components, resulting in the bytes of each turbo codeword having to occur at least one twenty-fourth of a data frame apart—i.e., at least 26 data segments apart. So, M has to be 26 in the outer byte interleaver 361. Each of the two banks in the byte interleaver 361 has 26×184=4,784 columns and 4,971 rows of byte-storage locations therein.

Interestingly, the outer byte interleaver 361 has 2×4784× 4971=47,562,528 byte-storage locations, and the outer byte interleaver 161 has 2×38,272×624=47,763,456 byte-storage locations. Even adding in the extra 3,312 byte-storage locations in the initial byte interleaver 3600 operated with 2-bank memory, the FIG. 22 circuitry employs slightly less memory than the FIG. 20 circuitry. This slight advantage is attributable to the fact that the number of tail bits and codeword separator sequences required are reduced 8-to-1 in the FIG. 22 circuitry as compared to the FIG. 20 circuitry.

Figure 23:
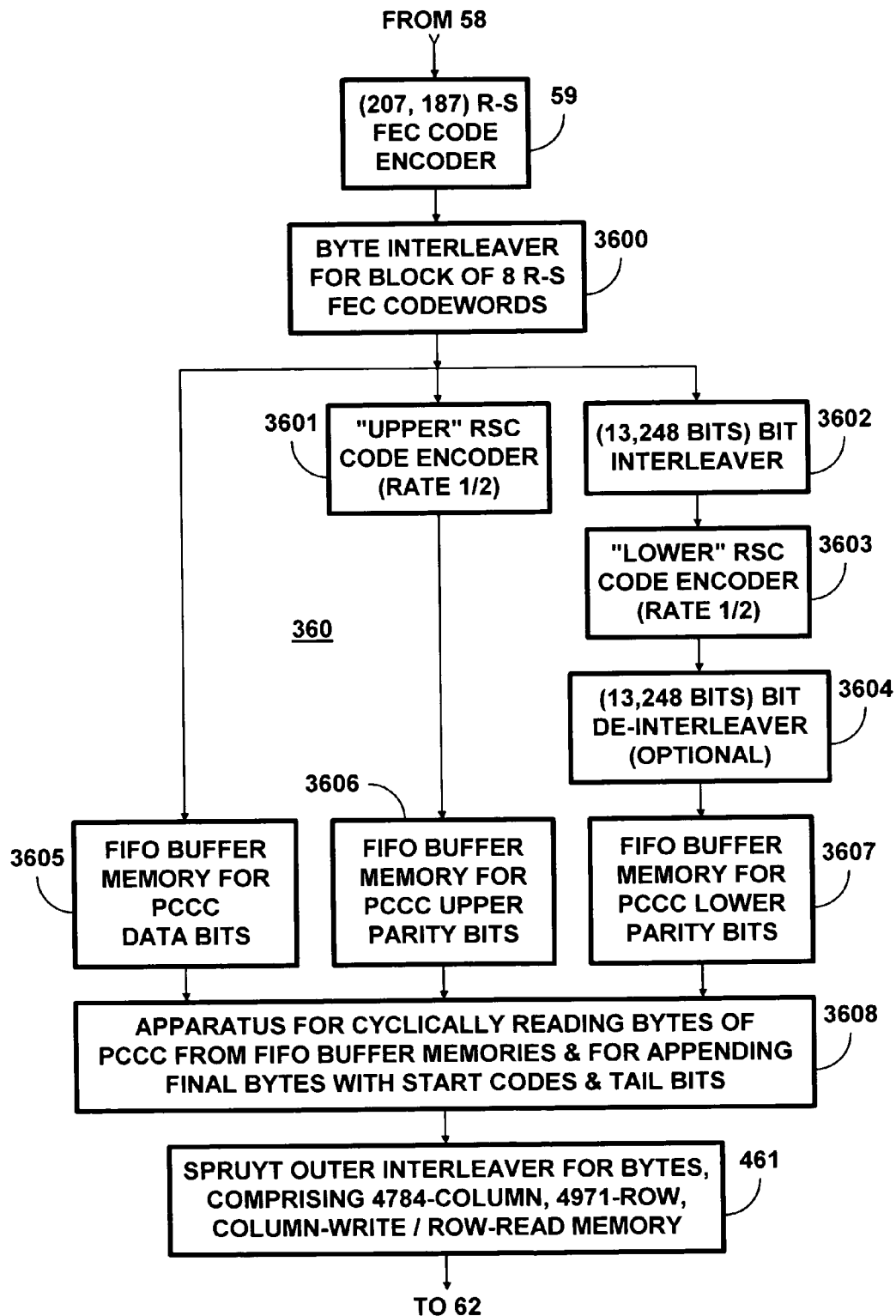
FIG. 23 is a detailed schematic diagram of a turbo code encoder and an outer byte interleaver used in an embodiment of the FIG. 19 transmitter apparatus that uses PCCC to turbo code octets of 207-byte data segments, which outer byte interleaver uses substantially less memory than that in FIG. 22.

FIG. 23 shows the PCCC encoder 360 and an outer byte interleaver 461, which are used as the PCCC encoder 60 and the outer byte interleaver 61 in another embodiment of the FIG. 19 transmitter apparatus that turbo codes octets of (207, 187) R-S FEC codewords using parallel concatenated convolutional coding (PCCC). The outer byte interleaver 461 uses substantially less memory than the outer byte interleaver 361 shown in FIG. 22. The memory in the outer byte interleaver 461 only has 4,784 columns and 4,971 rows of byte-storage locations therein, total, rather than that number in each of two banks within the memory. The memory in the outer byte interleaver 461 is not divided into two banks that are alternately written and read. Instead, there is alternate reading from a selected byte-storage location in memory and writing to a selected byte-storage location in memory. Since there are more rows of byte-storage locations in the memory than there are columns, the addressing during reading and writing can be carried out by a method similar to that described in U.S. Pat. No. 5,907,560. Since the numbers 4,784 and 4,971 have no factors in common, there is no problem with establishing uniform scanning paths through all 4784×4971=23,781,264 byte-storage locations both during their being written and during their being read.

Figure 24:
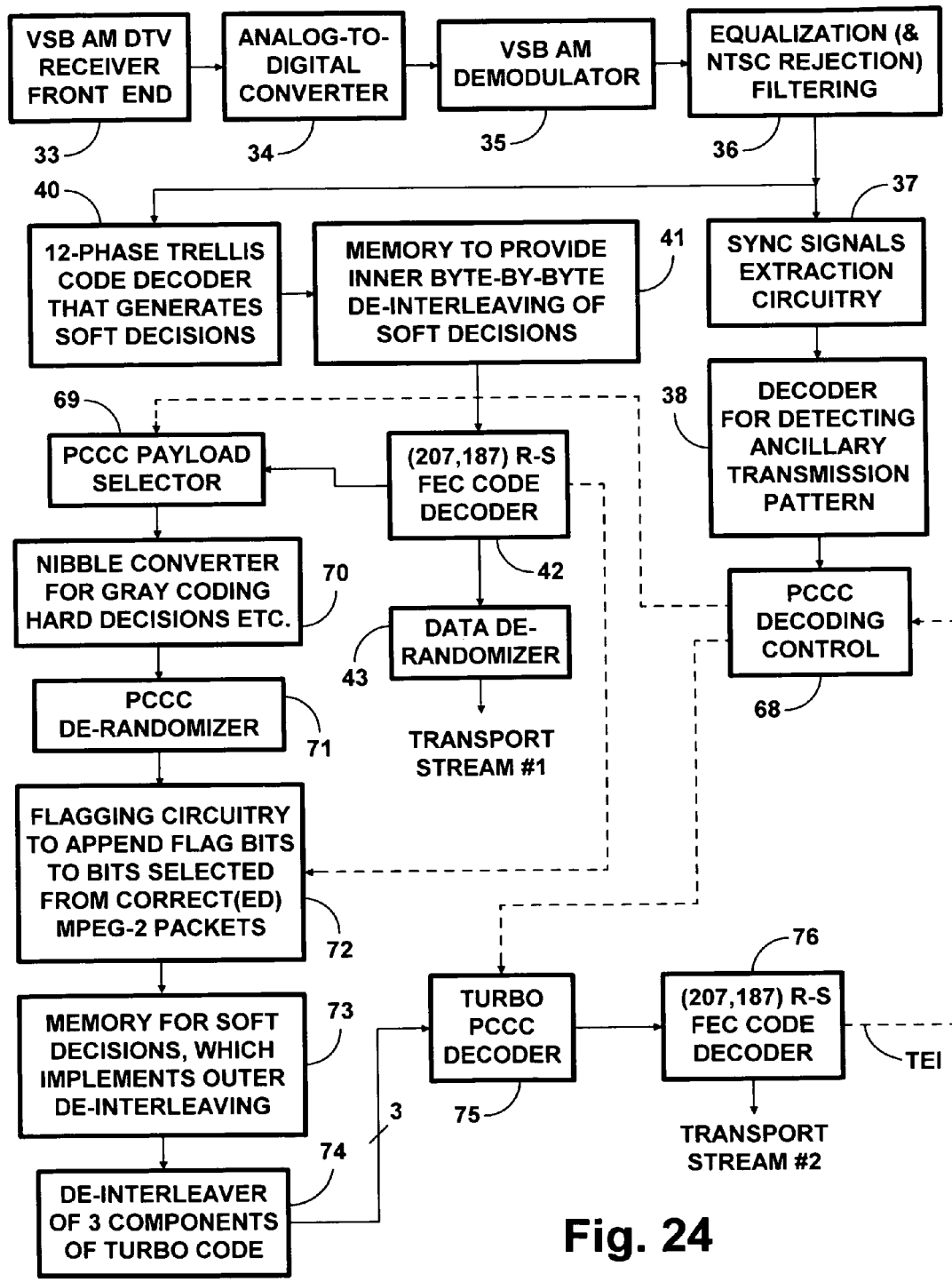
FIG. 24 is a general schematic diagram of receiver apparatus for broadcast DTV signals transmitted by transmitter apparatus of the sort shown in FIG. 19 and FIG. 20 or 21, which receiver apparatus embodies an aspect of the invention.

FIG. 24 shows receiver apparatus for DTV signals transmitted by transmitter apparatus of the general sort shown in FIG. 1, supposing that the PCCC encoder 60 turbo codes individual (207, 187) Reed-Solomon forward-error-correction codewords using parallel concatenated convolutional codes. E.g., the encoder 60 is either the PCCC encoder 160 shown in FIG. 20 or the PCCC encoder 260 shown in FIG. 21. The FIG. 24 DTV receiver apparatus includes the VSB AM DTV receiver front-end 33 for selecting a radio-frequency DTV signal for reception, converting the selected RF DTV signal to an intermediate-frequency DTV signal, and for amplifying the IF DTV signal. The analog-to-digital converter 34 is connected for digitizing the amplified IF DTV signal. The demodulator 35 is connected for demodulating the digitized VSB AM IF DTV signal to generate a digitized baseband DTV signal, which is supplied to the digital filtering 36 for equalization of channel response and for rejection of co-channel interfering NTSC signal. Synchronization signals extraction circuitry 37 is connected for receiving the digital filtering 35 response. Responsive to data-field-synchronization (DFS) signals, the sync signals extraction circuitry 37 detects the beginnings of data frames and fields. Responsive to data-segment-synchronization (DSS) signals, the sync signals extraction circuitry 37 detects the beginnings of data segments. The FIG. 24 DTV receiver apparatus uses the DSS and DFS signals for controlling its operations similarly to the way this is conventionally done. FIG. 24 does not explicitly show the circuitry for effecting these operations.

The decoder 38 for detecting the ancillary transmission pattern responds to the ancillary transmission pattern code contained in the reserved portions of DFS signals separated by the synchronization signals extraction circuitry 37. The decoder 38 is connected for supplying ancillary transmission pattern information to PCCC decoding control circuitry 68 that controls turbo decoding in the FIG. 24 DTV receiver apparatus. The decoder 38 can, for example, be similar to those previously designed for use in enhanced-VSB DTV signal receiver apparatuses or in A-VSB DTV signal receiver apparatuses.

A 12-phase trellis code decoder 40 of a type that generates "soft" decisions as well as "hard" decisions is connected for receiving the digital filtering 36 response. The trellis code decoder 40 can take advantage of the initial two bytes of a null packet having known values, being connected to receive information of when null packets occur from the decoder 38 via a connection not shown in FIG. 24. The dual-port memory 41 is connected for receiving soft-decision decoding results from the trellis code decoder 40 and providing byte-by-byte de-interleaving of those results, which are used to generate input signal for a Reed-Solomon decoder 42 of the de-interleaved (207, 187) R-S FEC codewords read from the memory 41. Preferably, the R-S decoder 42 is of a sort that can use the soft-decision information concerning the de-interleaved (207, 187) R-S FEC codewords to improve overall performance of the decoders 40 and 42. The R-S decoder 42 is connected for supplying randomized data packets to a data de-randomizer 43, which exclusive-ORs the bits of the randomized data packets with appropriate portions of the PRBS prescribed in A/53, Annex D, §4.2.2 to generate de-randomized MPEG-2-compatible data packets of a first, principal transport stream. Insofar as the R-S decoder 42 is capable, it corrects the 187-byte randomized data packets that it supplies to the data de-randomizer 43.

The R-S decoder 42 is connected for supplying the PCCC decoding control circuitry 68 indications of whether there are uncorrected byte errors in each MPEG-2 compatible data packet in the first transport stream. If the R-S decoder 42 finds a recovered data packet to be correct or corrects the recovered data packet, the PCCC decoding control circuitry 68 will use this information to control the filling of subsequent buffer memory from the first transport stream. FIG. 24 does not show this subsequent buffer memory.

The soft-decision decoding results from the trellis code decoder 40, as de-interleaved byte-by-byte in the signal read from the dual-port memory 41 and modified by the R-S decoder 42, are applied as input signal to the input port of a PCCC payload selector 69. If the R-S decoder 42 determines that the hard-decisions in an MPEG-2-compatible null packet are correct or has been able to correct those hard decisions, the soft-decision portions of that packet may be modified accordingly. This can be done before the PCCC payload selector 69, but the FIG. 24 DTV receiver defers changing the soft-decision information accompanying bits of PCCC until after the PCCC payload selector 69. Responsive to control signals received from the PCCC decoding control circuitry 68, the PCCC payload selector 69 separates the turbo coding that is contained in the payload portions of the null packets in the soft-decision signal supplied thereto via the R-S decoder 42. In FIG. 24 the PCCC payload selector 69 subsequently supplies the separated PCCC from its output port to the input port of a nibble converter 70.

The nibble converter 70 Gray codes the hard decisions regarding each nibble of the separated PCCC it is supplied in its input signal, converting from anti-Gray code back to binary code supplied from its output port to the input port of a data de-randomizer 71. The re-coding of the hard decisions uses the same one of the coding tables shown in FIGS. 7 through 14 as was used in the particular sort of FIG. 19 DTV transmitter apparatus transmitting DTV signal over the air to the FIG. 24 DTV receiver apparatus. Except for errors incurred in transmission and reception, the binary coded hard-decision information supplied from the output port of the nibble converter 70 reproduces the interleaved turbo coding from the outer byte interleaver 61 in the FIG. 19 DTV transmitter apparatus. The nibble converter 70 also adjusts the soft-decision information regarding each nibble of the separated PCCC it is supplied in its input signal to reflect the altered symbol mapping that better avoids double-bit errors during data slicing. (The FIG. 19 DTV transmitter apparatus may be modified, so as directly to connect the output port of the outer byte interleaver 61 to the payload data field packer 64. In such case, the FIG. 24 DTV receiver apparatus is modified to omit the nibble converter 70 from the connection of the output port of the PCCC payload selector 69 to the input port of the data de-randomizer 71.) The data de-randomizer 71 complements the ancillary data randomizer 62 in the FIG. 19 DTV transmitter apparatus. The data de-randomizer 71 alters just the hard decisions of the nibble converter 70 response.

In FIG. 24 flagging circuitry 72 is connected for appending a respective flag bit to each bit of the response the data de-randomizer 71. This flag bit indicates whether or not the R-S decoder 42 found the 207-byte R-S codeword the bit is from to have been correct, or was able to correct that R-S codeword. The flagging circuitry 72 is connected to write to a memory 73 the hard-decision bits from the data de-randomizer 71, together their associated soft-decision information from the nibble converter 70 and with their respective flag bits. Note that soft-decision information from the 12-phase trellis decoder 40 is passed down to the memory 73 through elements 41, 42, 69, 70, 71 and 72. The soft-decision information from the 12-phase trellis decoder 40 is transformed by the nibble converter 70, however, to reflect the altered symbol mapping presumed for PCCC.

The memory 73 is operated to provide outer byte-by-byte de-interleaving of soft decisions as well as hard decisions. The memory 73 is written to row-by-row and is read from column-by-column when performing outer de-interleaving in accordance with a pattern that matches the pattern of interleaving by outer byte interleaver 61 in the FIG. 19 transmitter apparatus. The de-interleaver memory 73 is read to reproduce, except for errors incurred in transmission and reception, the outer coding from the PCCC encoder 60 in the FIG. 19 DTV transmitter apparatus.

If the outer byte interleaver 61 in the FIG. 19 transmitter apparatus is the interleaver 161 shown in FIG. 20, the memory in which is separated into two banks to be alternately written to and read from, the memory 73 is similarly separated into two banks. These two banks are alternately written to and read from in accordance with a de-interleaving pattern that matches the interleaving pattern of the interleaver 161 shown in FIG. 20. However, if the outer byte interleaver 61 in the FIG. 19 transmitter apparatus is the interleaver 261 shown in FIG. 21, the memory in which alternately writes to and reads from byte-storage locations therein, the memory 73 is operated to alternately write to and read from byte-storage locations therein. This alternate writing to and reading from the byte-storage locations within the memory 73 is done in accordance with a de-interleaving pattern that matches the interleaving pattern of the interleaver 261 in FIG. 21.

If the outer byte interleaver 61 in the FIG. 19 transmitter apparatus is the interleaver 361 shown in FIG. 22, the memory in which is separated into two banks to be alternately written to and read from, the memory 73 is similarly separated into two banks. These two banks are alternately written to and read from in accordance with a de-interleaving pattern that matches the interleaving pattern of the interleaver 361 shown in FIG. 22. However, if the outer byte interleaver 61 in the FIG. 19 transmitter apparatus is the interleaver 461 shown in FIG. 23, the memory in which alternately writes to and reads from byte-storage locations therein, the memory 73 is operated to alternately write to and read from byte-storage locations therein. This alternate writing to and reading from the byte-storage locations within the memory 73 is done in accordance with a de-interleaving pattern that matches the interleaving pattern of the interleaver 461 in FIG. 23.

A de-interleaver 74 for separating the three components of the turbo code is connected to receive the bits of the reproduced outer coding read from the memory 73 together with their respective accompanying flag bits indicative of the likelihood of their being correct. The de-interleaver 74 separates the three components of the turbo code byte by byte for application to a turbo decoder 75 for parallel concatenated convolutional code (PCCC). The soft decisions and flag bits associated with the bits of the reproduced outer coding are preserved during this further de-interleaving procedure. In actual practice the de-interleaver 74 will usually be subsumed into the memory 73 by altering the addressing of its byte-storage locations that are read from. By way of example, the turbo PCCC decoder 75 may be of a type similar to that described by M. C. Valenti and J. Sun in the article "The UMTS Turbo Code and an Efficient Decoder Implementation Suitable for Software-Defined Radios" in International Journal of Wireless Information Networks, Vol. 8, No. 4, October 2001. A Reed-Solomon decoder 76 is connected for receiving (207, 187) Reed-Solomon forward-error-correction-coded data recovered by the turbo PCCC decoder 75. The R-S decoder 76 produces 187-byte MPEG-2-compatible data packets of a second, ancillary transport stream.

The R-S decoder 76 is further connected for supplying the PCCC decoding control circuitry 68 indications of byte errors in the 187-byte packets of ancillary data. If the R-S decoder 76 finds a recovered 187-byte data packet to be correct or corrects the recovered data packet, the PCCC decoding control circuitry 68 will discontinue further trying to correct that data packet. The PCCC decoding control circuitry 68 keeps track of the number of decoding iterations for each turbo-coded packet in the turbo data field and the number of turbo-coded data packets that remain uncorrected. The PCCC decoding control circuitry 68 uses this information to control the filling of subsequent buffer memory written from the second transport stream. FIG. 24 does not show this subsequent buffer memory. In some DTV receivers the first and second transport streams may be combined into a single transport stream using a common buffer memory. In such case, the PCCC decoding control circuitry 68 includes circuitry for arbitrating the order in which packets from the first and second transport streams are to be written into the common buffer memory.

Figure 25:
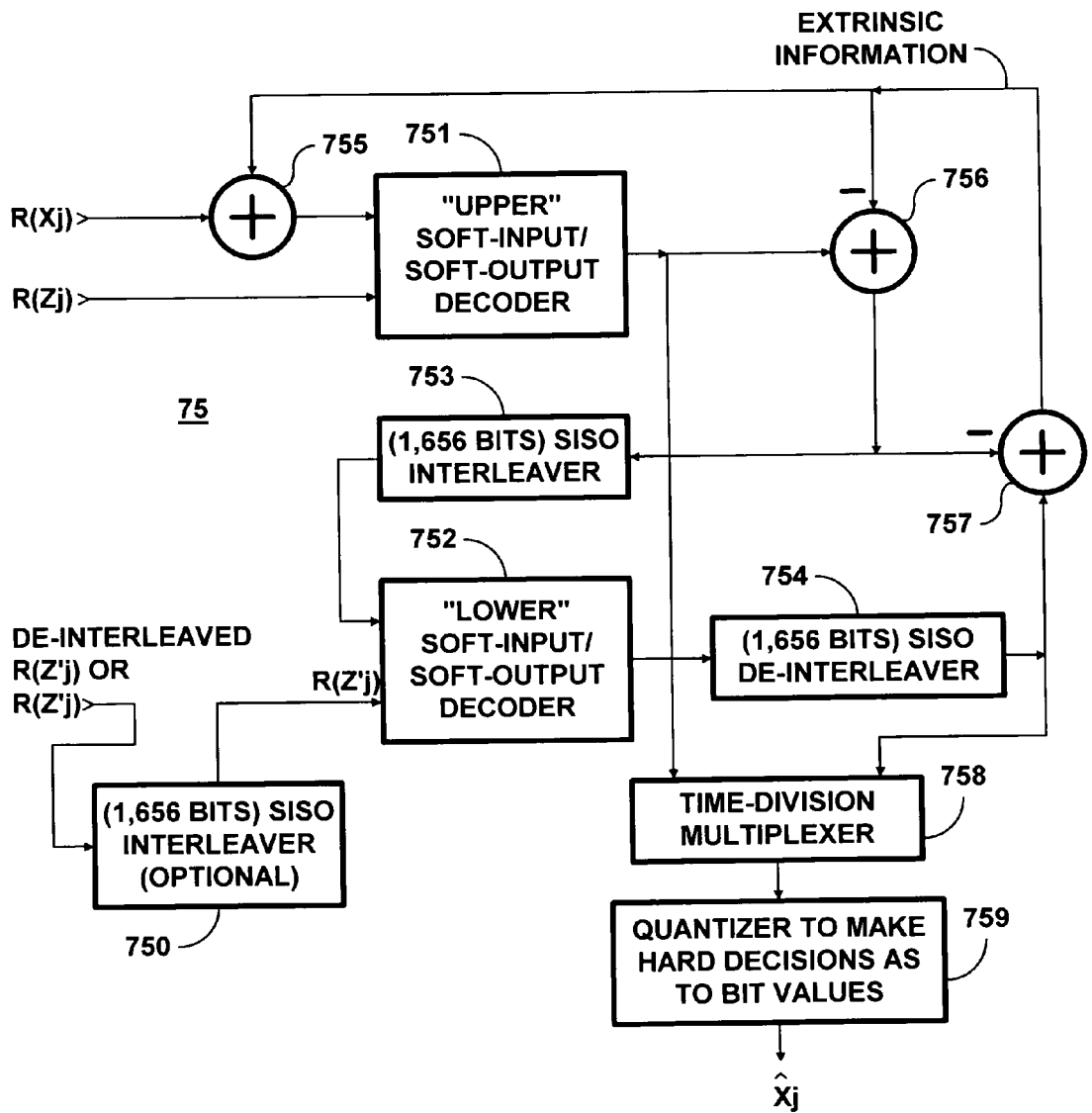
FIG. 25 is a schematic diagram showing the decoder used in the FIG. 24 DTV receiver apparatus for turbo decoding parallel concatenated convolutional codes.

FIG. 25 shows the basic architecture of the PCCC decoder 75 for the three components of PCCC supplied from the de-interleaver 74 shown in FIG. 24. The three components of turbo coding supplied from the de-interleaver 74 are converted to probabilistic expressions referred to as "log-likelihood ratios" (LLRs) for use in this basic architecture for the PCCC decoder 75. A distinctive feature of this basic architecture is the soft-input/soft-output interleaver 750. Its inclusion is based on the presumption that received signals are transmitted by transmitter apparatus as shown in FIG. 19 that is of a type that de-interleaves the "lower" parity code bits following their generation by the "lower" RSC code encoder. FIG. 25 does not show the buffer memories that are included in many of the interconnections between elements of the basic architecture of the PCCC decoder 75, but are customarily omitted in diagrams of PCCC decoder architecture. The basic architecture shown in FIG. 25 includes an "upper" soft-input/soft-output decoder 751, a "lower" soft-input/soft-output decoder 752, a soft-input/soft-output interleaver 753, a soft-input/soft-output de-interleaver 754, and (signed) two-input adders 755, 756 and 757. The LLRs computed by the SISO decoders 751 and 752 compare the probability that each particular data bit was a ONE versus the probability that it was a ZERO, considering soft decisions as to other bits of the received turbo codeword.

The SISO interleaver 753 is designed to accommodate soft decisions concerning the 1,656 data bits of a turbo codeword. The permutation pattern of the SISO interleaver 753 is similar to the permutation pattern of the bit interleaver 1602 used in the FIG. 20 encoder 160 for turbo coding or to the permutation pattern of the bit interleaver 2602 used in the FIG. 21 encoder 260 for turbo coding. The SISO interleaver 750, if used, uses the same permutation pattern. The SISO de-interleaver 754 uses a permutation pattern that complements the permutation pattern of the SISO interleaver 753 and also that of the SISO interleaver 750, if used.

The soft-decisions as to data bits as converted to LLR form, $R(X_j)$, are supplied as one of two summand input signals to the adder 755, to be additively combined with the other of the two summand input signals consisting of extrinsic information fed back from any previous decoding procedure the "lower" SISO decoder 752 performed on the same turbo codeword. The adder 755 is connected for supplying the sum output signal therefrom to an upper input port of the "upper" soft-input/soft-output decoder 751. A lower input port of the "upper" SISO decoder 751 is connected for receiving the first set of parity code soft-decisions $R(Z_j)$ as converted to LLR form. A lower input port of the "lower" SISO decoder 752 is connected for receiving the second set of parity code soft-decisions $R(Z'_j)$ as converted to LLR form. Presuming that received signals are transmitted by transmitter apparatus as shown in FIG. 19 that is of a type that de-interleaves the "lower" parity code bits following their generation by the "lower" RSC code encoder, this second set of parity code soft-decisions $R(Z'_j)$ is rearranged in an interleaving procedure that restores their original order for application to the lower input port of the "lower" SISO decoder 752.

The SISO decoders 751 and 752 may employ the soft-output Viterbi algorithm (SOVA) or the maximum a posteriori (MAP) algorithm. The MAP algorithm is more complex than SOVA, but performs better. The MAP algorithm is more easily performed in the logarithmic regime, so that multiplications become simple additions in the SISO decoders 751 and 752. The adders 755, 756 and 757 accordingly operate in the logarithmic regime. It is known to implement addition in the logarithmic regime simply by taking the maximum of the arguments of the two summands and then adding a correction function the argument of which depends only on the magnitude of the difference between the two arguments. The correction function is customarily pre-computed and stored in a lookup table.

The SISO decoders 751 and 752 operate at different times. The "upper" SISO decoder 751 operates during the initial half of each performance of the turbo decoding procedure. Subsequently the "lower" SISO decoder 752 operates during the final half of that performance of the turbo decoding procedure. When decoding of a fresh turbo codeword commences, there is no extrinsic information fed back from the SISO decoder 752 to the adder 755, so the adder 755 supplies $R(X_j)$ as its sum signal to the SISO decoder 751. The SISO decoder 751 operates during the initial half of the first performance of the turbo decoding procedure on a current turbo codeword to generate an LLR comparing the probability that each particular data bit in $R(X_j)$ was a one versus the probability that it was a zero, considering the soft decisions in $R(X_j)$ and in $R(Z_j)$. This LLR, generated without dependency on extrinsic information, is supplied as minuend to the signed adder 756 operated as a subtractor, which is connected to receive the extrinsic information as subtrahend input signal. The difference signal supplied from the output port of the signed adder 756 is a revised LLR comparing the probability that each particular data bit was a ONE versus the probability that it was a ZERO, which revised LLR has no dependency on extrinsic information. The output port of the signed adder 756 is connected for supplying this difference signal to the input port of the SISO interleaver 753.

The output port of the SISO interleaver 753 is connected for supplying its interleaved response to the revised LLR to an upper input port of the "lower" soft-input/soft-output decoder 752. The "lower" SISO decoder 752 then operates during the final half of the first performance of the turbo decoding procedure on the current turbo codeword, responsive to the bit interleaver 753 response received at its upper input port and to the second set of parity code soft-decisions $R(Z'_j)$ received at its lower input port. The SISO decoder 752 generates a further revised LLR supplied from an output port thereof connected to the input port of the SISO de-interleaver. The response from the output port of the SISO de-interleaver 754 re-arranges the soft decisions of this further revised LLR to an order corresponding to the order of soft decisions in the revised LLR supplied as difference signal from the output port of the signed adder 756. The signed adder 757 is operated as a subtractor, one of its input ports being connected to receive as minuend input signal the further revised LLR from the output port of the SISO de-interleaver 754. The other input port of the signed adder 757 is connected to receive as subtrahend input signal the revised LLR from the output port of the signed adder 756. The difference signal supplied from the output port of the signed adder 757 is the extrinsic information for the subsequent iteration of the turbo decoding procedure, if such there is to be.

In the standard basic architecture of the PCCC decoder the de-interleaved further revised LLR from the output port of the SISO de-interleaver 754 is quantized to recover a (207, 187) R-S FEC codeword for application to the R-S decoder 76. FIG. 25 shows the basic architecture of the decoder 75 further including a time-division multiplexer 758, which has its output port connected to the input port of a quantizer 759 for making hard decisions as to each of the bits in a recovered (207, 187) R-S FEC codeword. One of the two input ports of the multiplexer 758 is connected for receiving the de-interleaved further revised LLR from the output port of the SISO de-interleaver 754, but the other input port of the multiplexer 758 is connected for receiving the LLR computed by the SISO decoder 751. This latter connection permits the PCCC decoding control circuitry 68 to discontinue the processing of a current PCCC word by the decoder 75 halfway through a complete cycle of turbo decoding procedure.

The output port of the quantizer 758 is connected for supplying the R-S FEC codeword recovered by the decoder 75 to the input port of the R-S decoder 76 shown in FIG. 24. If the R-S decoder 76 finds the recovered R-S FEC codeword to be correct or is able to correct it, this information is conveyed to the PCCC decoding control circuitry 68. This information causes circuitry 68 to terminate turbo decoding procedures on the current PCCC word and to begin turbo decoding procedures on the next PCCC word. After some specified number of iterations of the turbo coding procedure, the PCCC decoding control circuitry 68 will in any case terminate turbo decoding procedures on the current PCCC word and begin turbo decoding procedures on the next PCCC word. Otherwise, if the R-S decoder 76 finds the recovered R-S FEC codeword to contain too many byte errors to be corrected, the PCCC decoding control circuitry 68 directs a further iteration of turbo decoding procedures on the current PCCC word.

In each iteration of turbo decoding procedure on the current PCCC word, the extrinsic information supplied from the output port of the signed adder 757 during the preceding performance of the turbo decoding procedure on the current PCCC word is added to $R(X_j)$ by the adder 755 and applied to the upper input port of the "upper" soft-input/soft-output decoder 751. The SISO decoder 751 operates during the initial half of each iteration of the turbo decoding procedure on a current PCCC word to generate an LLR comparing the probability that each particular data bit in $R(X_j)$ was a one versus the probability that it was a zero, considering the soft decisions in $R(X_j)$ as updated by the extrinsic information from the preceding performance of the turbo decoding procedure on the current PCCC word, and considering the soft decisions in $R(Z_j)$. This LLR is supplied via the multiplexer 758 to the quantizer 759.

The LLR that the SISO decoder 751 generates has some dependency on extrinsic information. This LLR is also supplied as minuend to the signed adder 756 operated as a subtractor and connected to receive the extrinsic information as subtrahend input signal. The difference signal supplied from the output port of the signed adder 756 is a currently revised LLR comparing the probability that each particular data bit was a ONE versus the probability that it was a ZERO. This currently revised LLR has its dependency on extrinsic information from the SISO decoder 752 suppressed. The output port of the signed adder 756 is connected for supplying this difference signal to the input port of the SISO interleaver 753.

The output port of the SISO interleaver 753 is connected for supplying its interleaved response to the currently revised LLR to an upper input port of the "lower" soft-input/soft-output decoder 752. The "lower" SISO decoder 752 then operates during the final half of the iterated turbo decoding procedure on the current turbo codeword, responsive to the bit interleaver 753 response received at its upper input port and to the second set of parity code soft-decisions $R(Z'_j)$ received at its lower input port. The SISO decoder 752 generates a currently further revised LLR supplied from an output port thereof connected to the input port of the bit de-interleaver 754. The response from the output port of the SISO de-interleaver 754 re-arranges the soft decisions of this currently further revised LLR to an order corresponding to the order of soft decisions in the currently revised LLR supplied as difference signal from the output port of the signed adder 756. The signed adder 757 is operated as a subtractor, receiving the currently further revised LLR from the output port of the SISO de-interleaver 754 as minuend input signal, and receiving the currently revised LLR from the output port of the signed adder 756 as subtrahend input signal. The difference signal supplied from the output port of the signed adder 757 is the extrinsic information for the subsequent iteration of the turbo decoding procedure, if such there is to be.

Figure 26:
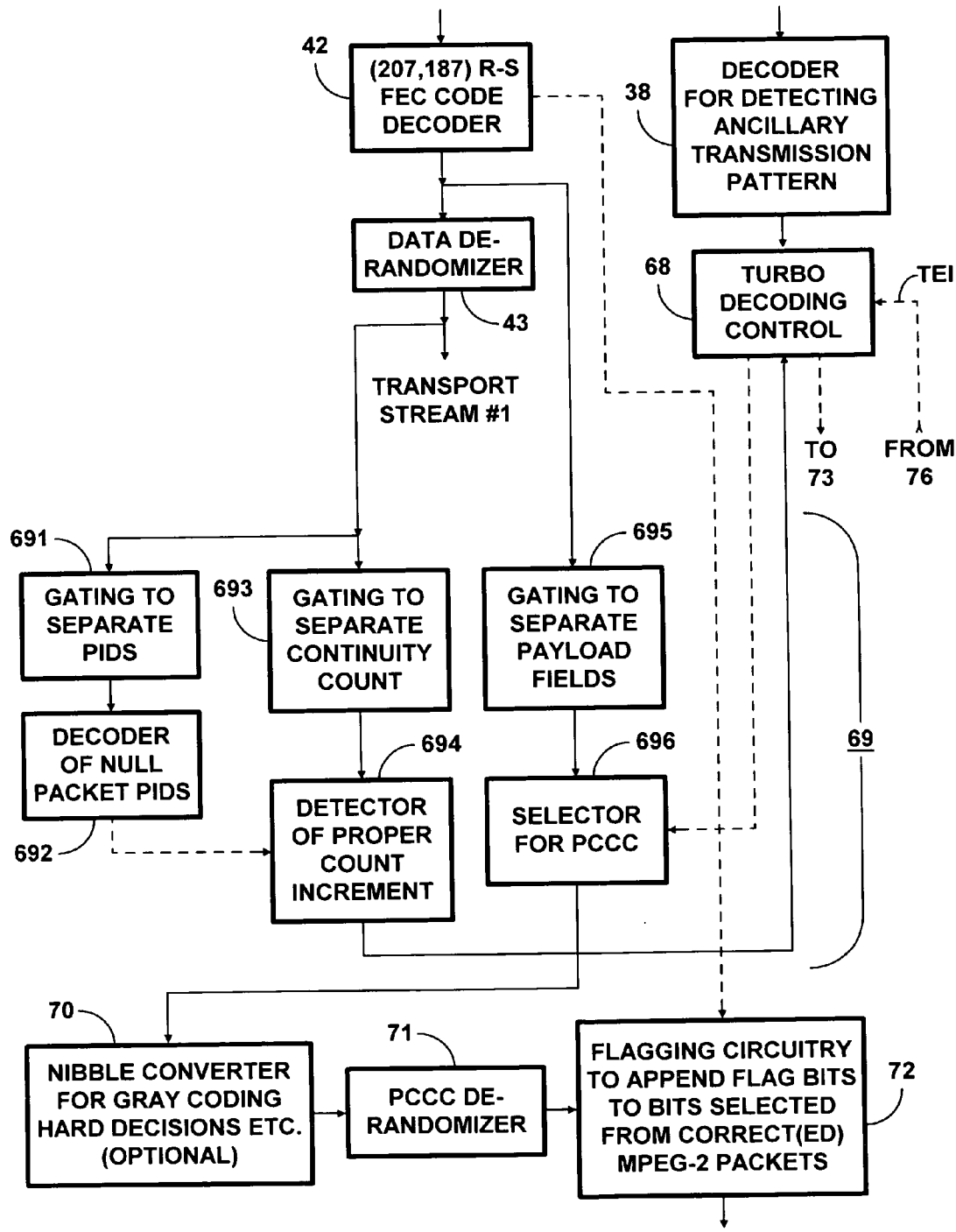
FIG. 26 is a schematic diagram showing in greater detail a PCCC payload selector employed by some DTV receiver apparatuses embodying the invention.

FIG. 26 shows the PCCC payload selector 69 of the FIG. 24 receiver apparatus in greater detail. The input signal the PCCC payload selector 69 receives from the cascade connection of the R-S decoder 42 and the data de-randomizer 43 comprises soft decisions as to the bits in 207-byte data segments from the dual-port memory 41. Each of these 207-byte data segments begins with a respective 187-byte MPEG-2-compatible data packet. Gating circuitry 691 separates the 13-bit PIDs from the first and second bytes of the 187-byte packets for application to a decoder 692 of null-packet PIDs. The decoder 692 generates a logic ONE output signal if and only if the 13-bit PID of a 187-byte packet is that identifying the packet as being a null packet. Otherwise, the decoder 692 generates a logic ZERO output signal.

Gating circuitry 693 separates the continuity count from the third byte of the 187-byte packets in the first transport stream for application to a detector 694 of proper count increment. The decoder 692 of null-packet PIDs clocks the 4-bit continuity count into an two-stage shift register at the input of the detector 694 when and only when the decoder 692 identifies the packet as being a null packet. The detector 694 compares the most recent 4-bit continuity count in the initial stage of the shift register with the previous 4-bit continuity count in the final stage of the shift register, to determine whether or not the count has incremented by one in a modular arithmetic. The DTV transmitter is operated so that the count will increment by one if and only if the current 187-byte packet contains turbo coding as payload. The detector 694 generates a logic ONE output signal if and only if the count increments by one, indicating that the current 187-byte packet presumably contains turbo coding. The detector 694 is connected to supply this information to the PCCC decoding control circuitry 68. Ordinarily, this information confirms the ancillary transmission pattern supplied by the decoder 38. If the decoder 38 is unable to furnish the ancillary transmission pattern, the PCCC decoding control circuitry 68 can use the information from the detector 694 to generate a substitute for the missing ancillary transmission pattern.

Gating circuitry 695 separates the 184-bit payload data fields that conclude the 187-byte packets in response of the R-S decoder 42 for application to a selector 696 for PCCC—i.e., for turbo coding. Responsive to the ancillary transmission pattern or a substitute therefor, the PCCC decoding control circuitry 68 generates a control signal for the selector 696. This control signal conditions the selector 696 to reproduce the 184-bit payload data fields that contain PCCC, which are supplied from the output port of the selector 696 as the PCCC payload selector 69 output signal. The selector 696 is connected for supplying the reproduced 184-bit payload data fields to the input port of the nibble converter 70 as input signal thereto. The output port of the nibble converter 70 is connected for supplying randomized turbo coding to the input port of the flagging circuitry 71 as input signal thereto.

Figure 27:
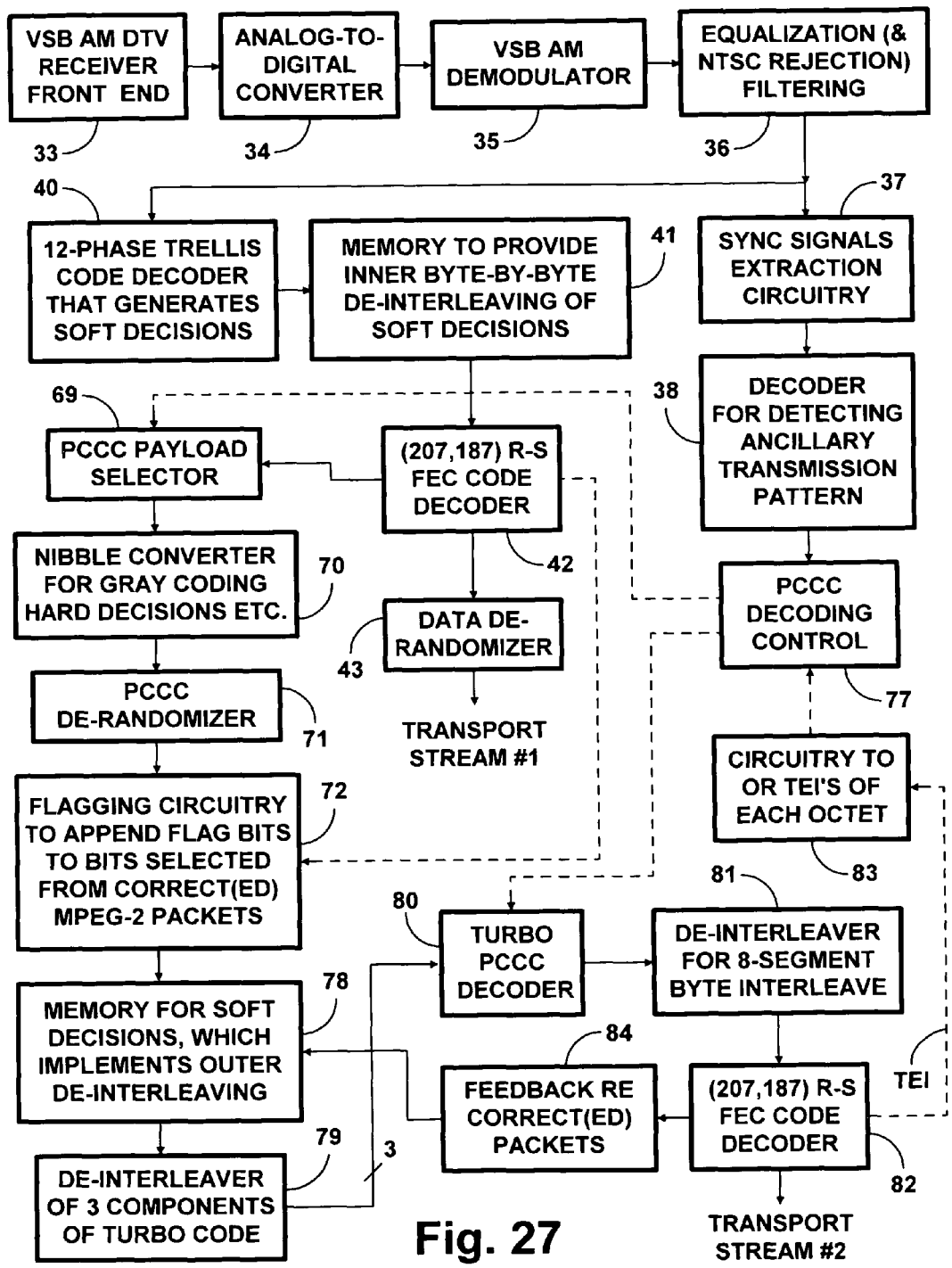
FIG. 27 is a general schematic diagram of receiver apparatus for broadcast DTV signals transmitted by transmitter apparatus of the sort shown in FIG. 19 and FIG. 22 or 23, which receiver apparatus embodies an aspect of the invention.

FIG. 27 shows receiver apparatus for DTV signals transmitted by transmitter apparatus of the general sort shown in FIG. 1, supposing that the PCCC encoder 60 turbo codes octets of 207-byte data segments. I.e., the encoder 60 is the PCCC encoder 360 connected either as shown in FIG. 22 or as shown in FIG. 23. Elements 33-38, 40-43, and 69-72 of the FIG. 27 DTV receiver apparatus are similar in structure, interconnections and operation to similarly numbered elements in the FIG. 24 DTV receiver apparatus. The PCCC decoding control circuitry 68 of the FIG. 24 DTV receiver apparatus is replaced by PCCC decoding control circuitry 77 in the FIG. 27 DTV receiver apparatus. The operation of the PCCC decoding control circuitry 77 insofar as controlling the PCCC payload selector 69 is similar to that of the PCCC decoding control circuitry 68 in the FIG. 24 DTV receiver apparatus.

The memory 73 used in the FIG. 24 DTV receiver apparatus for block de-interleaving of bytes is replaced in the FIG. 27 DTV receiver apparatus by memory 78 for block de-interleaving of bytes. The flagging circuitry 72 is connected to write to [a] the memory 78 the hard-decision bits from the data de-randomizer 71, together their associated soft-decision information from the nibble converter 70 and with their respective flag bits. The memory 78 is operated to provide outer byte-by-byte de-interleaving of soft decisions and flag bits, as well as hard decisions.

The PCCC decoding control circuitry 77 controls the writing and reading of the memory 78, although FIG. 27 does not explicitly show the control connections between the circuitry 77 and the memory 78 for passage of control signals. The memory 78 is written to row-by-row and is read from column-by-column when performing outer de-interleaving in accordance with a pattern that matches the pattern of interleaving by outer byte interleaver 61 in the FIG. 19 transmitter apparatus. This control operation is generally similar to one of the ways that the PCCC decoding control circuitry 68 uses to control the writing and reading of the memory 73 in the FIG. 24 DTV receiver apparatus, but differs in its particulars to suit the different interleaving matrix. If the outer byte interleaver 61 in the FIG. 19 transmitter apparatus is the interleaver 361 shown in FIG. 22, the memory in which is separated into two banks to be alternately written to and read from, the memory 78 is similarly separated into two banks. These two banks are alternately written to and read from in accordance with a de-interleaving pattern that matches the interleaving pattern of the interleaver 361 shown in FIG. 22. However, if the outer byte interleaver 60 in the FIG. 19 transmitter apparatus is the interleaver 461 shown in FIG. 23, the memory in which alternately writes to and reads from byte-storage locations therein, the memory 78 is operated to alternately write to and read from byte-storage locations therein. This alternate writing to and reading from the byte-storage locations within the memory 78 is done in accordance with a de-interleaving pattern that matches the interleaving pattern of the interleaver 461 shown in FIG. 23.

A de-interleaver 79 for separating the three components of the PCCC is connected to receive the bits of the reproduced outer coding read from the memory 78. The de-interleaver 79 separates the three components of the turbo code byte by byte for application to a turbo decoder 80 for PCCC. The soft decisions and flag bits associated with the bits of the reproduced outer coding are preserved during this further de-interleaving procedure. In actual practice the de-interleaver 79 will usually be subsumed into the memory 78 by altering the addressing of its byte-storage locations that are read from. The turbo code decoder 80 in the FIG. 27 DTV receiver apparatus replaces the turbo code decoder 75 used in the FIG. 24 DTV receiver apparatus for decoding turbo-coded (207, 187) R-S FEC codewords one at a time. The turbo code decoder 80 is connected for receiving the three separated components of PCCC words descriptive of interleaved octets of eight successive (207, 187) R-S FEC codewords and decodes those codewords under control of instructions from the PCCC decoding control circuitry 77. The turbo PCCC decoder 80 is connected for supplying the interleaved octets of eight successive (207, 187) R-S FEC codewords that its decoding procedures recover to a de-interleaver 81 for the 8-segment byte interleave of each octet of (207, 187) R-S FEC codewords.

The de-interleaver 81 is connected for supplying successive (207, 187) R-S FEC codewords that result from its de-interleaving procedures to a decoder 82 for decoding (207, 187) Reed-Solomon forward-error-correction codewords that replaces the similar decoder 76 in the FIG. 24 DTV receiver apparatus. The R-S decoder 82 produces 187-byte MPEG-2-compatible data packets of the ancillary second transport stream. The R-S decoder 82 is further connected for supplying indications of byte errors in the 187-byte packets of ancillary data to circuitry 83 for supplying the PCCC decoding control circuitry 77 with an OR-gate response to those indications for each successive octet of (207, 187) R-S FEC codewords. If and only if the R-S decoder 82 finds all eight recovered 187-byte data packets in an octet to be correct or is able to correct any that are incorrect, the OR response of the circuitry 48 will be a logic ZERO. Responsive to this logic ZERO, the PCCC decoding control circuitry 77 will discontinue further turbo decoding procedures on the turbo-coded octet. The PCCC decoding control circuitry 77 keeps track of the number of decoding iterations for each PCCC word in the turbo data field and will discontinue further turbo decoding procedures on the PCCC octet when that number reaches a prescribed maximum. In some DTV receivers the first and second transport streams may be combined into a single transport stream using a common buffer memory. In such case, the PCCC decoding control circuitry 77 includes circuitry for arbitrating the order in which packets from the first and second transport streams are to be written into the common buffer memory.

The PCCC decoding control circuitry 77 will instruct the turbo PCCC decoder 80 to reiterate its decoding procedures if fewer than all eight of the 187-byte data packets in an octet were correct or corrected. However, the fact that some of the 187-byte data packets in an octet were correct or corrected is valuable information for the turbo code decoder 80 to have when its decoding procedures are reiterated. FIG. 27 shows a feedback connection 84 for conducting that information back to the memory 78. Part of this information consists of the bytes that were lost because of deep fades and were subsequently recovered by error-correction procedures in the R-S decoder 82. This information further comprises flag bits identifying for the benefit of the turbo PCCC decoder 80 those bits contained in (207, 187) R-S codewords containing correct or corrected MPEG-2-compatible packets.

Note that feeding back such information is infeasible if long-delay outer byte de-interleaving is introduced between the decoders for turbo codewords and R-S codewords and subsequent. Besides the long delay of the outer byte de-interleaving in the feedback loop, there is similar long-delay in the interleaver required for re-interleaving after the R-S decoder. There is still an 8-data-segment or so delay in obtaining R-S decoding results, owing to the de-interleaver 81 for the 8-segment interleave, which de-interleaver 81 is required when only the single decoder 82 is used for decoding (207, 187) R-S FEC codewords.

Figure 28:
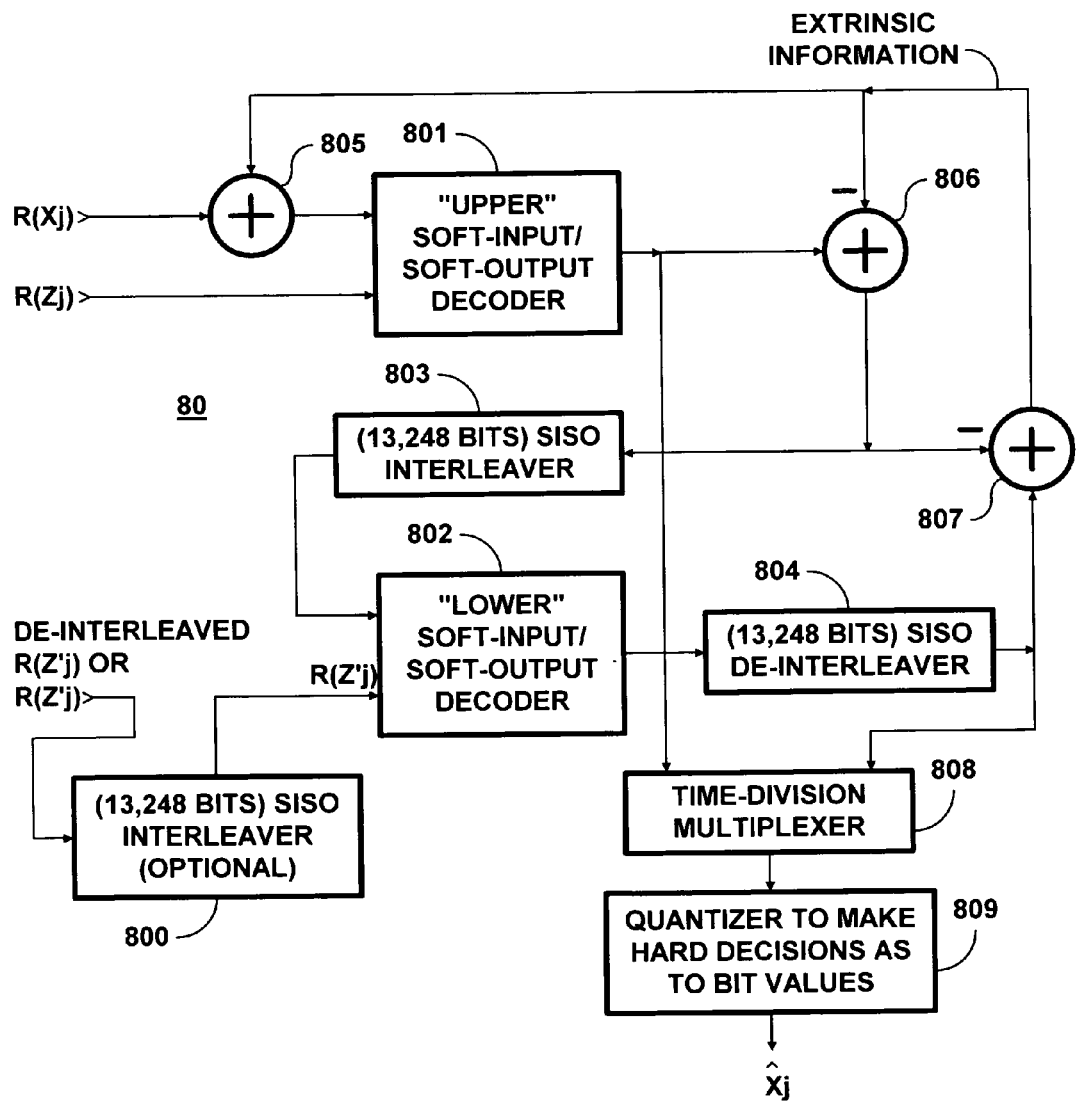
FIG. 28 is a schematic diagram showing the decoder used in the FIG. 27 DTV receiver apparatus for turbo decoding PCCC.

FIG. 28 shows the basic architecture of the decoder 80 for the three components of PCCC supplied from the de-interleaver 79 shown in FIG. 27. The three components of PCCC supplied from the de-interleaver 79 are converted to LLRs for use in this basic architecture for the decoder 80. A distinctive feature of this basic architecture is the soft-input/soft-output interleaver 800 that is included, presuming that received signals are transmitted by DTV transmitter apparatus as shown in FIG. 19 that is of a type that de-interleaves the "lower" parity code bits following their generation by the "lower" RSC code encoder. This basic architecture includes an "upper" soft-input/soft-output decoder 801, a "lower" soft-input/soft-output decoder 802, a soft-input/soft-output interleaver 803, a soft-input/soft-output de-interleaver 804, and (signed) two-input adders 805, 806 and 807. The LLRs computed by the SISO decoders 801 and 802 compare the probability that the particular data bit was a one versus the probability that it was a zero, considering the entire received turbo codeword. The basic architecture of the decoder 80 further includes a time-division multiplexer 808 and a quantizer 809. The interconnections of the elements 800, 801, 802, 803, 804, 805, 806, 807, 808 and 809 in the decoder 80 are similar to those of the elements 750, 751, 752, 753, 754, 755, 756, 757, 758 and 759 in the FIG. 25 decoder 75.

The SISO decoders 801 and 802 are similar in structure to the SISO decoders 751 and 752 used in the FIG. 25 decoder 75 for turbo coding. The SISO interleaver 803 is designed to accommodate soft decisions concerning 13,248 data bits of a turbo codeword. The permutation pattern of the SISO interleaver 803 is similar in design to the permutation pattern of the bit interleaver 3122 used in the encoder 312 for turbo coding shown in FIG. 22 or in FIG. 23. The SISO interleaver 800, if used, uses the same permutation pattern. The SISO de-interleaver 804 uses a permutation pattern that complements the permutation pattern of the SISO interleaver 803 and also that of the SISO interleaver 800, if used.

Figure 29:
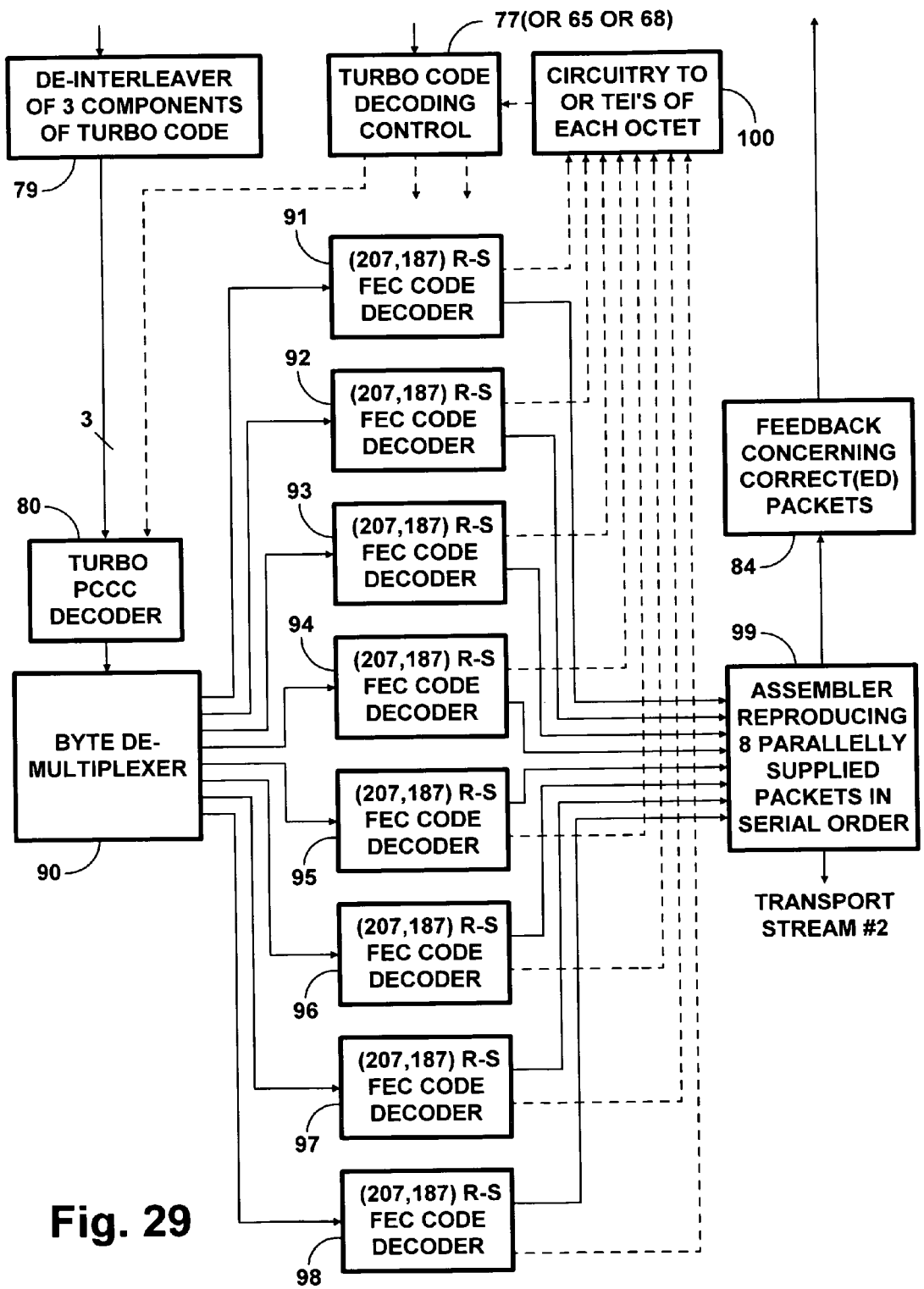
FIG. 29 is a schematic diagram of a modification of the FIG. 27 receiver apparatus for broadcast DTV signals, which modified receiver apparatus embodies an aspect of the invention.

FIG. 29 shows modifications that can be made to the FIG. 27 DTV receiver apparatus to speed up the recovery of R-S decoding results. The PCCC decoder 80 is connected for supplying to a byte de-multiplexer 90 each successive interleaved octet of (207, 187) R-S FEC codewords recovered by the decoder 80 from a PCCC word. The byte de-multiplexer 90 separates the eight (207, 187) R-S FEC codewords of each octet for application to respective ones of eight decoders 91, 92, 93, 94, 95, 96, 97 and 98 for decoding (207, 187) R-S FEC codewords. The byte de-multiplexer 90 typically includes some differential delay after de-interleaving so that the eight (207, 187) R-S FEC codewords are received simultaneously by the eight decoders 91, 92, 93, 94, 95, 96, 97 and 98. The eight R-S decoders 91, 92, 93, 94, 95, 96, 97 and 98 supply the results of decoding the eight (207, 187) R-S FEC codewords very shortly after reception of them is completed. This is some seven data segments or so earlier than with the FIG. 27 cascade connection of the de-interleaver 81 and the single R-S decoder 82.

An assembler 99 receives each successive octet of (207, 187) R-S FEC codewords parallelly supplied from the eight R-S decoders 91, 92, 93, 94, 95, 96, 97 and 98 and reproduces them in correct serial order for extraction of information to be conducted back to the memory 78 via the feedback connection 84. The assembler 99 also selects the 187-byte MPEG-2-compatible packets contained within the serially ordered (207, 187) R-S FEC codewords to generate the ancillary second transport stream. The serial ordering of the selected packets facilitates loading them into buffer memory.

FIG. 29 shows circuitry 100 replacing the circuitry 83 shown in FIG. 27. The circuitry 100 is connected to supply the PCCC decoding control circuitry 77 an OR-gate response to the transport error indications that the eight R-S decoders 91, 92, 93, 94, 95, 96, 97 and 98 generate. These transport error indications are generated in response to each successive octet of (207, 187) R-S FEC codewords supplied them by the byte de-multiplexer 90.

The capability of the decoder 42 in the DTV receiver apparatuses of FIGS. 24, 27 and 29 to correct byte errors in (207, 187) R-S FEC codewords is doubled if byte errors are located beforehand. A method for locating byte errors during Viterbi trellis decoding is described in U.S. Pat. No. 7,103,831 titled "Burst Reliability and Error Locator for Trellis Codes", which issued 5 Sep. 2006 to A. Krieger and D. B. Eidson. The capability of the FIG. 24 DTV receiver apparatus to withstand drop-outs in signal strength is lengthened by doubling the byte error correction capability of the decoder 76 to correct byte errors in (207, 187) R-S FEC codewords. This depends upon byte errors being located during the turbo decoding procedure. Similarly, the capability of the FIG. 27 DTV receiver apparatus to withstand drop-outs in signal strength is lengthened by doubling the byte error correction capability of the decoder 82 to correct byte errors in (207, 187) R-S FEC codewords.

DTV systems can be designed that are able to overcome protracted drop-outs in signal strength without requiring as many byte-storage locations both in outer interleaver memory and in outer de-interleaver memory, providing that some further reduction in code rate is acceptable. Some of these designs are less preferred alternative embodiments of the invention that depend on the ancillary transport stream being forward-error-correction coded with a more powerful Reed-Solomon code. Decoding operations take longer time as the number of erroneous bytes that can be corrected in the R-S FEC codeword is increased by adding further parity bytes to the 187-byte data packet.

By way of example, the well-known (255, 223) Reed-Solomon code can be shortened to a (219, 187) Reed-Solomon code with 1.6 times the capability for withstanding protracted drop-outs in signal strength that the (207, 187) Reed-Solomon code has. So, the byte-storage locations both in outer interleaver memory and in outer de-interleaver memory can be reduced some 37% compared to designs using (207, 187) R-S coding, while keeping the same capability to overcome protracted drop-outs in signal strength. The (219, 187) R-S code does not lend itself particularly well to turbo coding with a frame size that is a multiple both of 184 bytes and of 219 bytes, 219 and 184 having no factors in common with each other. Four (230, 187) R-S codewords would fit exactly into five 184-byte payload-data fields. This would allow a 53% reduction in memory requirements for outer interleaver memory and for outer de-interleaver memory compared to designs using (207, 187) R-S coding, while keeping the same capability to overcome protracted drop-outs in signal strength. Eight (253, 187) R-S codewords would fit exactly into eleven 184-byte payload-data fields, to suit a bit interleaver with capacity for 16,192 bits. This would allow a 69% reduction in memory requirements for outer interleaver memory and for outer de-interleaver memory compared to designs using (207, 187) R-S coding, while keeping the same capability to overcome protracted drop-outs in signal strength.

DVB-H uses (255, 191) R-S coding, which could be shortened to (251, 187) R-S coding. Each (251, 187) R-S FEC codeword could be provided with a two-byte header to make a respective 253-byte chunk, eight of which 253-byte chunks would fit exactly into eleven 184-byte payload-data fields. Rather than turbo coding an octet of the 253-byte chunks using a bit interleaver with capacity for 16,192 bits, a quartet of the 253-byte chunks could be turbo coded using a bit interleaver with capacity for 8,096 bits. This would allow a 68% reduction in memory requirements for outer interleaver memory and for outer de-interleaver memory compared to designs using (207, 187) R-S coding, while keeping the same capability to overcome protracted drop-outs in signal strength.

Synchronization of the pattern of de-interleaving to be used in a DTV receiver per FIG. 24 or 27 can be done relying on the ancillary transmission pattern information recovered by the decoder 38. Synchronization of the pattern of de-interleaving to be used in a DTV receiver can also be done by analyzing the placement of codeword separator sequences in a few payload-data fields of turbo coding.

A matter thus far not described in detail is the inclusion of codeword separator sequences between turbo codewords. Preferably, a codeword separator sequence should have close to the same number of ONEs as ZEROes. The apparatus 1607 in the turbo encoder 160 and the apparatus 3607 in the turbo encoder 360 extend each turbo codeword by three bytes, twelve bits of which are tail bits for that codeword. This leaves twelve bits available for insertion of a codeword separator sequence. A codeword separator sequence 1001 1001 1001 constructed from three cycles of the 4-bit Barker sequence 1001 can be used, for example. The turbo codewords can then be parsed proceeding from the results of convolving them with a 1001 1001 1001 correlation filter.

When the PCCC encoder 60 and the outer byte interleaver 61 in the FIG. 19 DTV transmitter apparatus are the encoder 160 and interleaver 161 per FIG. 20, it is simple to synchronize the de-interleaving pattern to be used in a DTV receiver per FIG. 24. The payload-data fields of 208 consecutive null packets containing turbo coding are packed with 76,544 consecutive cycles of the 1001 4-bit Barker sequence. So, the time to switch between banks in the memory 73 is easily detected just after the PCCC payload selector 69, before outer byte de-interleaving is begun.

When the PCCC encoder 60 and the outer byte interleaver 61 in the FIG. 19 DTV transmitter apparatus are the encoder 360 and interleaver 361 per FIG. 22, it is simple to synchronize the de-interleaving pattern to be used in a DTV receiver per FIG. 27. The payload-data fields of 26 consecutive null packets containing turbo coding are packed with 9,568 consecutive cycles of the 1001 4-bit Barker sequence. So, the time to switch between banks in the memory 78 is easily detected just after the PCCC payload selector 69, before outer byte de-interleaving is begun.

When the PCCC encoder 5 and the outer byte interleaver 6 in the FIG. 19 DTV transmitter apparatus are the encoder 360 and interleaver 361 per FIG. 23, it is still possible to synchronize the pattern of de-interleaving to be used in a DTV receiver per FIG. 27 by analyzing the response of the PCCC payload selector 69, before outer byte de-interleaving is begun. The analysis can be performed using a suitably designed correlation filter to detect the occurrence of 1001 1001 bytes at 625-byte intervals in the response of the PCCC payload selector 69.

When the PCCC encoder 60 and the outer byte interleaver 61 in the FIG. 19 DTV transmitter apparatus are the encoder 260 and interleaver 261 per FIG. 21, the apparatus 2607 in the turbo encoder 260 extends each turbo codeword by four bytes, twelve bits of which are tail bits for that codeword. This leaves twenty bits available for insertion of a codeword separator sequence. A codeword separator sequence 0 1110010 1110010 0 constructed from the 7-bit Barker sequence 1110010 can be used, for example. The turbo codewords can then be parsed proceeding from the results of convolving them with a 1110010 1110010 correlation filter. It is also possible to synchronize the pattern of de-interleaving to be used in a DTV receiver per FIG. 27 by analyzing the response of the PCCC payload selector 69, before outer byte de-interleaving is begun. The analysis can be performed using a suitably designed correlation filter to detect the occurrences of 0111 0010 and 1110010 bytes at prescribed intervals in the response of the PCCC payload selector 69.

Experience over time may show that longer codeword separator sequences are required for turbo codewords to be parsed reliably when reception is poor. Because the turbo codewords are transversely disposed in the payload-data fields of the null packets, these codewords may be further extended to any length that allows scanning of all the byte-storage locations in the outer byte interleaver 61 memory.

The inventor contemplated using parallel concatenated convolutional coding (PCCC) that reduced code rate 4-to-1 or 5-to-1 rather than just 3-to-1. PCCC that reduces code rate 4-to-1 or 5-to-1 is used in cdma2000 wireless telephony. Such reductions in code rate were considered to be unacceptably high for the performance gains that could be achieved.

Variants of the DTV systems described with reference to FIGS. 19 through 29 may be used for broadcasting just to DTV receivers at fixed locations. In these variants the outer byte interleaver 62 in the FIG. 19 DTV transmitter apparatus spreads the bytes of the turbo codewords just 184 bytes, and de-interleaving in the DTV receivers is simplified accordingly. The turbo codewords still are transverse to the payload-data fields of the packets that are used to contain the turbo coding, so that coding will not introduce artifacts that the adaptive equalizers in DTV receivers might mistake for echoes.

Figure 30:
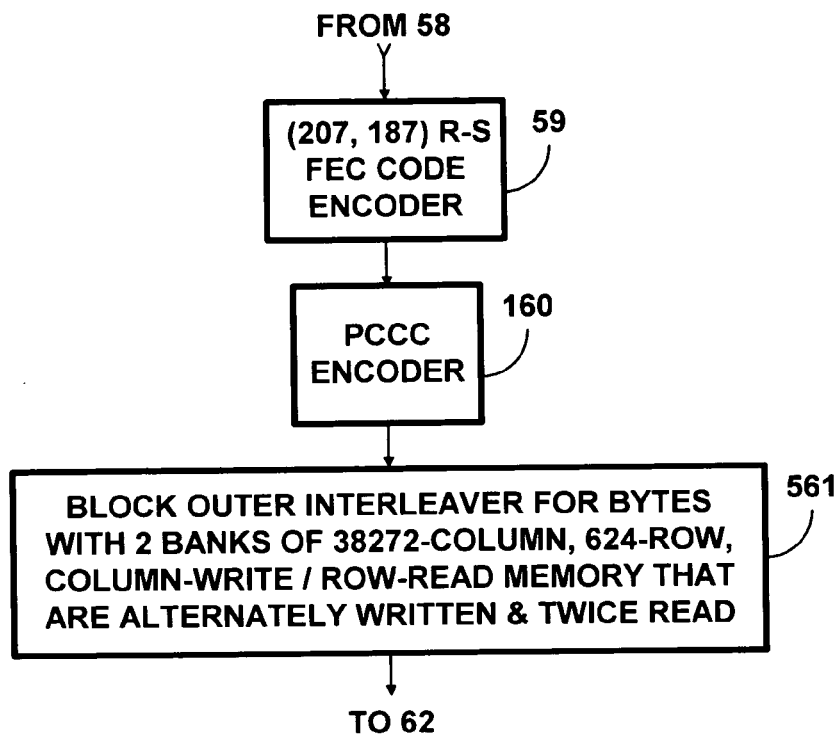
FIGS. 30 and 31 are each a detailed schematic diagram of a respective combination of a turbo code encoder and an outer byte interleaver used in an embodiment of the FIG. 19 transmitter apparatus that uses PCCC to turbo code 207-byte data segments individually for staggercasting.

FIG. 30 shows the PCCC encoder 161 and an outer byte interleaver 561 used as the PCCC encoder 60 and the outer byte interleaver 61 in an embodiment of the FIG. 19 transmitter apparatus that turbo codes individual 207-byte data segments for staggercasting. The staggercasting is of the novel form in which each successive turbo codeword is immediately repeated in its transmission. The outer byte interleaver 561 uses a two-bank memory similar in structure to that used in the outer byte interleaver 161, and the banks are alternately written. However, while one bank of the memory in the outer byte interleaver 561 is written column by column, the other is read row by row and then read again row by row to implement staggercasting.

Figure 31:
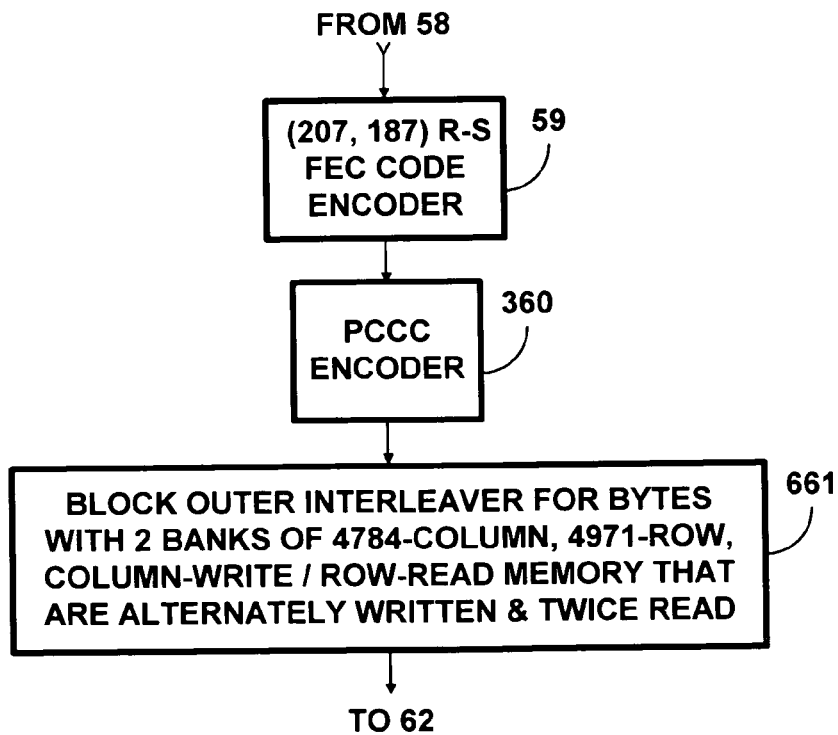

FIG. 31 shows the PCCC encoder 360 and an outer byte interleaver 661 used as the PCCC encoder 60 and the outer byte interleaver 61 in an embodiment of the FIG. 19 transmitter apparatus that turbo codes octets of 207-byte data segments for staggercasting. The staggercasting is of the novel form in which each successive turbo codeword is immediately repeated in its transmission. The outer byte interleaver 661 uses a two-bank memory similar in structure to that used in the outer byte interleaver 361, and the banks are alternately written. However, while one bank of the memory in the outer byte interleaver 661 is written column by column, the other is read row by row and then read again row by row to implement staggercasting.

Figure 32:
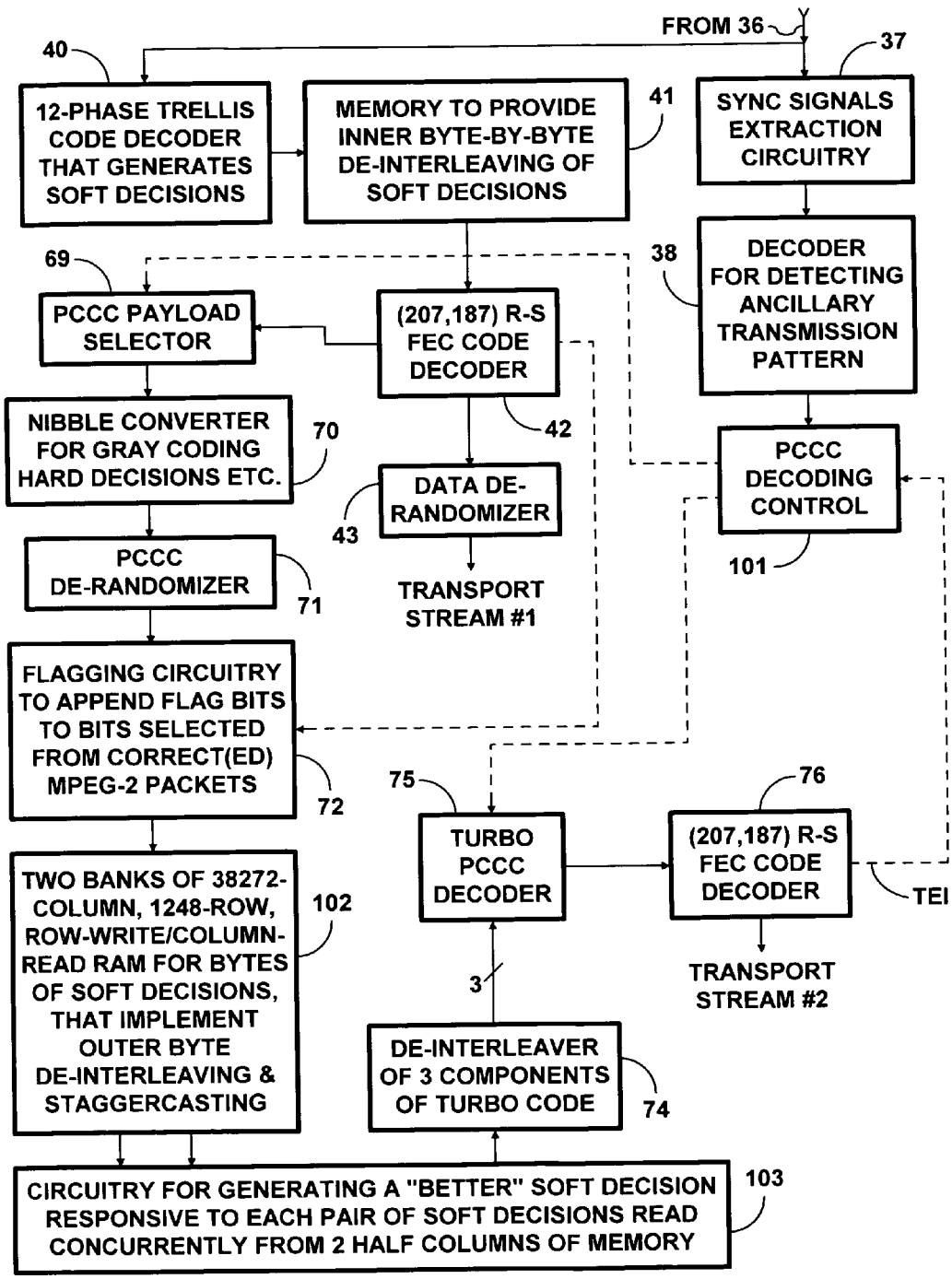
FIG. 32 is a general schematic diagram of modifications to the FIG. 24 receiver apparatus, which modifications embody a further aspect of the invention and make possible the useful reception of broadcast DTV signals transmitted with staggercasting by transmitter apparatus of the sort shown in FIGS. 19 and 30.

FIG. 32 shows modifications to the FIG. 24 DTV receiver apparatus fitting it to receive the broadcast digital television signals transmitted with staggercasting by transmitter apparatus of the sort shown in FIGS. 1 and 20. The PCCC decoding control circuitry 68 of the FIG. 24 DTV receiver apparatus is replaced in FIG. 32 by PCCC decoding control circuitry 101 that takes into account the differences in PCCC decoding introduced by staggercasting. The memory 73 of the FIG. 14 DTV receiver apparatus is replaced in FIG. 32 by a memory 102 having two banks each having 38,272 columns and 1248 rows of byte-storage locations therein. The 1248 rows of one bank of the memory are written while the 38,272 columns of the other bank are read in the following way. Soft decisions concerning an earlier transmitted PCCC word are read serially from an initial half of each column to a first output port of the memory 102. This is done concurrently with soft decisions concerning a later transmitted "duplicate" of the same PCCC word being read serially from the final half of each column to a second output port of the memory 102. The PCCC decoding control circuitry 101 controls the writing and reading operations of the memory 102 although FIG. 32 does not explicitly show the control connections for doing so.

The first and second output ports of the memory 102 respectively connect to first and second input ports of circuitry 103 for generating a "better" soft decision responsive to each pair of soft decisions concurrently read thereto from the memory 102. The circuitry 103 compares each pair of concurrent soft decisions read thereto. The "better" one of the soft decisions is selected for application to the output port of the circuitry 103. The "better" of the concurrent soft decisions is the one with greater probability of being correct. If two concurrent soft decisions have equal probability of being correct, a prescribed one of the pair is selected by default as the "better" decision. In more sophisticated designs of the circuitry 103, the probability of error in the selected soft decision is adjusted according to the degree of agreement or disagreement of the two concurrent soft decisions. Each successive PCCC word that is synthesized by the circuitry 103 is supplied from the output port thereof to the input port of the de-interleaver 74, which de-interleaves the bytes of the three components of the codeword for application to the turbo decoder 75.

In sophisticated designs of the circuitry 103, the synthesis of the soft-decision turbo codeword is also aided by information concerning the probability of each soft decision being correct. The flag bits appended by the flagging circuitry 72 indicating that the hard-decision portions of the soft decisions were found likely to be correct by the R-S decoder 42 are examples of such information. The automatic gain control circuitry of the DTV receiver can furnish indications of drop-outs in signal strength, which indications are used by the circuitry 103 to help determine which of the soft decisions concurrently read thereto from the memory 102 is the one with greater probability of being correct.

Note that the circuitry 103 can synthesize a complete PCCC word from the remnants of the iterated PCCC word, even though the burst error corrupts a sequence of consecutive bytes as long as an entire PCCC word. In the design of the outer byte interleaver 61, it was presumed that when PCCC was transmitted in all 312 segments of each successive data field, the bytes of the data component of the PCCC would have to occur at least one data frame apart. Because of the 1:1:1 interleaving of the bytes of the data component with the bytes of two other PCCC components, the bytes of each PCCC word would then have to occur at least one third of a data frame apart—i.e., at least 208 data segments apart. The corruption of an entire 624-byte PCCC word requires a deep fade of 624 times 208 data segments duration. The drop-out would have to be some 208 data frames long, which is to say a little over ten seconds duration, for the circuitry 103 not to be able to synthesize a complete PCCC word from the remnants of the iterated PCCC word. Augmented by the error-correction capability of the R-S decoder 42, drop-outs of over eleven seconds can be overcome by the FIG. 32 DTV receiver circuitry.

If computation time is not at a premium, the PCCC words read serially from the first and second output ports of the memory 102 may also be byte de-interleaved, turbo decoded and R-S decoded individually. Occasionally one of these computations may succeed when computations on the PCCC word synthesized by the circuitry 103 are unsuccessful.

Figure 33:
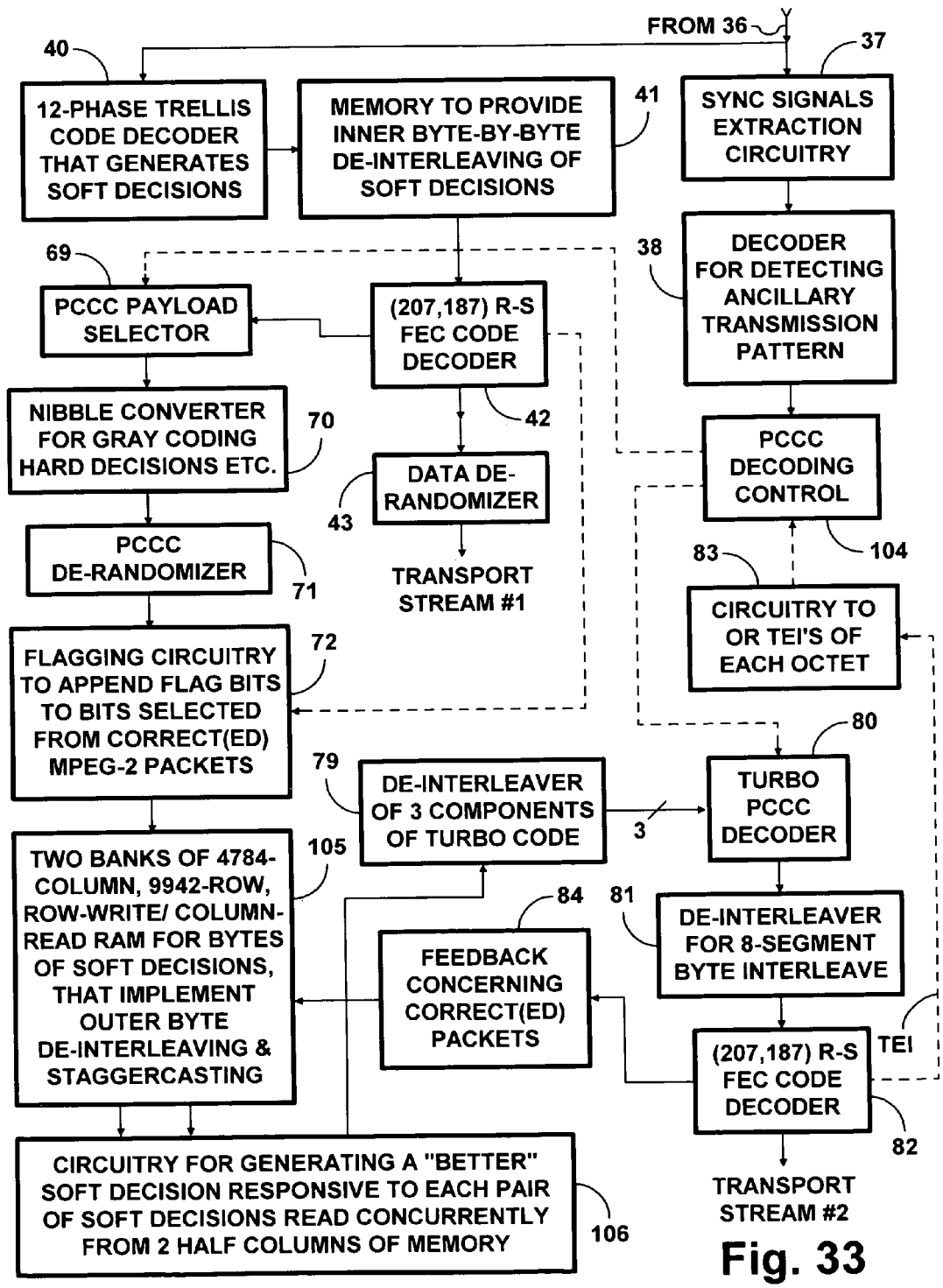
FIG. 33 is a general schematic diagram of modifications to the FIG. 27 receiver apparatus, which modifications embody a further aspect of the invention and make possible the useful reception of broadcast DTV signals transmitted with staggercasting by transmitter apparatus of the sort shown in FIGS. 19 and 31.

FIG. 33 shows modifications to the FIG. 27 DTV receiver apparatus fitting it to receive the broadcast digital television signals transmitted with staggercasting by transmitter apparatus of the sort shown in FIGS. 19 and 31. The PCCC decoding control circuitry 77 of the FIG. 27 DTV receiver apparatus is replaced in FIG. 33 by PCCC decoding control circuitry 104 that takes into account the differences in turbo PCCC decoding introduced by staggercasting. The memory 78 of the FIG. 27 DTV receiver apparatus is replaced in FIG. 36 by a memory 105 having two banks each having 4784 columns and 9942 rows of byte-storage locations therein. The 9942 rows of one bank of the memory 105 are written while the 4784 columns of the other bank are read in the following way. Soft decisions concerning an earlier transmitted turbo codeword are read serially from an initial half of each column to a first output port of the memory 105. This is done concurrently with soft decisions concerning a later transmitted "duplicate" of the same turbo codeword being read serially from the final half of each column to a second output port of the memory 105. The PCCC decoding control circuitry 104 controls the writing and reading operations of the memory 105 although FIG. 33 does not explicitly show the control connections for doing so.

The first and second output ports of the memory 105 respectively connect to first and second input ports of circuitry 106 for generating a "better" soft decision responsive to each pair of soft decisions concurrently read thereto from the memory 105. The operation of the circuitry 106 is generally similar to that of the circuitry 103 in the FIG. 32 DTV receiver apparatus. However, the circuitry 106 synthesizes 4971-byte PCCC words, rather than synthesizing 624-byte PCCC words as the circuitry 103 does. Each successive PCCC word that is synthesized by the circuitry 106 is supplied from the output port thereof to the input port of the de-interleaver 79, which de-interleaves the bytes of the three components of the codeword for application to the turbo PCCC decoder 80.

If computation time is not at a premium, the PCCC words read serially from the first and second output ports of the memory 105 may also be byte de-interleaved, turbo decoded and R-S decoded individually. Occasionally one of these computations may succeed when computations on the turbo codeword synthesized by the circuitry 106 are unsuccessful.

Figure 34:
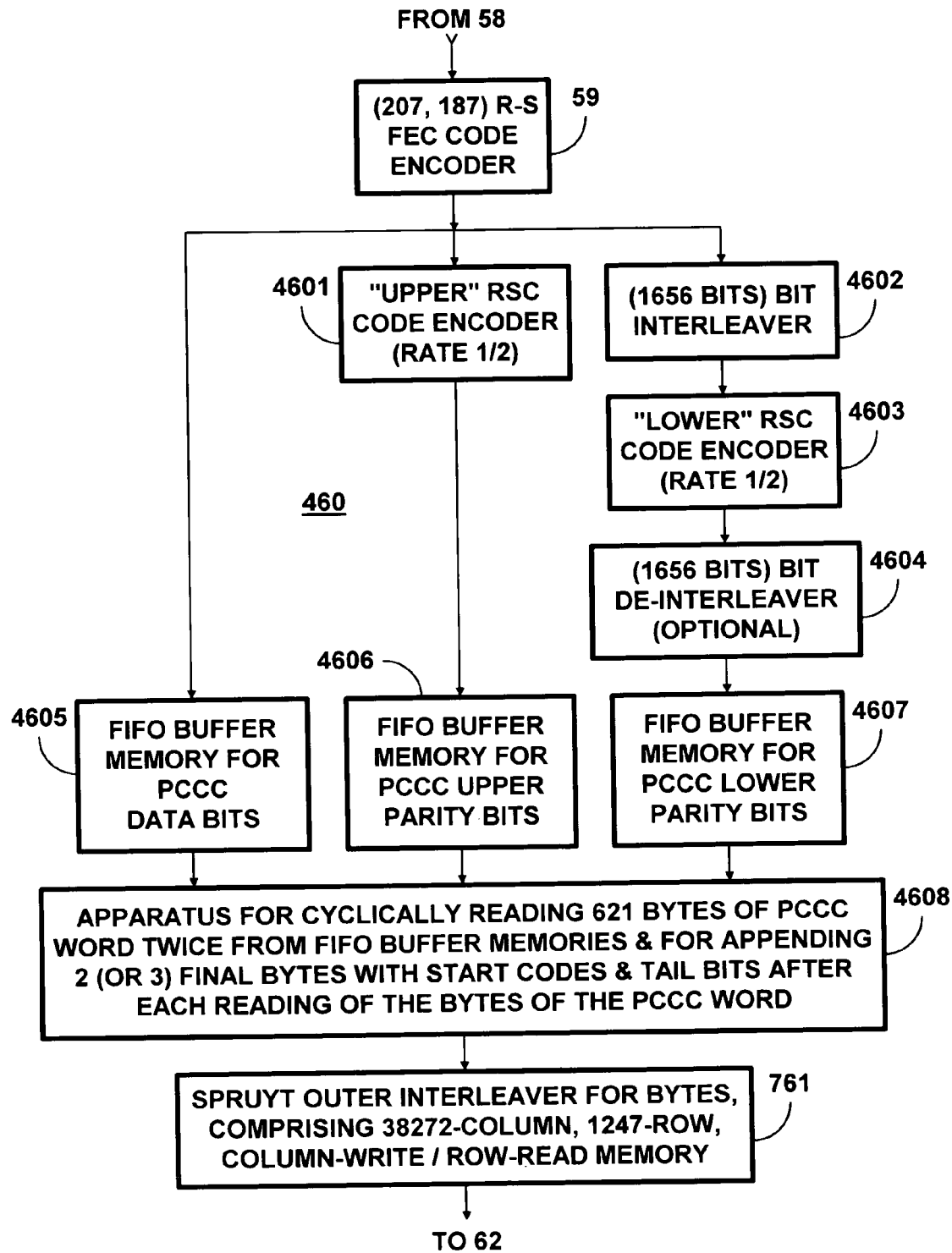
FIG. 34 is a detailed schematic diagram of a respective combination of a PCCC encoder and an outer byte interleaver used in a respective embodiment of the FIG. 19 transmitter apparatus that turbo codes 207-byte data segments individually for staggercasting, which outer byte interleaver uses substantially less memory than that in FIG. 30.

FIG. 34 shows a turbo code encoder 460 and an outer byte interleaver 761 used as the PCCC encoder 60 and the outer byte interleaver 61 in another embodiment of the FIG. 19 transmitter apparatus that turbo codes individual 207-byte data segments for staggercasting. The turbo code encoder 460 generates PCCC words that are once repeated to implement staggercasting in the form in which each successive turbo codeword is immediately repeated in its transmission. The outer byte interleaver 761 is of the type described by Spruyt. The encoder 460 includes an "upper" RSC code encoder 4601, a bit interleaver 4602, a "lower" RSC code encoder 4603, a bit de-interleaver 4604 and first-in, first-out buffer memories 4605, 4606 and 4607. Essentially these elements respectively correspond to the "upper" RSC code encoder 511, the bit interleaver 512, the "lower" RSC code encoder 513, the bit de-interleaver 514 and FIFO buffer memories 515, 516 and 517 of the turbo code encoder 51 shown in FIG. 21. The turbo code encoder 460 further includes apparatus 4608 that cyclically reads a successive byte of the data bits component of the turbo code stored in the FIFO buffer memory 4605, a successive byte of the "upper" parity bits component of the turbo code stored in the FIFO buffer memory 4606, and a successive byte of the "lower" parity bits component of the turbo code stored in the FIFO buffer memory 4607. The apparatus 4608 time-division multiplexes the cyclically read successive bytes of each component and appends a codeword separator sequence to generate the initial one of each successive pair of the turbo codewords written to a respective column of byte-storage locations within memory in the outer byte interleaver 761. The concluding one of that pair of the turbo codewords written to the respective column of byte-storage locations essentially repeats the initial one of that pair of the turbo codewords, but is a byte longer. The apparatus 4608 generates that concluding one-byte-longer turbo codeword by again cyclically reading a successive byte of the data bits component of the turbo code stored in the FIFO buffer memory 4605, a successive byte of the "upper" parity bits component of the turbo code stored in the FIFO buffer memory 4606, and a successive byte of the "lower" parity bits component of the turbo code stored in the FIFO buffer memory 4607. The apparatus 4608 time-division multiplexes the cyclically read successive bytes of each component and appends a codeword separator sequence to generate the final one of each successive pair of the turbo codewords written to a respective column of byte-storage locations within memory in the outer byte interleaver 761.

The memory in the outer byte interleaver 761 has 1247 rows and 38,262 columns. The number 1247 has only two prime numbers, 29 and 43, as factors. Neither 29 nor 43 is a factor of 38,262. So, there is no problem with establishing uniform scanning paths through the memory in the outer byte interleaver 761 during both the writing of its byte-storage locations and the reading of its byte-storage locations.

Figure 35:
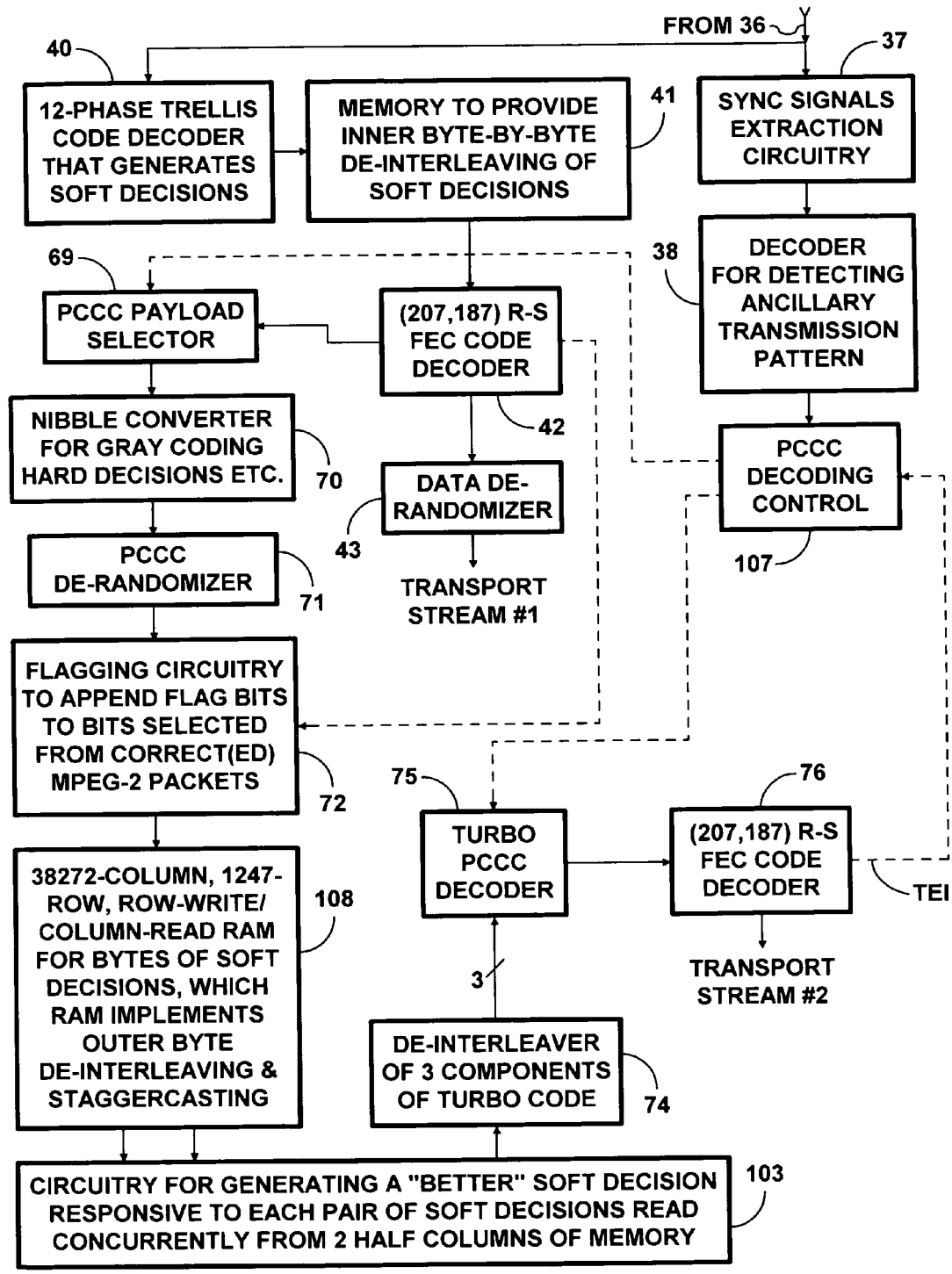
FIG. 35 is a general schematic diagram of modifications to the FIG. 24 receiver apparatus, which modifications embody a further aspect of the invention and make possible the useful reception of broadcast DTV signals transmitted with staggercasting by transmitter apparatus of the sort shown in FIGS. 19 and 34.

FIG. 35 shows modifications to the FIG. 24 DTV receiver apparatus fitting it to receive the broadcast digital television signals transmitted with staggercasting by transmitter apparatus of the sort shown in FIGS. 19 and 34. The PCCC decoding control circuitry 68 of the FIG. 24 DTV receiver apparatus is replaced in FIG. 35 by PCCC decoding control circuitry 107 that takes into account the differences in turbo decoding introduced by staggercasting. The memory 73 of the FIG. 24 DTV receiver apparatus is replaced in FIG. 35 by a memory 108 having 38,272 columns and 1247 rows of byte-storage locations therein. Soft decisions concerning an earlier transmitted turbo codeword are read serially from an initial half of each column to a first output port of the memory 108. This is done concurrently with soft decisions concerning a later transmitted "duplicate" of the same turbo codeword being read serially from the final half of each column to a second output port of the memory 108. The PCCC decoding control circuitry 107 controls the writing and reading operations of the memory 108 although FIG. 35 does not explicitly show the control connections for doing so.

The first and second output ports of the memory 108 respectively connect to first and second input ports of the circuitry 103 for generating a "better" soft decision responsive to each pair of soft decisions concurrently read thereto from the memory 108. Each successive turbo codeword that is synthesized by the circuitry 103 is supplied from the output port thereof to the input port of the de-interleaver 74, which de-interleaves the bytes of the three components of the codeword for application to the turbo decoder 75.

If computation time is not at a premium, the turbo codewords read serially from the first and second output ports of the memory 108 may also be byte de-interleaved, turbo decoded and R-S decoded individually. Occasionally one of these computations may succeed when computations on the turbo codeword synthesized by the circuitry 103 are unsuccessful.

Figure 36:
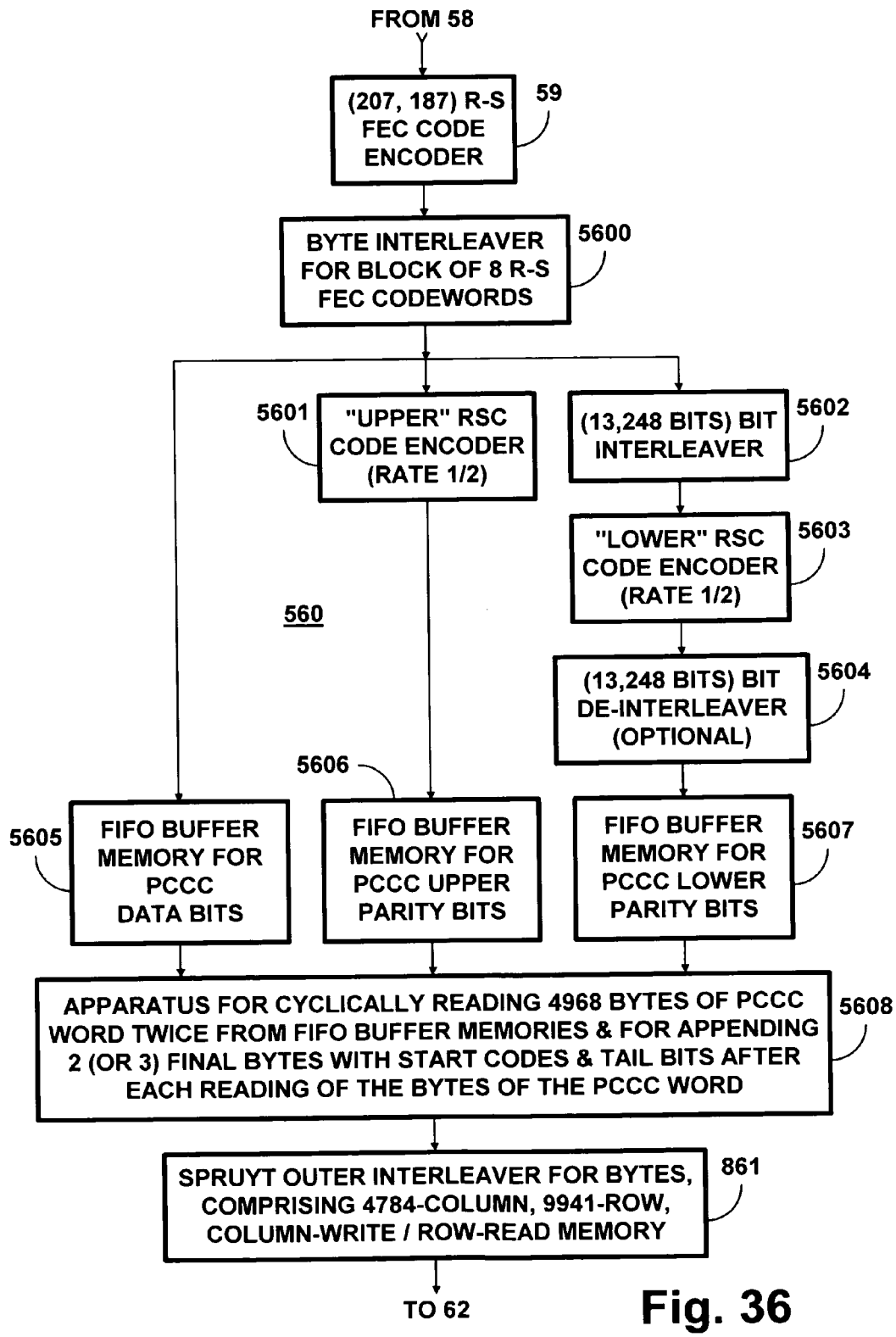
FIG. 36 is a detailed schematic diagram of a respective combination of a PCCC encoder and an outer byte interleaver used in a respective embodiment of the FIG. 19 transmitter apparatus that uses PCCC to turbo code octets of 207-byte data segments for staggercasting, which outer byte interleaver uses substantially less memory than that in FIG. 31.

FIG. 36 shows a PCCC encoder 560 and an outer byte interleaver 861 used as the PCCC encoder 60 and the outer byte interleaver 61 in an embodiment of the FIG. 19 transmitter apparatus that turbo codes octets of 207-byte data segments for staggercasting. The PCCC encoder 560 generates PCCC words that are once repeated to implement staggercasting of the novel form in which each successive turbo codeword is immediately repeated in its transmission. The outer byte interleaver 861 is of the type described by Spruyt. The encoder 560 includes a byte interleaver 5600 for octets of 207-byte data segments, an "upper" RSC code encoder 5601, a bit interleaver 5602, a "lower" RSC code encoder 5603, a bit de-interleaver 5604 and first-in, first-out buffer memories 5605, 5606 and 5607. Essentially these elements respectively correspond to the byte interleaver 3600, the "upper" RSC code encoder 3601, the bit interleaver 3602, the "lower" RSC code encoder 3603, the bit de-interleaver 3604 and FIFO buffer memories 3605, 3606 and 3607 of the turbo code encoder 360 shown in FIG. 22 or 23. The turbo code encoder 560 further includes apparatus 5608 that cyclically reads a successive byte of the data bits component of the turbo code stored in the FIFO buffer memory 5605, a successive byte of the "upper" parity bits component of the turbo code stored in the FIFO buffer memory 5606, and a successive byte of the "lower" parity bits component of the PCCC stored in the FIFO buffer memory 5607. The apparatus 5608 time-division multiplexes the cyclically read successive bytes of each component and appends a codeword separator sequence to generate the initial one of each successive pair of the PCCC words written to a respective column of byte-storage locations within memory in the outer byte interleaver 861. The concluding one of that pair of the turbo codewords written to the respective column of byte-storage locations essentially repeats the initial one of that pair of thePCCC words, but is a byte longer. The apparatus 5608 generates that concluding one-byte-longer turbo codeword by again cyclically reading a successive byte of the data bits component of the turbo code stored in the FIFO buffer memory 5605, a successive byte of the "upper" parity bits component of the turbo code stored in the FIFO buffer memory 5606, and a successive byte of the "lower" parity bits component of the turbo code stored in the FIFO buffer memory 5607. The apparatus 5608 time-division multiplexes the cyclically read successive bytes of each component and appends a codeword separator sequence to generate the final one of each successive pair of the turbo codewords written to a respective column of byte-storage locations within memory in the outer byte interleaver 861.

The memory in the outer byte interleaver 861 has 9941 rows and 4784 columns. The number 9941 is prime. So, there is no problem with establishing uniform scanning paths through byte-storage locations of the memory in the outer byte interleaver 861 during their writing and during their reading.

Figure 37:
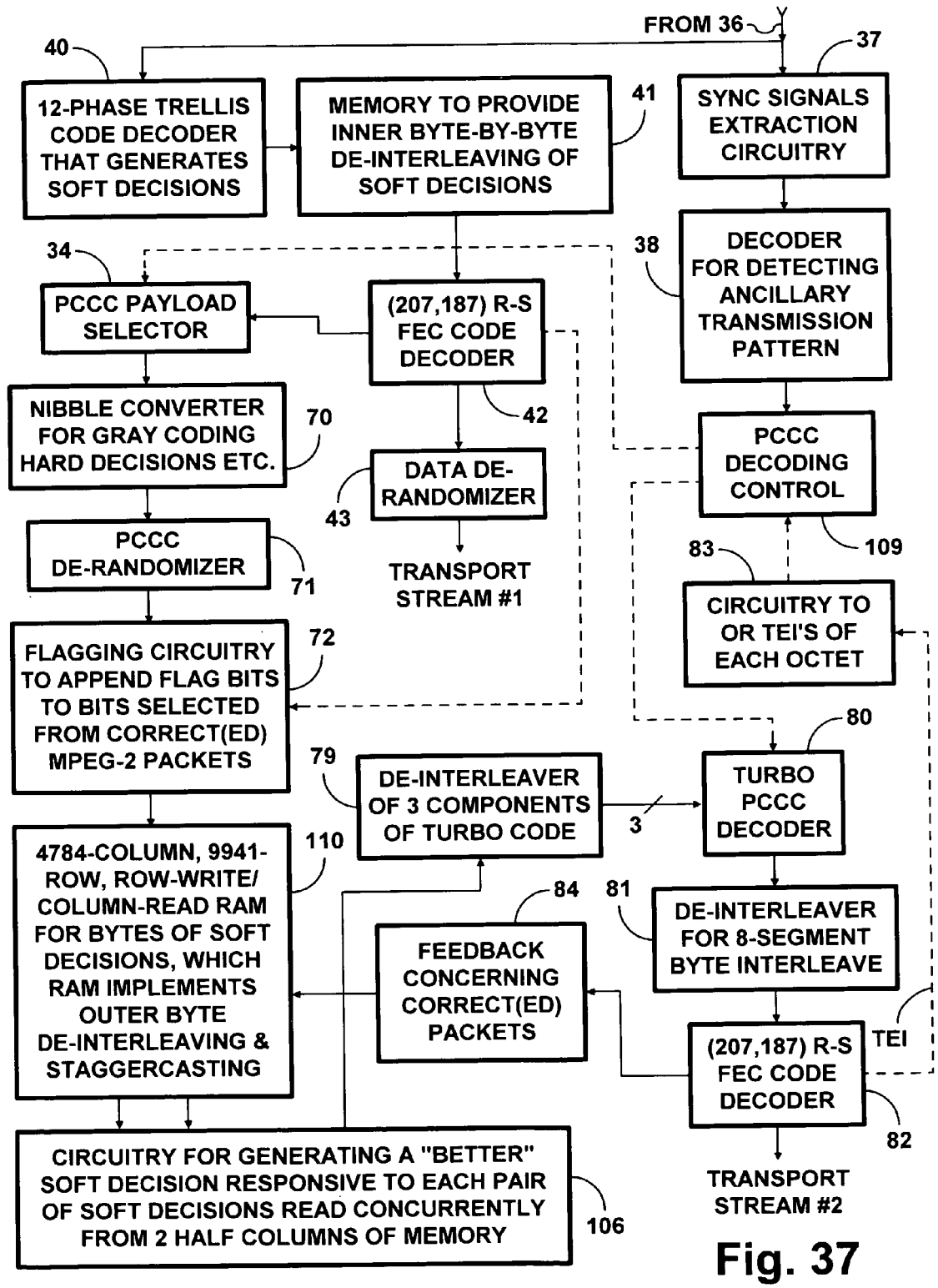
FIG. 37 is a general schematic diagram of modifications to the FIG. 27 receiver apparatus, which modifications embody a further aspect of the invention and make possible the useful reception of broadcast DTV signals transmitted with staggercasting by transmitter apparatus of the sort shown in FIGS. 19 and 36.

FIG. 37 shows modifications to the FIG. 27 DTV receiver apparatus fitting it to receive the broadcast digital television signals transmitted with staggercasting by transmitter apparatus of the sort shown in FIGS. 19 and 36. The PCCC decoding control circuitry 77 of the FIG. 27 DTV receiver apparatus is replaced in FIG. 37 by PCCC decoding control circuitry 109 that takes into account the differences in turbo decoding introduced by staggercasting. The memory 78 of the FIG. 17 DTV receiver apparatus is replaced in FIG. 37 by a memory 110 having 4,784 columns and 9,941 rows of byte-storage locations therein. Soft decisions concerning an earlier transmitted turbo codeword are read serially from an initial half of each column to a first output port of the memory 110. This is done concurrently with soft decisions concerning a later transmitted "duplicate" of the same turbo codeword being read serially from the final half of each column to a second output port of the memory 110. The PCCC decoding control circuitry 109 controls the writing and reading operations of the memory 110 although FIG. 37 does not explicitly show the control connections for doing so.

The first and second output ports of the memory 110 respectively connect to first and second input ports of the circuitry 106 for generating a "better" soft decision responsive to each pair of soft decisions concurrently read thereto from the memory 110. Each successive PCCC word that is synthesized by the circuitry 106 is supplied from the output port thereof to the input port of the de-interleaver 79, which de-interleaves the bytes of the three components of the codeword for application to the turbo decoder 80.

If computation time is not at a premium, the turbo codewords read serially from the first and second output ports of the memory 110 may also be byte de-interleaved, turbo decoded and R-S decoded individually. Occasionally one of these computations may succeed when computations on the turbo codeword synthesized by the circuitry 106 are unsuccessful.

The retransmission of the PCCC word can be delayed to increase the capability of the DTV receiver to overcome deep fades, of course, but this will cost additional memory in the DTV transmitter and in each DTV receiver. While the retransmission of PCCC words can substantially increase the capability of the DTV receiver to overcome deep fades, this capability comes at a cost in reduced code rate. In the retransmission procedures specifically described, the code rate is one-sixth that of an ordinary 8VSB signal. Half of this reduction is caused by retransmission; the rest, by the 3:1 redundancy introduced by parallel concatenated convolutional coding. The inventor sought some way to mitigate the six times reduction in code rate.

The inventor discerned that re-transmitting just the data components of turbo codewords would reduce code rate only four times, while retaining some capability of the DTV receiver to overcome deep fades. Preferably the first set of parity bits would be time-interleaved with one of the transmissions of the data component of a turbo codeword, and the second set of parity bits would be time-interleaved with the other transmission of the data component of the turbo codeword. While portions of the two transmissions might be lost because of a deep fade, the remaining data would retain half of its convolutional coding, so AWGN performance would still be improved to considerable degree. Deep fades could still be overcome by the staggercasting if the tunnels and underpasses causing the drop-outs were not so distant from the DTV transmitter antenna that the compromised AWGN performance were inadequate. If both transmissions of a turbo codeword were received at some signal strength, AWGN performance would not be much compromised. This type of staggercasting will be referred to as "punctured staggercasting" in the following portion of this specification.

Figure 38:
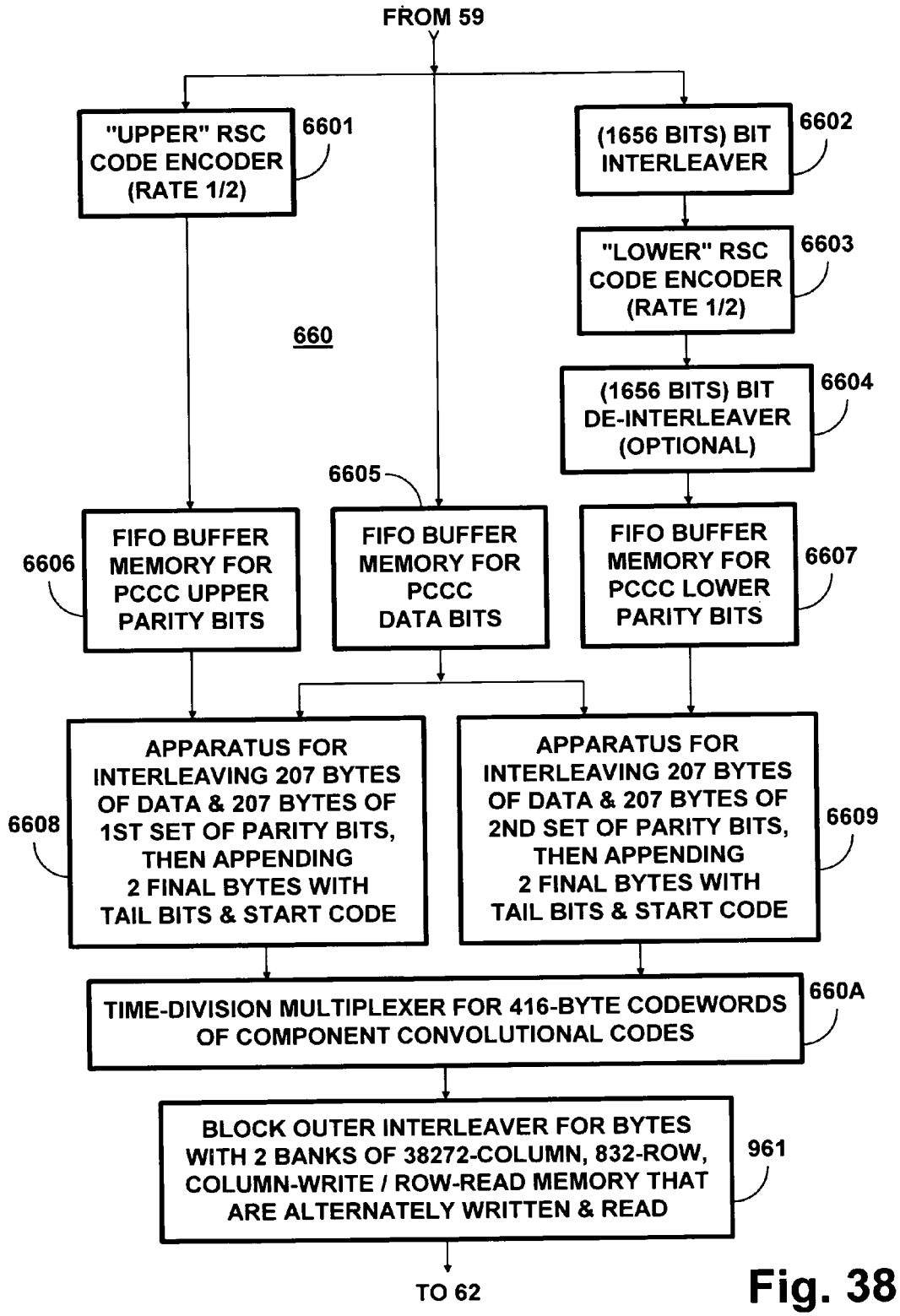
FIG. 38 is a detailed schematic diagram of a PCCC encoder and an outer byte interleaver used in an embodiment of the FIG. 19 transmitter apparatus that uses PCCC to turbo code 207-byte data segments individually and that staggercasts just the data portions of each PCCC word.

FIG. 38 shows a PCCC encoder 660 and an outer byte interleaver 961, which are used as the PCCC encoder 60 and the outer byte interleaver 61 in an embodiment of the FIG. 19 transmitter apparatus that turbo codes individual R-S FEC codewords and transmits them to provide punctured staggercasting. The PCCC encoder 660 generates PCCC words the data components of which are repeated in the punctured staggercasting of the novel form in which each successive PCCC word is immediately repeated in its transmission. The encoder 660 includes an "upper" RSC code encoder 6601, a bit interleaver 6602, a "lower" RSC code encoder 6603, a bit de-interleaver 6604 and first-in, first-out buffer memories 6605, 6606 and 6607. Essentially these elements respectively correspond to the "upper" RSC code encoder 161, the bit interleaver 162, the "lower" RSC code encoder 163, the bit de-interleaver 1604 and FIFO buffer memories 1605, 1606 and 1607 of the PCC encoder 160 shown in FIG. 20. The PCCC encoder 660 further includes apparatus 6608 for interleaving bytes of data read from the FIFO buffer memory 6605 with bytes of the first set of parity bits read from the FIFO buffer memory 6606, and then appending two bytes containing the tail bits forwarded from the "upper" RSC code encoder 6601 and a start code. The PCCC encoder 660 also further includes apparatus 6609 for interleaving bytes of data read from the FIFO buffer memory 6605 with bytes of the second set of parity bits read from the FIFO buffer memory 6607, then appending two bytes containing the tail bits forwarded from the "lower" RSC code encoder 6603 and a start code. The PCCC encoder 660 still further includes a time-division multiplexer 660A which interleaves the 416-byte convolutional codewords from the apparatus 6608 and the 416-byte convolutional codewords from the apparatus 6609 for application to the input port of the outer byte interleaver 961. The differential delay required for this multiplexing operation is conveniently provided by suitably timing the reading of the FIFO buffer memories 6605, 6606 and 6607.

The outer byte interleaver 961 is a block interleaver comprising two banks of memory that alternate between being written and being read. A succession of 832-byte punctured PCCC words with repeated data are written into respective columns of byte-storage locations in one bank of the memory while the rows of byte-storage locations in the other bank are being read out to the data randomizer 62. Each bank of the memory contains 38,272 columns of byte-storage locations, so data bytes are spread out to be about one data frame apart.

Figure 39:
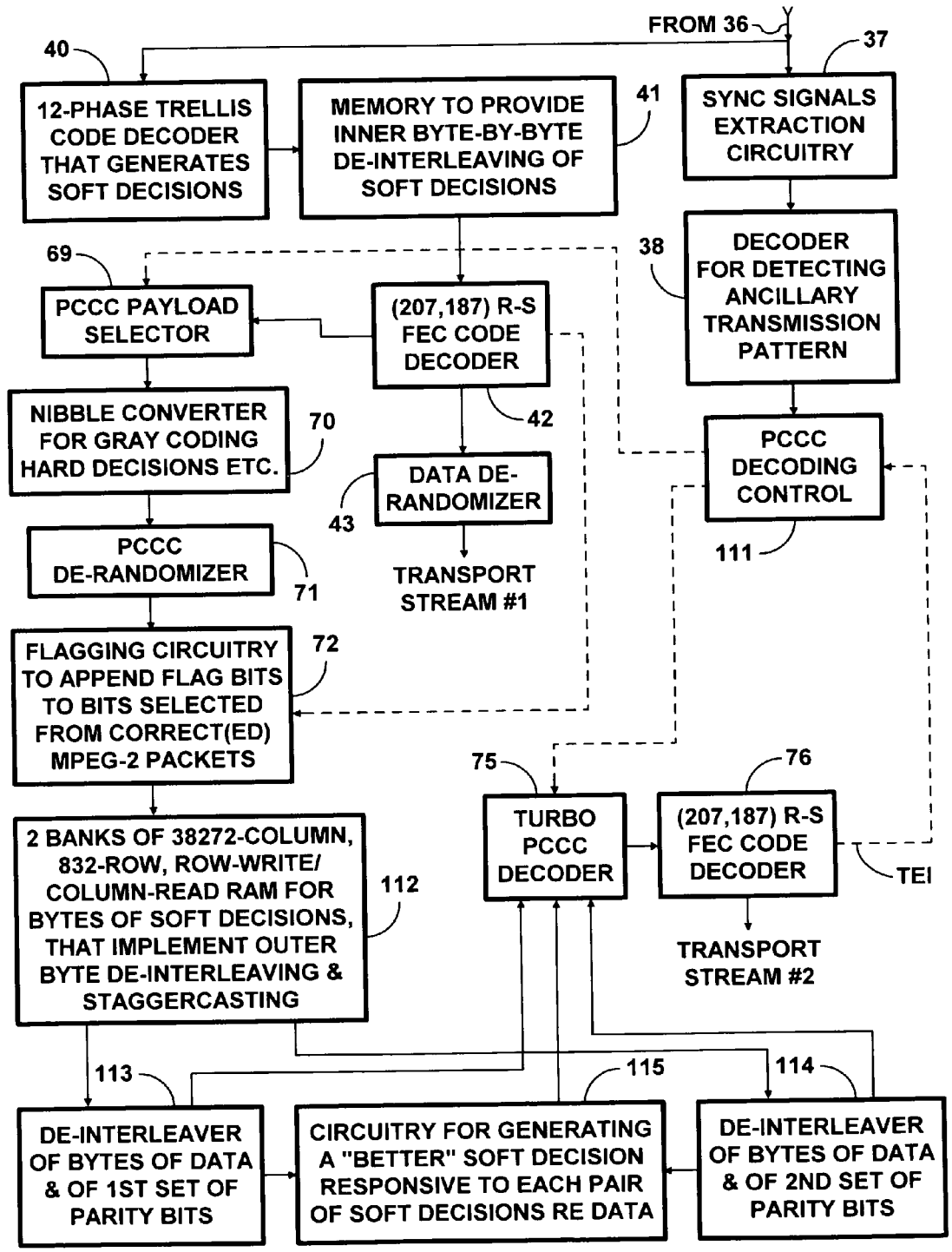
FIG. 39 is a general schematic diagram of modifications to the FIG. 14 receiver apparatus, which modifications embody a further aspect of the invention and make possible the useful reception of broadcast DTV signals transmitted with punctured staggercasting by transmitter apparatus of the sort shown in FIGS. 1 and 29.

FIG. 39 shows modifications to the FIG. 24 DTV receiver apparatus fitting it to receive the broadcast digital television signals transmitted with punctured staggercasting by transmitter apparatus of the sort shown in FIGS. 19 and 38. The PCCC decoding control circuitry 68 of the FIG. 24 DTV receiver apparatus is replaced in FIG. 39 by PCCC decoding control circuitry 111 that takes into account the differences in PCCC decoding introduced by punctured staggercasting. The memory 73 of the FIG. 24 DTV receiver apparatus is replaced in FIG. 39 by a memory 112 having two banks each having 38,272 columns and 832 rows of byte-storage locations therein. The 832 rows of one bank of the memory 112 are written while the 38,272 columns of the other bank are read in the following way. Soft decisions concerning an earlier transmitted convolutional codeword are read serially from an initial half of each column to a first output port of the memory 112. This is done concurrently with soft decisions concerning a later transmitted convolutional codeword with similar data component being read serially from the final half of each column to a second output port of the memory 112. The PCCC decoding control circuitry 111 controls the writing and reading operations of the memory 112 although FIG. 39 does not explicitly show the control connections for doing so.

The first output port of the memory 112 connects to the input port of a de-interleaver 113 for selecting bytes of data to its first output port and selecting bytes of a first set of parity bits to its second output port. The de-interleaver 113 also selects bytes with data tail bits to its first output port and bytes with tail bits for the first set of parity bits to its second output port. The second output port of the de-interleaver 113 is connected to a respective input port of the PCCC decoder 75 to supply the decoder 75 with the first set of parity bits including tail bits for each successive PCCC word.

The second output port of the memory 112 connects to the input port of a de-interleaver 114 for selecting bytes of data to its first output port and selecting bytes of a second set of parity bits to its second output port. The de-interleaver 114 also selects bytes with data tail bits to its first output port and bytes with tail bits for the second set of parity bits to its second output port. The second output port of the de-interleaver 114 is connected to a respective input port of the PCCC decoder 75 for supplying the decoder 75 with the second set of parity bits including tail bits for each successive PCCC word.

The first input ports of the de-interleavers 113 and 114 respectively connect to first and second input ports of circuitry 115 for generating a "better" soft decision responsive to each pair of soft decisions concurrently read thereto from the de-interleavers 113 and 114. The operation of the circuitry 115 is generally similar to that of the circuitry 103 in the FIG. 32 DTV receiver apparatus. However, the circuitry 115 operates only on the data components of PCCC words, rather than on all three components of PCCC words as the circuitry 103 does. Each successive PCCC word data component that is synthesized by the circuitry 115 is supplied from the output port thereof to a respective input port of the turbo decoder 75.

Figure 40:
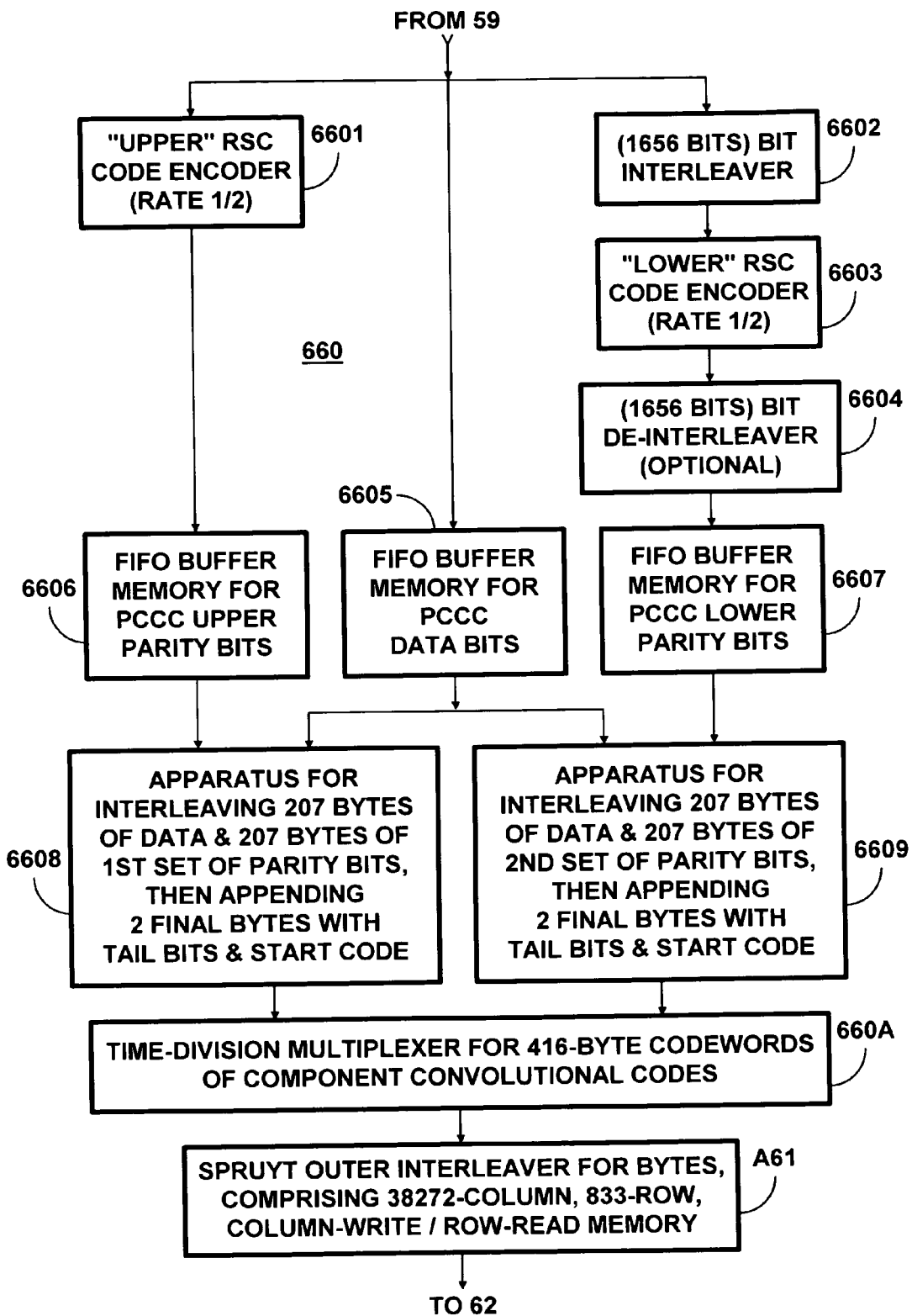
FIG. 40 is a detailed schematic diagram of a PCCC encoder and an outer byte interleaver used in another embodiment of the FIG. 19 transmitter apparatus that uses PCCC to turbo code 207-byte data segments individually and that staggercasts just the data portions of each PCCC word.

FIG. 40 shows the PCCC encoder 660 and an outer byte interleaver A61, which are used as the PCCC encoder 60 and the outer byte interleaver 61 in another embodiment of the FIG. 19 transmitter apparatus that turbo codes individual R-S FEC codewords and transmits them to provide punctured staggercasting. The outer byte interleaver A61 is of the type described by Spruyt. The memory therein has 38,272 columns of byte-storage locations for spreading data bytes of a turbo codeword to occur one per data frame and must have at least 832 rows of byte-storage locations to accommodate each turbo codeword with repeated data component. The numbers 38,272 and 832 have a number of factors in common with each other, suggesting possible problems with establishing uniform scanning paths for both writing and reading 832×38, 272=31,842,304 byte-storage locations. Extending the number of rows of byte-storage locations to 833 eliminates any problems caused by there being any factors in common with the number 38,272. The factors 7 and 119 of 833 are not factors of 38,272. The extra byte-storage location in each column of byte-storage locations is filled with additional start code which can be introduced by the time-division multiplexer 660A or can be hard-wired into suitable byte-storage locations in the memory as read-only data.

Figure 41:
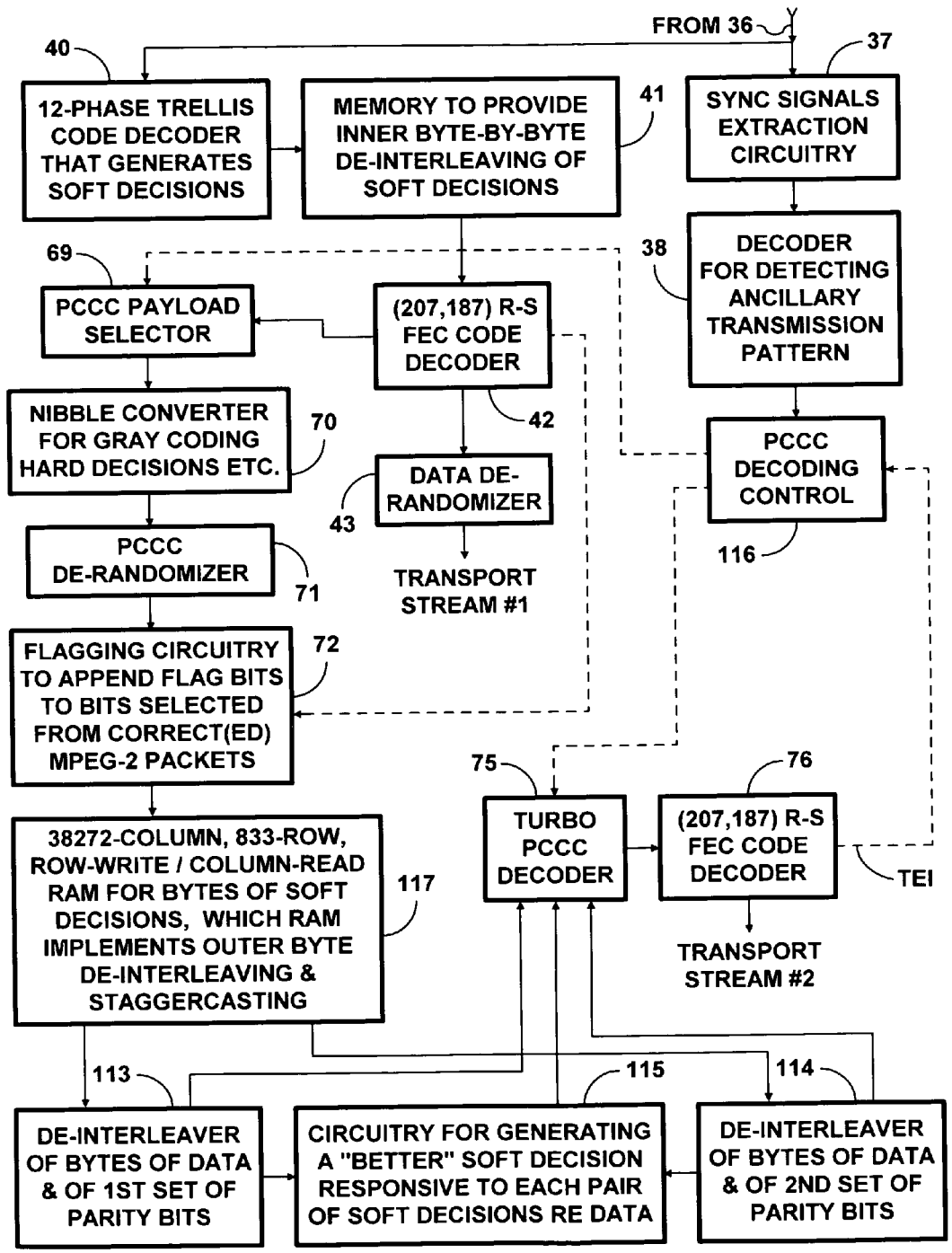
FIG. 41 is a general schematic diagram of modifications to the FIG. 14 receiver apparatus, which modifications embody a further aspect of the invention and make possible the useful reception of broadcast DTV signals transmitted with punctured staggercasting by transmitter apparatus of the sort shown in FIGS. 19 and 40.

FIG. 41 shows modifications to the FIG. 24 DTV receiver apparatus fitting it to receive the broadcast digital television signals transmitted with punctured staggercasting by transmitter apparatus of the sort shown in FIGS. 19 and 40. The PCCC decoding control circuitry 68 of the FIG. 24 DTV receiver apparatus is replaced in FIG. 41 by PCCC decoding control circuitry 116 that takes into account the differences in turbo decoding introduced by punctured staggercasting. The memory 73 of the FIG. 24 DTV receiver apparatus is replaced in FIG. 41 by a memory 117 having 38,272 columns and 833 rows of byte-storage locations therein. Soft decisions concerning an earlier transmitted convolutional codeword are read serially from an initial half of each column to a first output port of the memory 117. This is done concurrently with soft decisions concerning a later transmitted convolutional codeword with similar data component being read serially from the final half of each column to a second output port of the memory 117. The PCCC decoding control circuitry 116 controls the writing and reading operations of the memory 117 although FIG. 41 does not explicitly show the control connections for doing so.

The first and second output ports of the memory 117 connect to the input ports of the de-interleavers 113 and 114, respectively. The first input ports of the de-interleavers 113 and 114 supply respective data components to first and second input ports of circuitry 115 for generating a "better" soft decision responsive to each pair of soft decisions concurrently read thereto from the de-interleavers 113 and 114. Each successive PCCC word data component that is synthesized by the circuitry 115 is supplied from the output port thereof to a respective input port of the PCCC decoder 75. The first input ports of the de-interleavers 113 and 114 respectively connect to respective input ports of the PCCC decoder 75 for supplying the decoder 75 with first and second sets of parity bits respectively.

Figure 42:
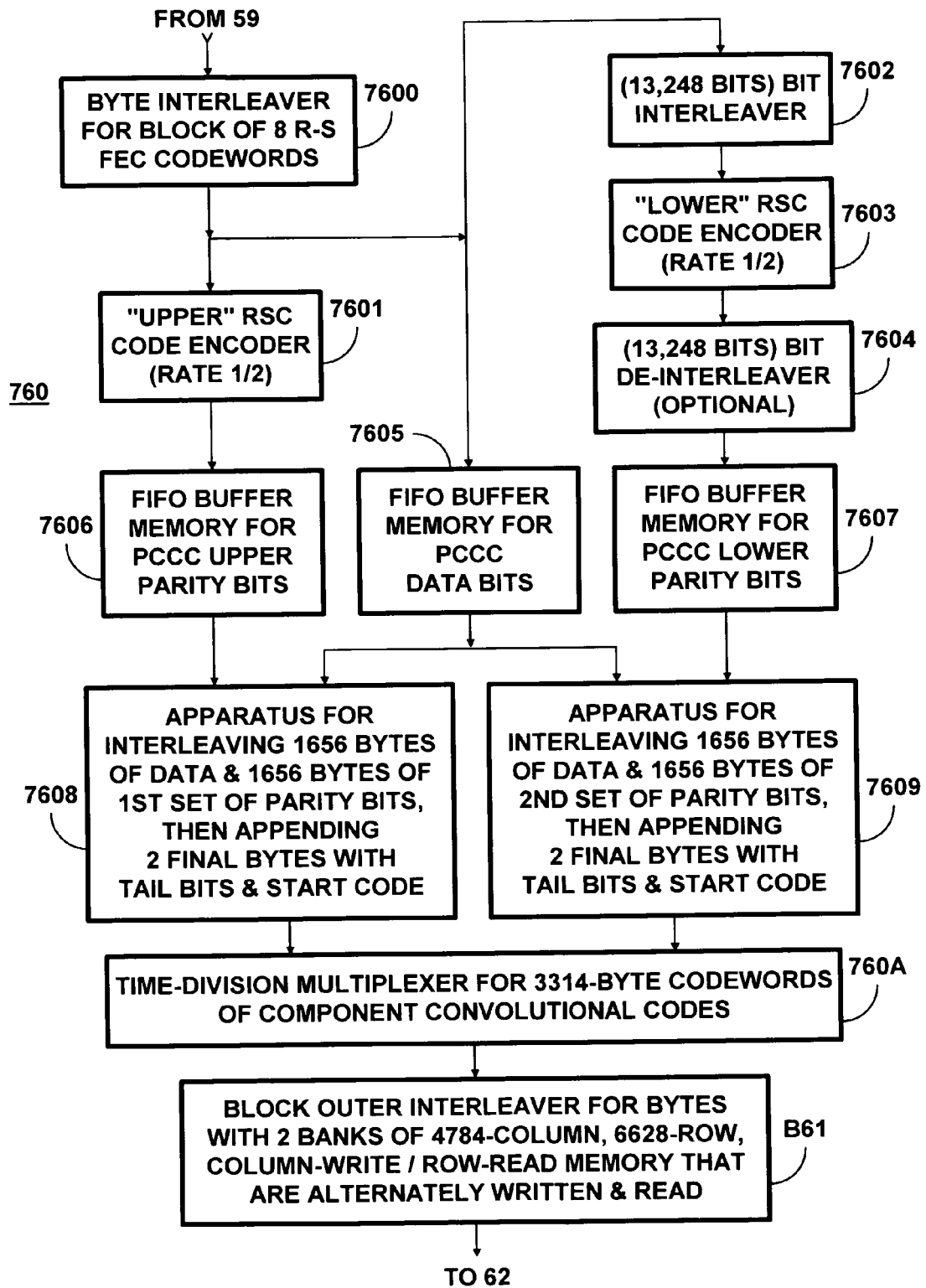
FIG. 42 is a detailed schematic diagram of a PCCC encoder and an outer byte interleaver used in an embodiment of the FIG. 19 transmitter apparatus that uses PCCC to turbo code octets of 207-byte data segments and that staggercasts just the data portions of each turbo codeword.

FIG. 42 shows a turbo code encoder 760 and an outer byte interleaver B61, which are used as the PCCC encoder 60 and the outer byte interleaver 61 in an embodiment of the FIG. 19 transmitter apparatus that turbo codes octets of R-S FEC codewords and transmits them to provide punctured staggercasting. The PCCC encoder 760 generates PCCC words the data components of which are repeated in the punctured staggercasting of novel form in which each successive turbo codeword is immediately repeated in its transmission. The encoder 760 includes a byte interleaver 7600 for octets of R-S FEC codewords, an "upper" RSC code encoder 7601, a bit interleaver 7602, a "lower" RSC code encoder 7603, a bit de-interleaver 7604 and first-in, first-out buffer memories 7605, 7606 and 7607. Essentially these elements respectively correspond to the byte interleaver 3600, the "upper" RSC code encoder 3601, the bit interleaver 3602, the "lower" RSC code encoder 3603, the bit de-interleaver 3604 and FIFO buffer memories 3605, 3606 and 3607 of the turbo code encoder 52 shown in FIGS. 22 and 23. The turbo code encoder 760 further includes apparatus 7608 for interleaving bytes of data read from the FIFO buffer memory 7605 with bytes of the first set of parity bits read from the FIFO buffer memory 7606, and then appending two bytes containing the tail bits forwarded from the "upper" RSC code encoder 7601 and a start code. The turbo code encoder 760 also further includes apparatus 7609 for interleaving bytes of data read from the FIFO buffer memory 7605 with bytes of the second set of parity bits read from the FIFO buffer memory 7607, then appending two bytes containing the tail bits forwarded from the "lower" RSC code encoder 7603 and a start code. The turbo code encoder 760 still further includes a time-division multiplexer 760A which interleaves the 3314-byte convolutional codewords from the apparatus 7608 and the 3314-byte convolutional codewords from the apparatus 7609 to generate 6628-byte codewords for application to the input port of the outer byte interleaver B61. The differential delay required for this multiplexing operation is conveniently provided by suitably timing the reading of the FIFO buffer memories 7605, 7606 and 7607.

The outer byte interleaver B61 is a block interleaver comprising two banks of memory that alternate between being written and being read. A succession of 6628-byte turbo codewords with repeated data are written into respective columns of byte-storage locations in one bank of the memory while the rows of byte-storage locations in the other bank are being read out to the data randomizer 62. Each bank of the memory contains 4,784 columns of byte-storage locations, so data bytes are spread out to be about one data frame apart.

Figure 43:
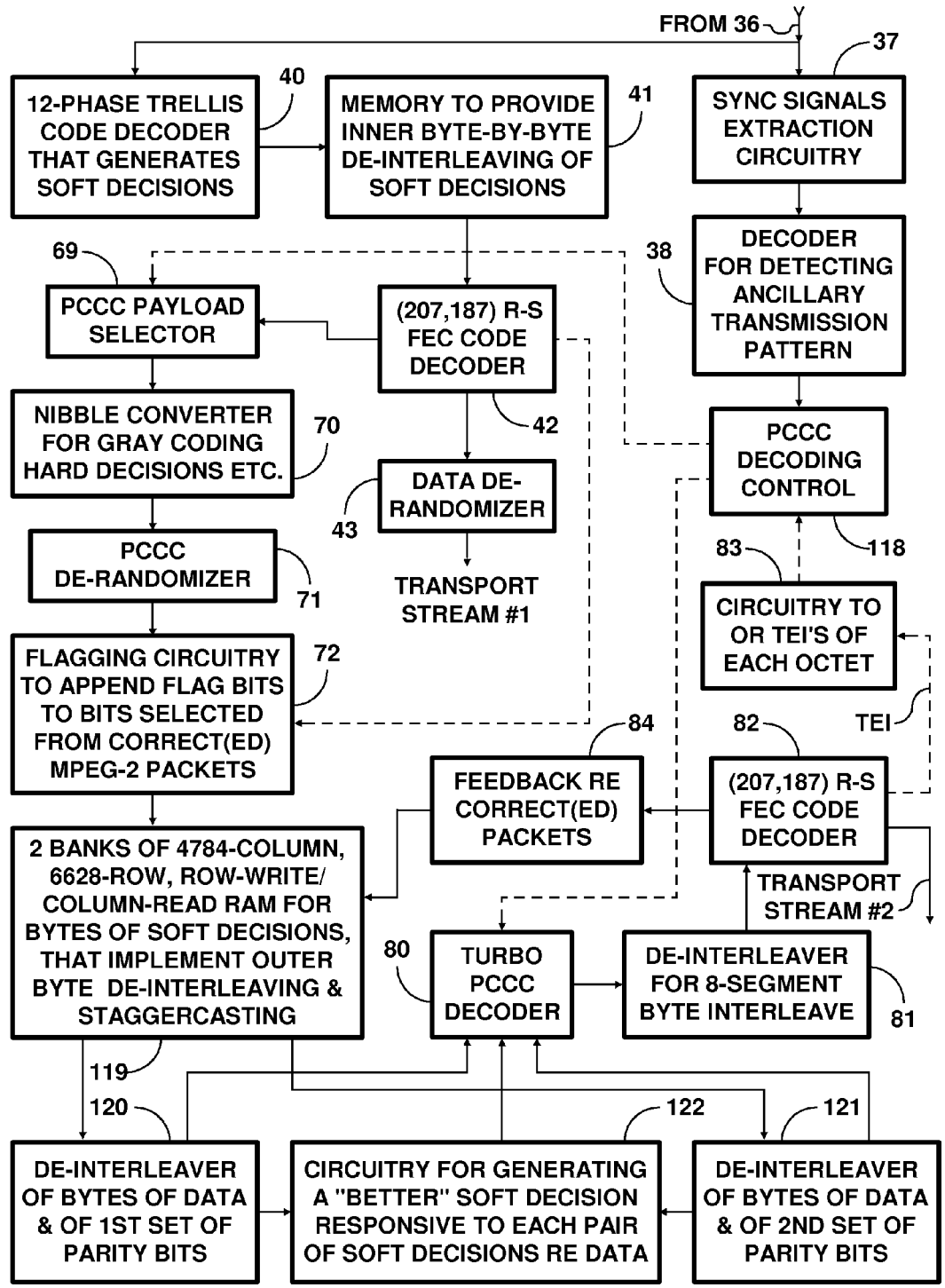
FIG. 43 is a general schematic diagram of modifications to the FIG. 17 receiver apparatus, which modifications embody a further aspect of the invention and make possible the useful reception of broadcast DTV signals transmitted with punctured staggercasting by transmitter apparatus of the sort shown in FIGS. 19 and 42.

FIG. 43 shows modifications to the FIG. 27 DTV receiver apparatus fitting it to receive the broadcast digital television signals transmitted with punctured staggercasting by transmitter apparatus of the sort shown in FIGS. 19 and 42. The PCCC decoding control circuitry 77 of the FIG. 27 DTV receiver apparatus is replaced in FIG. 43 by PCCC decoding control circuitry 118 that takes into account the differences in turbo decoding introduced by punctured staggercasting. The memory 78 of the FIG. 27 DTV receiver apparatus is replaced in FIG. 43 by a memory 119 having two banks each having 4,784 columns and 6,628 rows of byte-storage locations therein. The 6,628 rows of one bank of the memory are written while the 4,784 columns of the other bank are read in the following way. Soft decisions concerning an earlier transmitted convolutional codeword are read serially from an initial half of each column to a first output port of the memory 119. This is done concurrently with soft decisions concerning a later transmitted convolutional codeword with similar data component being read serially from the final half of each column to a second output port of the memory 119. The PCCC decoding control circuitry 118 controls the writing and reading operations of the memory 119 although FIG. 43 does not explicitly show the control connections for doing so.

The first output port of the memory 119 connects to the input port of a de-interleaver 120 for selecting bytes of data to its first output port and selecting bytes of a first set of parity bits to its second output port. The de-interleaver 120 also selects bytes with data tail bits to its first output port and bytes with tail bits for the first set of parity bits to its second output port. The second output port of the de-interleaver 120 is connected to a respective input port of the PCCC decoder 80 to supply the decoder 80 with the first set of parity bits including tail bits for each successive PCCC word.

The second output port of the memory 119 connects to the input port of a de-interleaver 121 for selecting bytes of data to its first output port and selecting bytes of a second set of parity bits to its second output port. The de-interleaver 121 also selects bytes with data tail bits to its first output port and bytes with tail bits for the second set of parity bits to its second output port. The second output port of the de-interleaver 121 is connected to a respective input port of the PCCC decoder 80 for supplying the decoder 80 with the second set of parity bits including tail bits for each successive PCCC word.

The first input ports of the de-interleavers 120 and 121 respectively connect to first and second input ports of circuitry 122 for generating a "better" soft decision responsive to each pair of soft decisions concurrently read thereto from the de-interleavers 120 and 121. The operation of the circuitry 122 is generally similar to that of the circuitry 106 in the FIG. 37 DTV receiver apparatus. However, the circuitry 122 operates only on the data components of PCCC words, rather than on all three components of turbo codewords as the circuitry 106 does. Each successive turbo codeword data component that is synthesized by the circuitry 112 is supplied from the output port thereof to a respective input port of the PCCC decoder 80.

Figure 44:
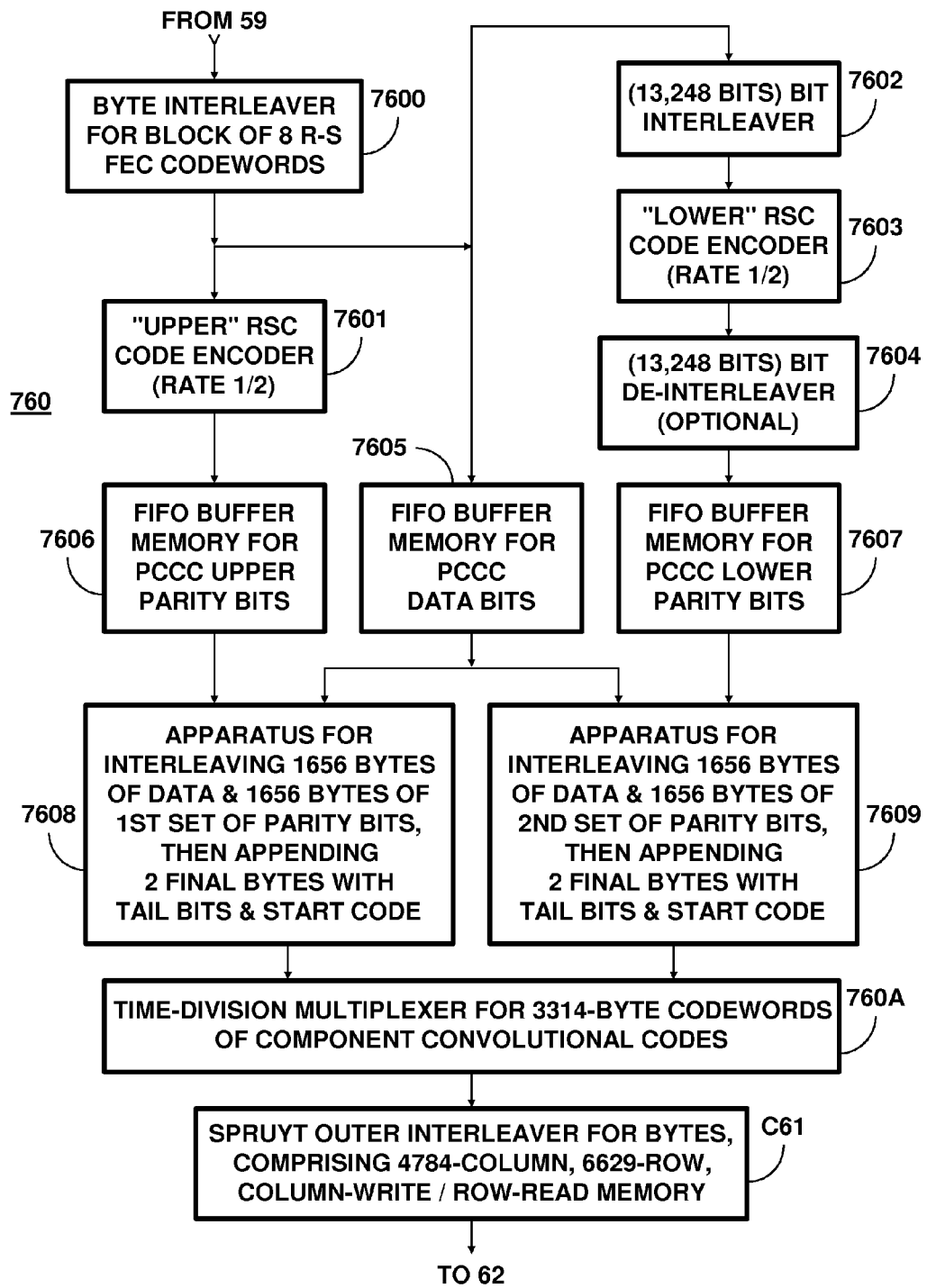
FIG. 44 is a detailed schematic diagram of a PCCC encoder and an outer byte interleaver used in another embodiment of the FIG. 19 transmitter apparatus that uses PCCC to turbo code octets of 207-byte data segments and that staggercasts just the data portions of each PCCC word.

FIG. 44 shows the PCCC encoder 760 and an outer byte interleaver C61, which are used as the PCC encoder 60 and the outer byte interleaver 61 in another embodiment of the FIG. 19 transmitter apparatus that turbo codes octets of R-S FEC codewords and transmits them to provide punctured staggercasting. The outer byte interleaver C61 is of the type described by Spruyt. The memory therein has 4,784 columns of byte-storage locations for spreading data bytes of a turbo codeword to occur one per data frame and must have at least 6,628 rows of byte-storage locations to accommodate each turbo codeword with repeated data component. The numbers 4,784 and 6,628 have a number of factors in common with each other, suggesting possible problems with establishing uniform scanning paths for both writing and reading 4784× 6628=31,708,352 byte-storage locations. Extending the number of rows of byte-storage locations to 6,629 eliminates any problems caused by there being any factors in common with the number 4,784. The factors 7 and 947 of 6,629 are not factors of 4784. The extra byte-storage location in each column of byte-storage locations is filled with additional start code which can be introduced by the time-division multiplexer 760A or can be hard-wired into suitable byte-storage locations in the memory as read-only data.

Figure 45:
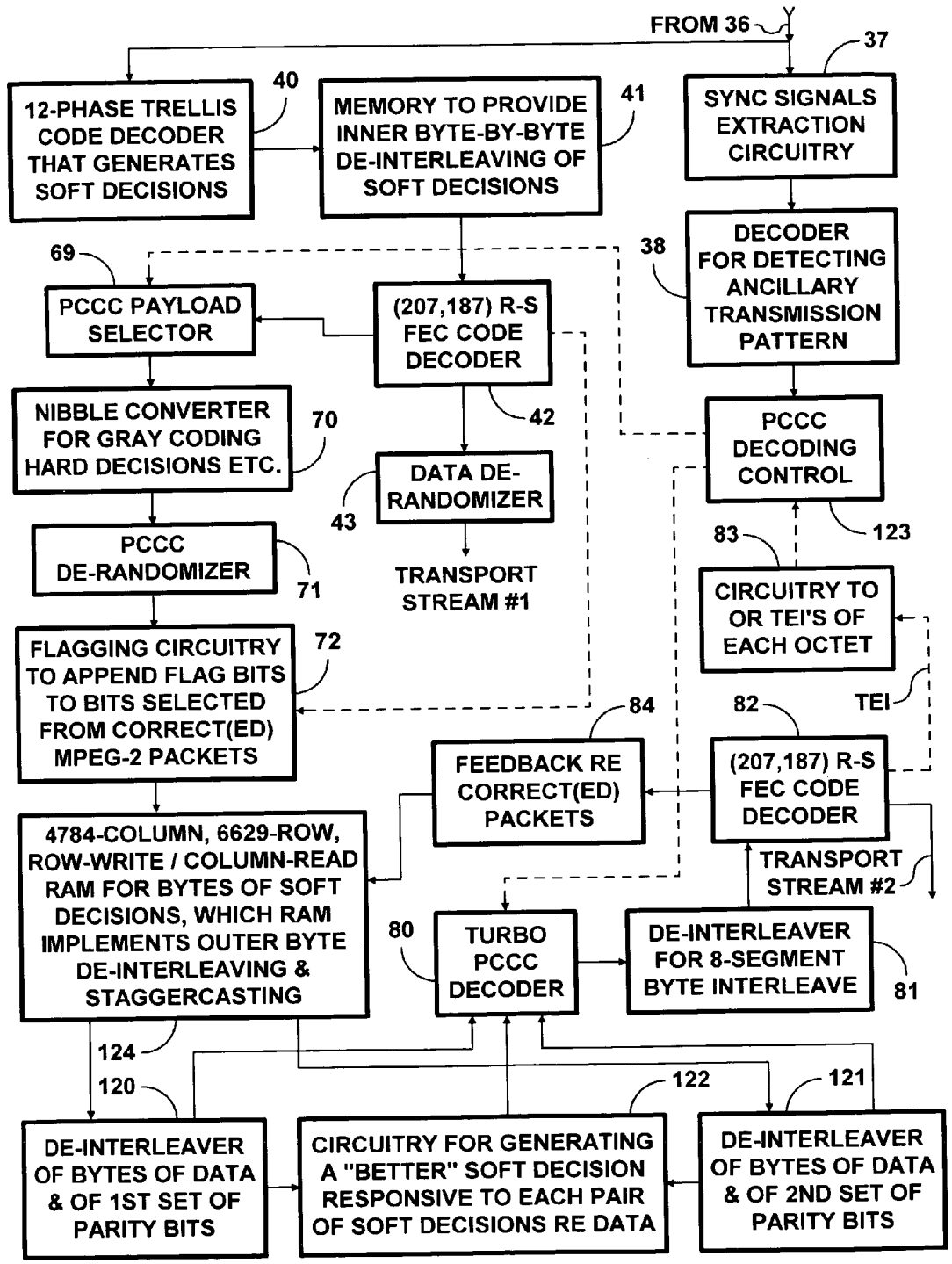
FIG. 45 is a general schematic diagram of modifications to the FIG. 27 receiver apparatus, which modifications embody a further aspect of the invention and make possible the useful reception of broadcast DTV signals transmitted with punctured staggercasting by transmitter apparatus of the sort shown in FIGS. 19 and 44.

FIG. 45 shows modifications to the FIG. 27 DTV receiver apparatus fitting it to receive the broadcast digital television signals transmitted with punctured staggercasting by transmitter apparatus of the sort shown in FIGS. 19 and 44. The PCCC decoding control circuitry 77 of the FIG. 27 DTV receiver apparatus is replaced in FIG. 45 by PCCC decoding control circuitry 123 that takes into account the differences in turbo decoding introduced by punctured staggercasting. The memory 78 of the FIG. 27 DTV receiver apparatus is replaced in FIG. 45 by a memory 124 having 4,784 columns and 6,629 rows of byte-storage locations therein. Soft decisions concerning an earlier transmitted convolutional codeword are read serially from an initial half of each column to a first output port of the memory 124. This is done concurrently with soft decisions concerning a later transmitted convolutional codeword with similar data component being read serially from the final half of each column to a second output port of the memory 124. The PCCC decoding control circuitry 123 controls the writing and reading operations of the memory 124 although FIG. 45 does not explicitly show the control connections for doing so.

The first and second output ports of the memory 124 connect to the input ports of the de-interleavers 120 and 121, respectively. The first input ports of the de-interleavers 120 and 121 supply respective data components to first and second input ports of the circuitry 122 for generating a "better" soft decision responsive to each pair of soft decisions concurrently read thereto from the de-interleavers 120 and 121. Each successive turbo codeword data component that is synthesized by the circuitry 122 is supplied from the output port thereof to a respective input port of the PCCC decoder 80. The first input ports of the de-interleavers 120 and 121 respectively connect to respective input ports of the PCCC decoder 80 for supplying the decoder 80 with first and second sets of parity bits, respectively.

The momentary loss of audio during a deep fade is usually more likely to cause one listening and viewing a television program to lose track of what is going on in a program than momentary loss of video. So, the compressed audio portions of a DTV signal intended for mobile reception can be transmitted using staggercast turbo codes, while the compressed video portions of that DTV signal are transmitted using punctured staggercast turbo codes.

The preferred embodiments of the invention involve anti-Gray encoding of at least portions of the turbo coded transmissions at the transmitter and their subsequent Gray coding at the receiver to reproduce the original parallel concatenated convolutional coding. However, less preferred embodiments of the invention omit such anti-Gray encoding at the transmitter and the conjoint Gray encoding at the receiver.

Performing turbo decoding operations sweeping the trellis in both forward and reverse directions to decode the portions of a turbo codeword preceding and succeeding a deep fade was disclosed in paragraph 0017, supra. Turbo decoding operations sweeping the trellis in both forward and reverse directions can be done simultaneously, to reduce the time to decode a turbo codeword even when there is no deep fade to corrupt that turbo codeword. Seokhyun Yoon and Yeheskel Bar-Ness describe a method for reducing the computational delay time of turbo decoding in a letter entitled "A Parallel MAP Algorithm for Low Latency Turbo Decoding" published in IEEE Communications Letters, Vol. 6, No. 7, July 2002. In this method portions of a long turbo codeword are iteratively decoded separately and parallelly in time, using boundary conditions for iteratively decoding those portions as determined from the preceding performance of the MAP algorithm. DTV receivers embodying aspects of the invention disclosed in earlier paragraphs of this specification can be implemented using the Yoon and Bar-Ness method.

The foregoing specification discloses in general terms DTV systems of types that support reception by DTV receivers in rapidly moving vehicles and that can overcome protracted deep fades during such reception. The foregoing specification prescribes that byte de-interleaving to overcome protracted deep fades should precede PCCC decoding and subsequent decoding of R-S FEC coding in a DTV receiver. The foregoing specification points out how this prescription for DTV receiver designs facilitates iterative PCCC decoding procedures being controlled so as to conserve power consumption by them. The foregoing specification also sets out how outer R-S FEC coding, turbo coding and outer byte interleaving are properly cascaded in DTV transmitter apparatus. The foregoing specification also teaches how soft-decision turbo decoding improves staggercasting reception. The foregoing specification will enable persons of ordinary skill in the arts of digital communications system design and of equipment design for digital communications systems to make a variety of DTV transmitter apparatuses and a variety of DTV receiver apparatuses that embody the invention in various of its aspects. This should be taken into consideration when considering the far-ranging scope of the invention.

In the claims, the word "said" indicates that the succeeding noun has antecedent basis earlier in the claim or in a preceding claim, and the article "the" is used for purposes other than indicating that the succeeding noun has such antecedent basis.

What is claimed is:

1. A receiver for 8VSB digital television signals that convey robust data subjected to parallel concatenated convolutional coding (PCCC) before being further coded by 2/3 trellis coding of said 8VSB digital television signals, said receiver comprising:

apparatus for converting a selected 8VSB digital television signal received as an amplitude-modulated radio-frequency carrier to a baseband digital television signal, which apparatus includes front-end circuitry, an analog-to-digital converter, a demodulator for 8VSB digital television signals and a channel equalization filter;

a 12-phase trellis decoder connected for providing trellis decoding results that include soft decisions concerning symbols in said baseband digital television signal, said 12-phase trellis decoder connected to receive the baseband digital television signal from said apparatus for converting a selected 8VSB digital television signal received as an amplitude-modulated radio-frequency carrier to a baseband digital television signal; and further apparatus connected for decoding selected portions of said trellis decoding results conveying said PCCC that encodes said robust data, thus to reproduce said robust data.

2. A receiver as set forth in claim 1, for receiving 8VSB digital television signals that convey robust data subjected to data randomization and subsequent parallel concatenated convolutional coding (PCCC) before being further coded by 2/3 trellis coding of said 8VSB digital television signals, wherein said further apparatus comprises:

PCCC payload selection and de-multiplexer circuitry connected for selectively responding to portions of said de-interleaved trellis decoding results that convey components of said PCCC;

a PCCC decoder connected for decoding said components of said PCCC that encodes said robust data, thus to reproduce said robust data in randomized form; and a data de-randomizer connected for de-randomizing said robust data in randomized form, thus to reproduce said robust data.

3. A receiver as set forth in claim 1, for receiving 8VSB digital television signals that convey robust data subjected to randomization and parallel concatenated convolutional coding before being subjected to time-division multiplexing with other data, results from said time-division multiplexing being subjected to convolutional byte interleaving before being further coded by 2/3 trellis coding of said 8VSB digital television signals; wherein said further apparatus comprises:

memory operable for counteracting convolutional byte interleaving of said trellis decoding results to supply de-interleaved trellis decoding results;

PCCC payload selection and de-multiplexer circuitry connected for selectively responding to portions of said de-interleaved trellis decoding results that convey components of said PCCC;

a PCCC decoder connected for decoding said components of said PCCC, thus to reproduce said robust data in randomized form; and a data de-randomizer connected for de-randomizing said robust data in randomized form, thus to reproduce said robust data.

4. A receiver as set forth in claim 1, for receiving 8VSB digital television signals that convey robust data subjected to randomization and parallel concatenated convolutional coding before resulting PCCC is anti-Gray coded, results from such anti-Gray coding being subjected to time-division multiplexing with other data, results from said time-division multiplexing being subjected to convolutional byte interleaving before being further coded by 2/3 trellis coding of said 8VSB digital television signals; wherein said further apparatus comprises:

memory operable for counteracting convolutional byte interleaving of said trellis decoding results to supply de-interleaved trellis decoding results;

PCCC segments selection and de-multiplexer circuitry connected for selectively responding to portions of said de-interleaved trellis decoding results that convey in anti-Gray coded form three components of said PCCC that encodes said robust data in randomized form;

a first Gray-code encoder operable for receiving said first component of said PCCC, which is descriptive of parity bits of a first convolutional code in anti-Gray coded form, and for reproducing said parity bits of said first convolutional code in at least substantially original form;

a second Gray-code encoder operable for receiving a second of said three components of said PCCC in anti-Gray coded form, which is descriptive of parity bits of a second convolutional code in anti-Gray coded form, and for reproducing said parity bits of said second convolutional code;

a third Gray-code encoder operable for receiving a third of said three components of said PCCC in anti-Gray coded form, which is descriptive of said robust data in randomized form, and for reproducing said robust data in said randomized form;

a PCCC decoder connected for receiving said parity bits of said first convolutional code as reproduced from said first Gray-code encoder, for receiving said parity bits of said second convolutional code as reproduced from said second Gray-code encoder, and for receiving said robust data in said randomized form as reproduced from said third Gray-code encoder, said PCCC decoder operable for decoding said PCCC to reproduce said robust data in randomized form as a PCCC decoding result; and a data de-randomizer connected for de-randomizing PCCC decoding result, thus to reproduce said robust data.

5. A receiver as set forth in claim 1, for receiving 8VSB digital television signals that convey robust data subjected to randomization and parallel concatenated convolutional coding before pairs of PCCC parity bits are anti-Gray coded, results from such anti-Gray coding being subjected together with randomized robust data to time-division multiplexing with other data, results from said time-division multiplexing being subjected to convolutional byte interleaving before being further coded by 2/3 trellis coding of said 8VSB digital television signals; wherein said further apparatus comprises:

memory operable for counteracting convolutional byte interleaving of said trellis decoding results to supply de-interleaved trellis decoding results;

PCCC segments selection and de-multiplexer circuitry connected for selectively responding to portions of said de-interleaved trellis decoding results that convey three components of said PCCC that encodes said robust data in randomized form, a first of said three components of said PCCC in randomized form being descriptive of anti-Gray coded parity bits of a first convolutional code, a second of said three components of said PCCC being descriptive of anti-Gray parity bits of a second convolutional code, and a third of said three components of said PCCC being descriptive of said robust data in randomized form;

a first Gray-code encoder operable for receiving said first component of said PCCC and for reproducing said parity bits of said first convolutional code;

a second Gray-code encoder operable for receiving said second component of said PCCC and for reproducing said parity bits of said second convolutional code;

a PCCC decoder connected for receiving said parity bits of said first convolutional code as reproduced from said first Gray-code encoder, for receiving said parity bits of said second convolutional code as reproduced from said second Gray-code encoder, and for receiving said third component of said PCCC descriptive of said robust data in randomized form, said PCCC decoder operable for decoding said PCCC to reproduce said robust data in randomized form as a PCCC decoding result; and a data de-randomizer connected for de-randomizing PCCC decoding result, thus to reproduce said robust data.

6. A receiver as set forth in claim 1, for receiving 8VSB digital television signals that convey robust data subjected to randomization and parallel concatenated convolutional coding before resulting PCCC is anti-Gray coded, results from such anti-Gray coding being subjected to time-division multiplexing with other data, results from said time-division multiplexing being subjected to convolutional byte interleaving before being further coded by 2/3 trellis coding of said 8VSB digital television signals; wherein said further apparatus comprises:

memory operable for counteracting convolutional byte interleaving of said trellis decoding results to supply de-interleaved trellis decoding results;

a Gray-code encoder for Gray coding hard decision portions of 2-soft-bit nibbles of said de-interleaved trellis decoding results, thus to generate re-coded de-interleaved trellis decoding results;

PCCC segments selection and de-multiplexer circuitry connected for selectively responding to portions of said re-coded de-interleaved trellis decoding results that convey in randomized form three components of said PCCC that encodes said robust data in randomized form, a first of said three components of said PCCC being descriptive of parity bits of a first convolutional code, a second of said three components of said PCCC being descriptive of parity bits of a second convolutional code, and a third of said three components of said PCCC being descriptive of said robust data in randomized form;

a PCCC decoder connected for receiving said three components of said PCCC that encodes said robust data in randomized form, said PCCC decoder operable for decoding said PCCC to reproduce said robust data in randomized form as a PCCC decoding result; and a data de-randomizer connected for de-randomizing PCCC decoding result, thus to reproduce said robust data.

7. A receiver as set forth in claim 1, for receiving 8VSB digital television signals that convey robust data subjected to randomization and parallel concatenated convolutional coding before pairs of PCCC parity bits are anti-Gray coded, results from such anti-Gray coding being subjected together with randomized robust data to time-division multiplexing with other data, results from said time-division multiplexing being subjected to convolutional byte interleaving before being further coded by 2/3 trellis coding of said 8VSB digital television signals; wherein said further apparatus comprises:

memory operable for counteracting convolutional byte interleaving of said trellis decoding results to supply de-interleaved trellis decoding results;

a Gray-code encoder for Gray coding hard decision portions of 2-soft-bit nibbles of said de-interleaved trellis decoding results, thus to generate re-coded de-interleaved trellis decoding results;

PCCC segments selection and de-multiplexer circuitry connected for selectively responding to portions of said re-coded de-interleaved trellis decoding results that convey in randomized form first and second ones of three components of said PCCC that encodes said robust data in randomized form, said first of said three components of said PCCC being descriptive of parity bits of a first convolutional code, and said second of said three components of said PCCC being descriptive of parity bits of a second convolutional code;

a data stream selector connected for selecting a third of said three components of said PCCC descriptive of said robust data in randomized form, said selecting of said third component of said PCCC being made from said de-interleaved trellis decoding results supplied from said memory;

a PCCC decoder connected for receiving said parity bits of said first convolutional code and said parity bits of said second convolutional code as response from said PCCC segments selection and de-multiplexer circuitry, said PCCC decoder connected for receiving said third component of said PCCC as selected by said data stream selector, said PCCC decoder operable for decoding said three components of said PCCC to reproduce said robust data in randomized form as a PCCC decoding result; and a data de-randomizer connected for de-randomizing PCCC decoding result, thus to reproduce said robust data.

8. A receiver as set forth in claim 1, for receiving 8VSB digital television signals that convey robust data subjected to PCCC and randomization of said PCCC before being further coded by 2/3 trellis coding of said 8VSB digital television signal, wherein said further apparatus comprises:

a PCCC payload selector connected for selectively responding to portions of said trellis decoding results that convey said randomized PCCC that encodes said robust data;

a de-randomizer connected for de-randomizing said randomized PCCC that encodes said robust data, thus to generate de-randomized PCCC that encodes said robust data; and a PCCC decoder connected for decoding said de-randomized PCCC, thus to reproduce said robust data.

9. A receiver as set forth in claim 1, for receiving 8VSB digital television signals that convey robust data subjected to PCCC, outer interleaving and randomization of said PCCC after said outer interleaving; randomized PCCC resulting from said randomization of said PCCC being subjected to time-division multiplexing with other data, results from said time-division multiplexing being subjected to convolutional byte interleaving before being further coded by 2/3 trellis coding of said 8VSB digital television signals; wherein said further apparatus comprises:

memory operable for counteracting convolutional byte interleaving of said trellis decoding results to supply de-interleaved trellis decoding results;

a PCCC payload selector connected for selectively responding to portions of said de-interleaved trellis decoding results that convey said randomized PCCC;

a de-randomizer connected for de-randomizing said randomized PCCC, thus to reproduce outer-interleaved said PCCC that encodes said robust data;

memory operable for counteracting outer interleaving of said PCCC that encodes said robust data; and a PCCC decoder connected for decoding said PCCC that encodes said robust data, after outer interleaving thereof has been counteracted, thus to reproduce said robust data.

10. A receiver as set forth in claim 1, for receiving 8VSB digital television signals that convey robust data subjected to PCCC and randomization of said PCCC; randomized PCCC resulting from said randomization of said PCCC being subjected to anti-Gray coding; results from said anti-Gray coding being subjected to time-division multiplexing with other data, results from said time-division multiplexing being subjected to convolutional byte interleaving before being further coded by 2/3 trellis coding of said 8VSB digital television signals; wherein said further apparatus comprises:

memory operable for counteracting convolutional byte interleaving of said trellis decoding results to supply de-interleaved trellis decoding results;
   a PCCC payload selector connected for selectively responding to portions of said de-interleaved trellis decoding results that convey said anti-Gray-coded, randomized, outer-interleaved PCCC that encodes said robust data;
   a Gray-code encoder for Gray coding hard decision portions of 2-soft-bit nibbles of said anti-Gray-coded, randomized, outer-interleaved PCCC that encodes said robust data, thus to generate Gray coding results;
   a de-randomizer connected for de-randomizing said Gray coding results, thus to reproduce said PCCC that encodes said robust data; and
   a PCCC decoder connected for decoding said PCCC that encodes said robust data, thus to reproduce said robust data.

11. A receiver as set forth in claim 1, for receiving 8VSB digital television signals that convey robust data subjected to PCCC, outer interleaving and randomization of said PCCC; results from said randomization of said PCCC being subjected to anti-Gray coding; results from said anti-Gray coding being subjected to time-division multiplexing with other data, results from said time-division multiplexing being subjected to convolutional byte interleaving before being further coded by 2/3 trellis coding of said 8VSB digital television signals; wherein said further apparatus comprises:

memory operable for counteracting convolutional byte interleaving of said trellis decoding results to supply de-interleaved trellis decoding results;
   a PCCC payload selector connected for selectively responding to portions of said de-interleaved trellis decoding results that convey said anti-Gray-coded, randomized, outer-interleaved PCCC that encodes said robust data;
   a Gray-code encoder for Gray coding hard decision portions of 2-soft-bit nibbles of said anti-Gray-coded, randomized, outer-interleaved PCCC that encodes said robust data, thus to generate Gray coding results;
   a de-randomizer connected for de-randomizing said Gray coding results, thus to reproduce outer-interleaved said PCCC that encodes said robust data;
   memory operable for counteracting outer interleaving of said PCCC that encodes said robust data; and
   a PCCC decoder connected for decoding said PCCC that encodes said robust data, after outer interleaving thereof has been counteracted, thus to reproduce said robust data.

12. A receiver as set forth in claim 1, for receiving 8VSB digital television signals that convey robust data subjected to PCCC and randomization of said PCCC before being further coded by 2/3 trellis coding of said 8VSB digital television signal, randomized PCCC of groups of said robust data being transmitted at respective first times and being transmitted again at respective second times for implementing iterative-diversity transmissions of robust data referred to as "stagger-casting", wherein said further apparatus comprises:

a PCCC payload selector connected for selectively responding to portions of said trellis decoding results that convey said randomized PCCC of groups of said robust data transmitted at respective first times and transmitted again at respective second times;
   a de-randomizer connected for de-randomizing said randomized PCCC of groups of said robust data transmitted at first times and at subsequent second times, thus to reproduce PCCC of groups of said robust data transmitted at respective first times and PCCC of groups of said robust data transmitted again at respective second times;
   memory operable for delaying said PCCC of groups of said robust data transmitted at respective first times to generate delayed PCCC of groups of said robust data transmitted at respective first times that is contemporaneous with said PCCC of groups of said robust data transmitted again at respective second times; and
   a PCCC decoder connected for decoding PCCC selected from better ones of corresponding contemporaneous portions of said delayed PCCC of groups of said robust data transmitted at respective first times and of said PCCC of groups of said robust data transmitted again at respective second times, thus to reproduce said robust data.

13. A receiver as set forth in claim 12, for receiving 8VSB digital television signals in which said PCCC is subjected to outer interleaving before said randomization of said PCCC; said memory operable for de-interleaving the outer interleaving of said PCCC of groups of said robust data transmitted at respective first times and for de-interleaving the outer interleaving of said PCCC of groups of said robust data transmitted again at respective second times, in addition to being operable for delaying said PCCC of groups of said robust data transmitted at respective first times to generate delayed PCCC of groups of said robust data transmitted at respective first times that is contemporaneous with said PCCC of groups of said robust data transmitted again at respective second times.

14. A receiver as set forth in claim 1, for receiving 8VSB digital television signals that convey robust data subjected to PCCC and randomization of said PCCC, results from said randomization of said PCCC being subjected to anti-Gray coding; results from said anti-Gray coding being subjected to time-division multiplexing with other data, results from said time-division multiplexing being subjected to convolutional byte interleaving before being further coded by 2/3 trellis coding of said 8VSB digital television signals; anti-Gray coded randomized PCCC of groups of said robust data being transmitted at respective first times and being transmitted again at respective second times for implementing iterative-diversity transmissions of robust data referred to as "stagger-casting", wherein said further apparatus comprises:

a PCCC payload selector connected for selectively responding to portions of said trellis decoding results that convey said randomized PCCC of groups of said robust data transmitted at respective first times and transmitted again at respective second times;
   a Gray-code encoder for Gray coding hard decision portions of 2-soft-bit nibbles of said anti-Gray coded randomized PCCC of groups of said robust data being transmitted at respective first times and being transmitted again at respective second times, thus to generate Gray coding results;

a de-randomizer connected for de-randomizing said Gray coding results, thus to reproduce PCCC of groups of said robust data transmitted at respective first times and PCCC of groups of said robust data transmitted again at respective second times;

memory operable for delaying said PCCC of groups of said robust data transmitted at respective first times to generate delayed PCCC of groups of said robust data transmitted at respective first times that is contemporaneous with said PCCC of groups of said robust data transmitted again at respective second times; and a PCCC decoder connected for decoding PCCC selected from better ones of corresponding contemporaneous portions of said delayed PCCC of groups of said robust data transmitted at respective first times and of said PCCC of groups of said robust data transmitted again at respective second times, thus to reproduce said robust data.

15. A receiver as set forth in claim 14, for receiving 8VSB digital television signals in which said PCCC is subjected to outer interleaving before said randomization of said PCCC; said memory operable for de-interleaving the outer interleaving of said PCCC of groups of said robust data transmitted at respective first times and for de-interleaving the outer interleaving of said PCCC of groups of said robust data transmitted again at respective second times, in addition to being operable for delaying said PCCC of groups of said robust data transmitted at respective first times to generate delayed PCCC of groups of said robust data transmitted at respective first times that is contemporaneous with said PCCC of groups of said robust data transmitted again at respective second times.

16. A receiver for 8VSB digital television signals that convey robust data subjected to parallel concatenated convolutional coding (PCCC) before being further coded by 2/3 trellis coding of said 8VSB digital television signals, said PCCC composed of first convolutional coding of said robust data and second convolutional coding of said robust data, bytes of said first convolutional coding and bytes of said second convolutional coding being time-interleaved with each other and with bytes of other data before being further coded by 2/3 trellis coding, said receiver comprising:

apparatus for converting a selected 8VSB digital television signal received as an amplitude-modulated radio-frequency carrier to a baseband digital television signal, which apparatus includes front-end circuitry, an analog-to-digital converter, a demodulator for 8VSB digital television signals and a channel equalization filter;

a 12-phase trellis decoder connected for providing trellis decoding results that include soft decisions concerning symbols in said baseband digital television signal, said 12-phase trellis decoder connected to receive the baseband digital television signal from said apparatus for converting a selected 8VSB digital television signal received as an amplitude-modulated radio-frequency carrier to a baseband digital television signal; and further apparatus connected for decoding selected portions of said trellis decoding results conveying said PCCC composed of time-interleaved said first convolutional coding of said robust data and said second convolutional coding of said robust data, thus to reproduce said robust data.

17. A receiver as set forth in claim 16 for receiving 8VSB digital television signals in which said PCCC is subjected to randomization before being further coded by 2/3 trellis coding of said 8VSB digital television signal, wherein said further apparatus comprises:

a PCCC payload selector connected for selectively responding to portions of said trellis decoding results that convey in randomized form time-interleaved portions of said first convolutional coding of said robust data and said second convolutional coding of said robust data;

a de-randomizer connected for de-randomizing said time-interleaved portions of said first convolutional coding of said robust data and said second convolutional coding of said robust data;

memory operable for responding to said time-interleaved portions of said first convolutional coding of said robust data and said second convolutional coding of said robust data to supply said first convolutional coding of said robust data and second convolutional coding of said robust data contemporaneously as respective components of said PCCC; and a PCCC decoder connected for decoding said first convolutional coding of said robust data and second convolutional coding of said robust data as supplied contemporaneously from said memory, thus to reproduce said robust data in at least substantially original form.

18. A receiver as set forth in claim 17, for receiving 8VSB digital television signals in which said PCCC is subjected to outer interleaving before said randomization of said PCCC; said memory operable for de-interleaving the outer interleaving of said time-interleaved portions of said first convolutional coding of said robust data and said second convolutional coding of said robust data, in addition to being operable to supply said first convolutional coding of said robust data and second convolutional coding of said robust data contemporaneously as respective components of said PCCC.

19. A receiver as set forth in claim 16 for receiving 8VSB digital television signals in which said PCCC is subjected to randomization and anti-Gray coding before being further coded by 2/3 trellis coding of said 8VSB digital television signal, wherein said further apparatus comprises:

a PCCC payload selector connected for selectively responding to portions of said trellis decoding results that convey in anti-Gray-coded randomized form time-interleaved portions of said first convolutional coding of said robust data and said second convolutional coding of said robust data;

a Gray-code encoder for Gray coding hard decision portions of 2-soft-bit nibbles of said time-interleaved portions of said first convolutional coding of said robust data and said second convolutional coding of said robust data conveyed in anti-Gray-coded randomized form, thus to generate Gray coding results;

a de-randomizer connected for de-randomizing said Gray coding results, thus to generate de-randomized time-interleaved portions of said first convolutional coding of said robust data and said second convolutional coding of said robust data;

memory operable for responding to said de-randomized time-interleaved portions of said first convolutional coding of said robust data and said second convolutional coding of said robust data to reproduce said first convolutional coding of said robust data and said second convolutional coding of said robust data contemporaneously as respective components of said PCCC; and a PCCC decoder connected for decoding said first convolutional coding of said robust data and second convolutional coding of said robust data as reproduced contemporaneously from said memory, thus to reproduce said robust data.

20. A receiver as set forth in claim 19, for receiving 8VSB digital television signals in which said PCCC is subjected to outer interleaving before said randomization of said PCCC; said memory operable for de-interleaving the outer interleaving of said time-interleaved portions of said first convolutional coding of said robust data and said second convolutional coding of said robust data, in addition to being operable to supply said first convolutional coding of said robust data and second convolutional coding of said robust data contemporaneously as respective components of said PCCC.

* * * * *